United States Patent
Kobayakawa et al.

(10) Patent No.: US 7,190,674 B2
(45) Date of Patent: Mar. 13, 2007

(54) APPARATUS FOR CONTROLLING PACKET OUTPUT

(75) Inventors: Takahiro Kobayakawa, Fukuoka (JP); Hiroaki Yamashita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1043 days.

(21) Appl. No.: 10/281,366

(22) Filed: Oct. 25, 2002

(65) Prior Publication Data

US 2003/0202517 A1 Oct. 30, 2003

(30) Foreign Application Priority Data

Apr. 30, 2002 (JP) ............................. 2002-129149

(51) Int. Cl.
*H04L 12/66* (2006.01)
*H04L 12/28* (2006.01)
*H04L 12/26* (2006.01)

(52) U.S. Cl. ................. 370/235; 370/352; 370/395.41; 370/417

(58) Field of Classification Search .................... None
See application file for complete search history.

(56) References Cited

U.S. PATENT DOCUMENTS

| | | | | |
|---|---|---|---|---|
| 5,859,835 A | * | 1/1999 | Varma et al. | 370/229 |
| 6,317,416 B1 | * | 11/2001 | Giroux et al. | 370/232 |
| 6,487,212 B1 | * | 11/2002 | Erimli et al. | 370/413 |
| 6,751,194 B1 | * | 6/2004 | Ueno | 370/235 |
| 6,891,834 B1 | * | 5/2005 | Dally et al. | 370/395.4 |
| 7,039,013 B2 | * | 5/2006 | Ruutu et al. | 370/235 |
| 7,110,411 B2 | * | 9/2006 | Saidi et al. | 370/395.4 |

FOREIGN PATENT DOCUMENTS

JP 2000-101637 3/2000

* cited by examiner

*Primary Examiner*—Chi Pham
*Assistant Examiner*—Melanie Jagannathan
(74) *Attorney, Agent, or Firm*—Katten Muchin Rosenman LLP

(57) ABSTRACT

In a packet scheduler, an arithmetic-operation controlling means designates output ports in a time-sharing manner and a parallel arithmetic operation means performs an arithmetic operation common with the queues of each designated output port to obtain packet output completion due times (evaluation factors) of the top packets of queues of each output port. Intra-port selecting means selects the evaluation factor of a packet that is to be preferentially output for each output port based on the result of the arithmetic operations. Then inter-port selecting means determines one to be most-preferentially output from the top packets selected based on the selected evaluation factors and the bandwidths for the output ports. Therefore, an apparatus for controlling packet output having such a packet scheduler can realize accurately control bandwidths of a plurality of queues, high-speed processing and the reduced size thereby being incorporated in hardware.

36 Claims, 42 Drawing Sheets

FIG. 5

ALLOCATION TO EACH TIME SLOT (TS) WITHIN ONE PERIOD — 521

| TYPE OF PORTS | | TS1 | TS2 | TS3 | TS4 | TS5 | TS6 | TS7 | TS8 | TS9 | TS10 | TS11 | TS12 | TS13 | TS14 | TS15 | TS16 |
|---|---|---|---|---|---|---|---|---|---|---|---|---|---|---|---|---|---|
| (1) | 1G×16 | 1G PORT1 | 1G PORT2 | 1G PORT3 | 1G PORT4 | 1G PORT5 | 1G PORT6 | 1G PORT7 | 1G PORT8 | 1G PORT9 | 1G PORT10 | 1G PORT11 | 1G PORT12 | 1G PORT13 | 1G PORT14 | 1G PORT15 | 1G PORT16 |
| (2) | 1G×8 10G×1 | 1G PORT1 | 10G PORT9 | 1G PORT2 | 10G PORT9 | 1G PORT3 | 10G PORT9 | 1G PORT4 | 10G PORT9 | 1G PORT5 | 1G PORT9 | 1G PORT6 | 10G PORT9 | 1G PORT7 | 10G PORT9 | 1G PORT8 | 10G PORT9 |
| (3) | 622M×8 10G×1 | 622M PORT1 | 10G PORT9 | 622M PORT2 | 10G PORT9 | 622M PORT3 | 10G PORT9 | 622M PORT4 | 10G PORT9 | 622M PORT5 | 10G PORT9 | 622M PORT6 | 10G PORT9 | 622M PORT7 | 10G PORT9 | 622M PORT8 | 10G PORT9 |
| (4) | 2.4G×4 10G×1 | 2.4G PORT1 | 10G PORT5 | 2.4G PORT2 | 10G PORT5 | 2.4G PORT3 | 10G PORT5 | 2.4G PORT4 | 10G PORT5 | 2.4G PORT1 | 10G PORT5 | 2.4G PORT2 | 10G PORT5 | 2.4G PORT3 | 10G PORT5 | 2.4G PORT4 | 10G PORT5 |
| (5) | 9.6G×1 10G×1 | 9.6G PORT1 | 10G PORT2 | 9.6G PORT1 | 10G PORT2 | 9.6G PORT1 | 10G PORT2 | 9.6G PORT1 | 10G PORT2 | 9.6G PORT1 | 10G PORT2 | 9.6G PORT1 | 10G PORT2 | 9.6G PORT1 | 10G PORT2 | 9.6G PORT1 | 10G PORT2 |

F I G. 12
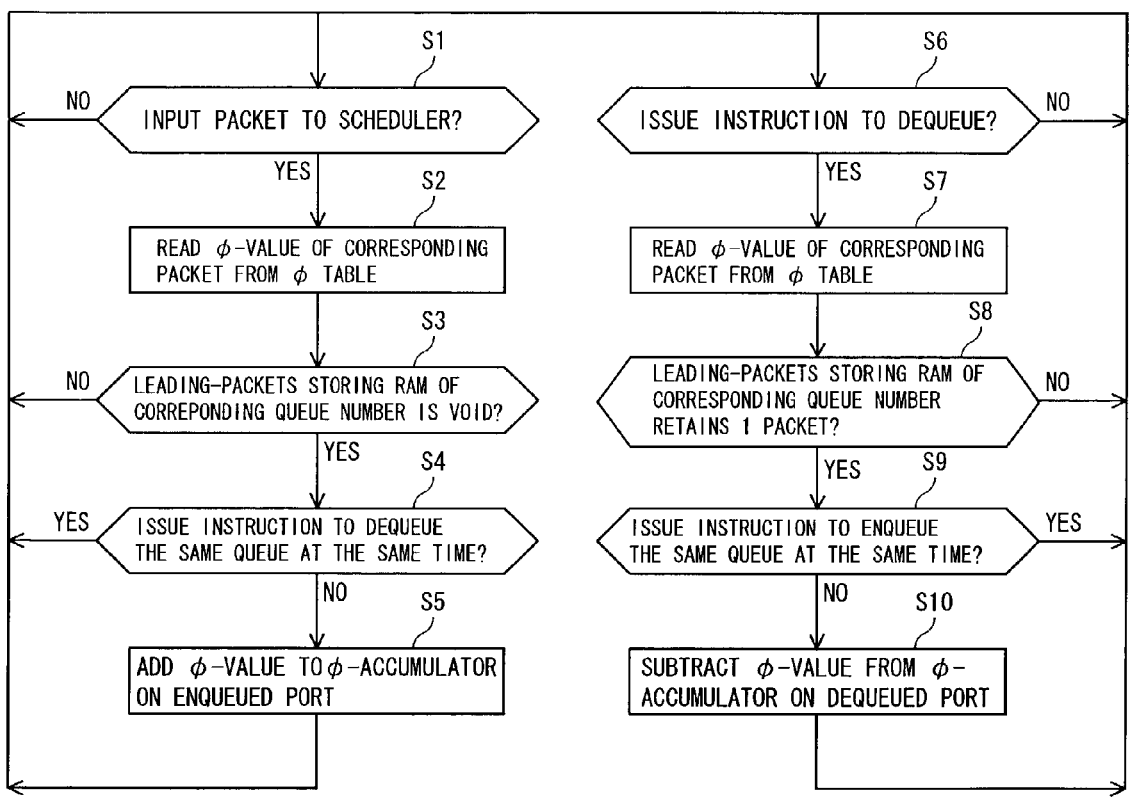

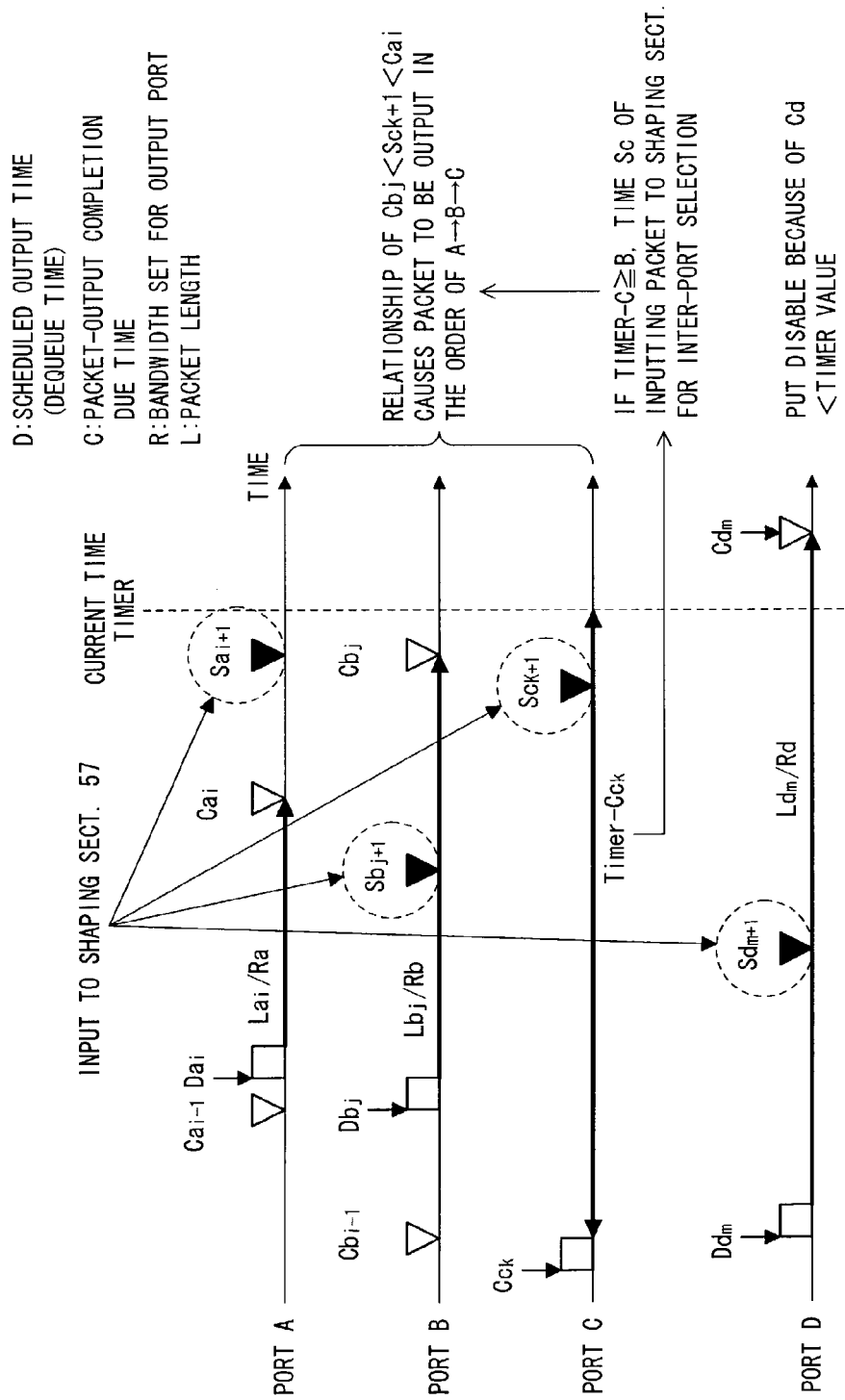

FIG. 20A

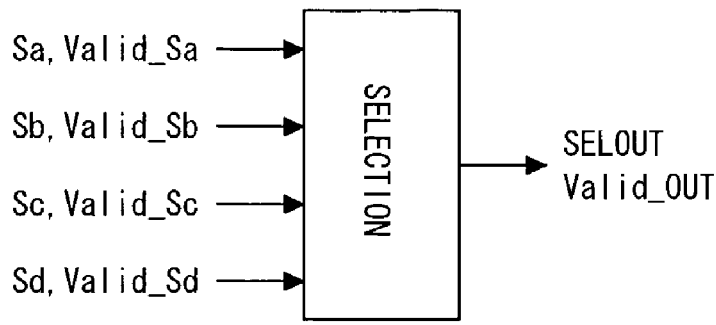

FIG. 20B

```
if( VALID_SA==0 && VALID_SB==0
 && VALID_SC==0 && VALID_SD==0 ) begin
   VALID_OUT=0;
end
else if( VALID_SA==1 && ((SA<SB) | VALID_SB==0 )
      && ((SA<SC) | VALID_SC==0 )
      && ((SA<SD) | VALID_SD==0 )) begin
   VALID_OUT=1;
   SELOUT=Packet A;
end
else if( VALID_SB==1 && ((SB<SC) | VALID_SC==0 )
      && ((SB<SD) | VALID_SD==0 )) begin
   VALID_OUT=1;
   SELOUT=Packet B;
end
else if( VALID_SC==1 && ((SC<SD) | VALID_SD==0 ) begin
   VALID_OUT=1;
   SELOUT=Packet C;
end
else begin
   VALID_OUT=1;
   SELOUT=Packet D;
end
```

FIG. 28

| STATE OF QUEUE | PROCESS |
|---|---|
| VOID | [PROCESS (1)]<br>· STORE PARAMETERS RECEIVED IN ADDRESS OF PARAMETER MEMORY, WHICH ADDRESS IS INDICATED BY POINTER RECEIVED<br>· OUTPUT RECEIVED PARAMETER TO SCHEDULER<br>· STORE RECEIVED POINTER IN TOP POINTER MEMORY AND END POINTER MEMORY |
| ONE PACKET PRESENT | [PROCESS (2)]<br>· STORE PARAMETERS RECEIVED IN ADDRESS OF PARAMETER MEMORY, WHICH ADDRESS IS INDICATED BY POINTER RECEIVED<br>· OUTPUT RECEIVED PARAMETER TO SCHEDULER<br>· STORE RECEIVED POINTER IN ADDRESS OF SUBSEQUENT POINTER MEMORY, WHICH ADDRESS IS INDICATED BY END POINTER<br>· STORE RECEIVED POINTER IN END POINTER MEMORY |
| TWO PACKETS PRESENT | [PROCESS (3)]<br>· STORE PARAMETERS RECEIVED IN ADDRESS OF PARAMETER MEMORY, WHICH ADDRESS IS INDICATED BY POINTER RECEIVED<br>· STORE RECEIVED PARAMETER IN ADDRESS OF 3RD PARAMETER MEMORY, WHICH ADDRESS IS INDICATED BY RECEIVED POINTER<br>· STORE RECEIVED POINTER IN ADDRESS OF QUBSEQUENT POINTER MEMORY, WHICH ADDRESS IS INDICATED BY END POINTER<br>· STORE RECEIVED POINTER IN END POINTER MEMORY |
| THREE PACKETS PRESENT | [PROCESS (4)]<br>· STORE PARAMETERS RECEIVED IN ADDRESS OF PARAMETER MEMORY, WHICH ADDRESS IS INDICATED BY POINTER RECEIVED<br>· STORE RECEIVED POINTER IN 4TH POINTER MEMORY<br>· STORE RECEIVED POINTER IN ADDRESS OF QUBSEQUENT POINTER MEMORY, WHICH ADDRESS IS INDICATED BY END POINTER<br>· STORE RECEIVED POINTER IN END POINTER MEMORY |
| MORE THAN THREE PACKETS EN PRESENT QUEUED | [PROCESS (5)]<br>· STORE PARAMETERS RECEIVED IN ADDRESS OF PARAMETER MEMORY, WHICH ADDRESS IS INDICATED BY POINTER RECEIVED<br>· STORE RECEIVED POINTER IN ADDRESS OF QUBSEQUENT POINTER MEMORY, WHICH ADDRESS IS INDICATED BY END POINTER<br>· STORE RECEIVED POINTER IN END POINTER MEMORY |

FIG. 30

| STATE OF QUEUE | PROCESS |
|---|---|
| MORE THAN FOUR PACKETS PRESENT | [PROCESS (1)]<br>· OUTPUT TOP POINTER TO MEMORY CONTROLLER<br>· OUTPUT 3RD PARAMETER TO SCHEDULER<br>· READ SUBSEQUENT POINTER INDICATED BY TOP POINTER FROM SUBSEQUENT POINTER MEMORY AND STORE THE SUBSEQUENT POINTER IN TOP POINTER MEMORY<br>· READ PARAMETER INDICATED BY 4TH POINTER FROM PARAMETER MEMORY AND STORE THE PARAMETER IN 3RD PARAMETER MEMORY<br>· READ SUBSEQUENT POINTER INDICATED BY 4TH POINTER FROM SUBSEQUENT POINTER MEMORY AND STORE THE SUBSEQUENT POINTER IN 4TH PARAMETER MEMORY |
| FOUR PACKETS PRESENT | [PROCESS (2)]<br>· OUTPUT TOP POINTER TO MEMORY CONTROLLER<br>· OUTPUT 3RD PARAMETER TO SCHEDULER<br>· READ SUBSEQUENT POINTER INDICATED BY TOP POINTER FROM SUBSEQUENT POINTER MEMORY AND STORE THE SUBSEQUENT POINTER IN TOP POINTER MEMORY<br>· READ PARAMETER INDICATED BY 4TH POINTER FROM PARAMETER MEMORY AND STORE THE PARAMETER IN 3RD PARAMETER MEMORY |
| THREE PACKETS PRESENT | [PROCESS (3)]<br>· OUTPUT TOP POINTER TO MEMORY CONTROLLER<br>· OUTPUT 3RD PARAMETER TO SCHEDULER<br>· READ SUBSEQUENT POINTER INDICATED BY TOP POINTER FROM SUBSEQUENT POINTER MEMORY AND STORE THE SUBSEQUENT POINTER IN TOP POINTER MEMORY |
| TWO PACKETS PRESENT | [PROCESS (4)]<br>· OUTPUT TOP POINTER TO MEMORY CONTROLLER<br>· READ SUBSEQUENT POINTER INDICATED BY TOP POINTER FROM SUBSEQUENT POINTER MEMORY AND STORE THE SUBSEQUENT POINTER IN TOP POINTER MEMORY |
| ONE PACKET PRESENT | [PROCESS (5)]<br>· OUTPUT TOP POINTER TO MEMORY CONTROLLER |

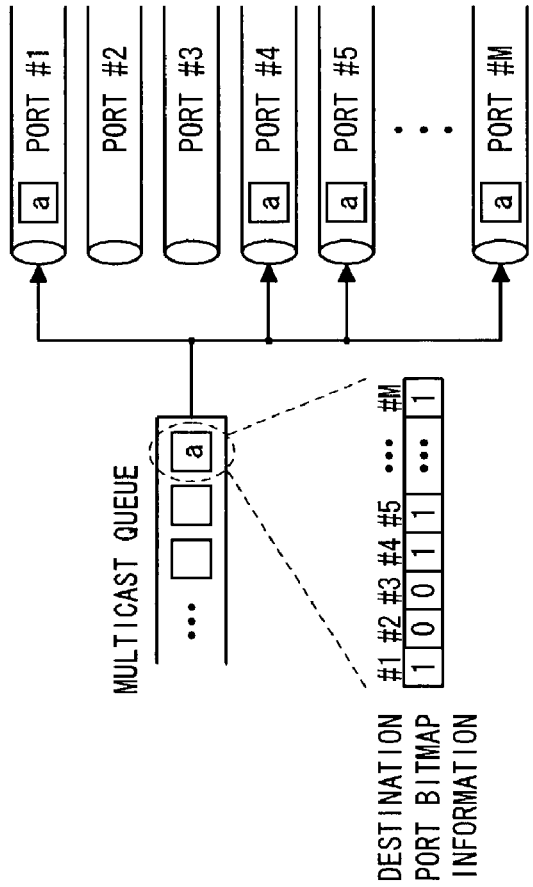
F I G. 44A
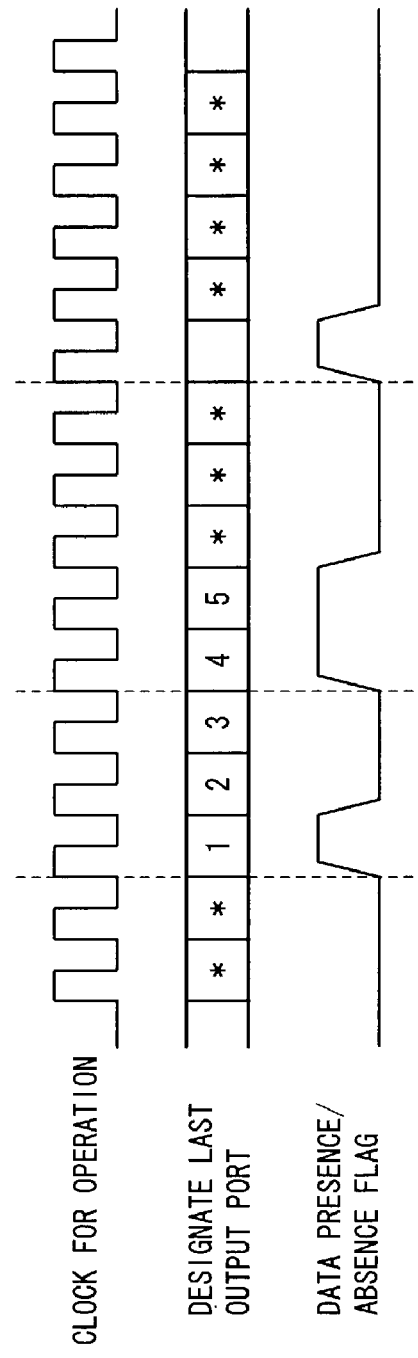
F I G. 44B

APPARATUS FOR CONTROLLING PACKET OUTPUT

BACKGROUND OF THE INVENTION

1. Field of the Invention

The present invention relates to an apparatus for controlling packet output including a plurality of queues in which packets are stored, and more particularly to an apparatus for controlling packet output efficiently selects a packet that is to be transmitted in the shortest length of time from packets stored in the top positions of the plural queues to output the selected packet.

2. Description of the Related Art

The recent spread of ADSL, CATV, FTTH and the like provides homes and offices without exclusive communication lines with high-speed access to Internet, realizing distribution of high-volume contents, such as movies and news, over the Internet as well as conventional e-mail and files.

In the future, various applications may be integrated on the IP (Internet Protocol) network to serve to users. Therefore, the spread of broadband communication via Internet or LAN (Local Area Network) may expand the demand for routers (L3 switches) that play an important role in IP networks. Further, such routers require improvement of throughput to accommodate communication of higher-volume information.

When providing various services having respective different traffic characteristics (e.g., tolerance loss rate, delay) through IP network, which services are exemplified by smooth sending of e-mail, transferring files via FTP (File Transfer Protocol) and distributing moving pictures and audio data, a router needs to execute QoS (Quality of Service) control that controls priorities and bandwidths for the traffic characteristics in accordance with traffic flows (a plurality of subsequent packets that a user desires to transfer) to prevent each service from deteriorating.

For example, in relation to traffic data such as FTP data and WWW (World Wide Web) data, it is most important to equally transfer the data of each flow at a high speed utilizing the maximum resources (mainly, bandwidth). For this purpose, a router has to allocate and save bandwidths reserved for the individual flows (or flow sets), and has to perform high-speed control to equally distribute unused resources of an output port (an output link) in order to the flows in accordance with the high-speed output port.

On the other hand, when audio traffic data exemplified by VoIP (Voice over IP) is transferred, it is more important to ensure a fixed transfer rate that minimizes delay jitters than to equally use the maximum resource of the bandwidths.

Here, a QoS scheme is shown in accompanying drawing FIG. 45. A conventional QoS control carries out the following steps (1) through (4):

(1) Identification (classification) of a flow of each input IP packet, which flow is defined in terms of individual application, with reference to an IP address, MAC (Media Access Control) address and ToS (Type of Service) field of the input packet;

(2) Distribution of each input packet to an appropriate queue corresponding to the identified flow number (queueing);

(3) Computing (scheduling) the order and the time of dequeing packets on the top positions of the individual queues based on the lengths of the packets and the time when the queuing of the packets in accordance with the priority and the bandwidth set for the individual queue; and (4) Reading the top packets of each queue in response to the scheduling result (dequeuing).

The succession of processes (1) through (4) realizes QoS control over packets, each distributed to the corresponding queue, in accordance with a flow of each packet.

Among various algorithms for packet scheduling, technique of WFQ (Weighted Fair Queuing) and WRR (Weighted Round Robin) are commonly used in the art. Above all, those skilled in the art regard WFQ technique as the most suitable for fair distribution of bandwidths to variable-length packets. The algorithm of WFQ will now be described.

An accompanying drawing FIG. 46 shows the principles of controlling bandwidths of queues for which a fixed bandwidth is reserved. Supposing that the bandwidth set (reserved) for a queue of a scheduling object and the length of the packet on the top position (hereinafter called "the top packet") of the object queue are respectively $\phi$ and L, completion of outputting the top packet takes the length of time period $L/\phi$. In the technique of controlling a bandwidth, the output completion due time (a scheduling evaluation factor) F of the packet is derived from $L/\phi$. When the current time Tr indicated by a timer exceeds the output completion due time F, the subsequent packet is allowed to output through the bandwidth. The packet output completion due time F is derived by the following formula (1).

$$F_i = \max\{F_{i-1}, Ti\} + \left(\frac{L_i}{\phi}\right) \quad (1)$$

In formula (1), Ti denotes the arrival time of the i-th packet of the flow number k; Li, the length of the i-th packet of the flow number k; and $\max\{F_{i-1}, Ti\}$, the greater of the previous-packet output completion due time $F_{i-1}$ and the packet arrival time Ti.

As the case of $Ti<F_{i-1}$, the packet output completion due time $F_i$ is derived based on the previous-packet output completion due time $F_{i-1}$ using formula (1) as shown in section (1) of FIG. 46; and conversely, as the case of $Ti \geq F_{i-1}$, the packet output completion due time $F_i$ is derived based on the packet arrival time Ti using formula (1) as shown in section (2) of FIG. 46.

Further in WFQ technology, when a packet arrives, computation using the formula (2) is performed on all i-th packets having the flow number k, which packets are the top packets of the individual queues in order to obtain scheduling evaluation factors.

$$F_i^k = \max\{F_{i-1}^k, T_i^k\} + \left(\frac{L_i^k}{\phi^k}\right) \times \left(\frac{\phi_b}{R}\right) \quad (2)$$

In formula (2), $\phi^k$ denotes the bandwidth reserved for the flow k; $\phi_b$, the total sum ($\Sigma \phi^k$) of $\phi^k$ of WFQ in the active state WFQ; and R, the total sum of bandwidths of the WFQ sets. For convenience, formula (2) is represented by the following formula (3).

$$F_i^k = \alpha_i^k + \beta_i^k \times \gamma_i^k \quad (3)$$

In formula (3), the $\alpha$ values of the top packets in the active state are constantly compared with the current time Tr indicated by a timer and the top packet having the minimum scheduling evaluation factor (hereinafter simply called an "evaluation factor") F is selected from top packets with $\alpha$ values equal or less than Tr (Tr≧α) to be output. A queue whose immediate previous packet took a long time to complete being output and whose current top packet seems to be taking a long time to be output takes low priority to output the current top packets (to dequeue) therein.

As mentioned above, packet scheduling of WFQ determines the priority order of outputting the top packets from queues in accordance with the packet completion due time $F_i$ of each top packet thereby realizing fair output of packets among the queues. At the same time, WFQ equally allocates unused bandwidth of each queue in the non-active state to queues in the active state whereupon service to the high-speed network communication is improved because resources of the bandwidth are efficiently used to output packets from the queues in the active state at a high-speed.

The active state represents the presence of at least one packet at an individual queue, and such a queue with one or more packets is called an "active queue". A γ value in formula (3) changes in accordance with changes in states of the individual queues. Consequently, evaluation factors F for top packets should be re-computed each time states of the individual queues change.

As shown in FIG. 47, when there are five queues each for which 100 Mbps bandwidth is reserved and three of the five queues have one or more packets (i.e., only three packets are in the active state), 200 Mbps unused bandwidth reserved for the two non-active queues state are equally distributed to the three active queues, and bandwidth for each active queue therefore becomes 167 Mbps. After the distribution, packet scheduling is carried out again based on the new bandwidths to output (dequeue) each packet to a corresponding port.

Conventionally, an arithmetic operation to obtain a scheduling evaluation factor in WFQ is mainly performed by software on a processor. Software however executes only sequential processing and takes an excessive length of time to reflect real-time γ values on evaluation factors as the consequence of the arithmetic operations. Therefore such a conventional arithmetic operation cannot achieve a high throughput in processing in relation to the same output port and to a sequentially-arranged packet in the same queue.

In contrast, when hardware performs such an arithmetic operation in an attempt to boost the throughput, the hardware needs a multiplier and a divider because the arithmetic operations in formula (2) include multiplication and division. With a multiplier and a divider, the hardware becomes much larger in scale so that it is difficult to incorporate the hardware to an LSI or an FPGA (Field Programmable Gate Array). For this reason, arithmetic operation for WFQ performed on hardware has restricted the number of queues for each output port to several queues.

With a plurality of output ports, each output port may assign a dedicated scheduler, which is selected to perform arithmetic operation for the output port. However, such a configuration realized by hardware may also result in a circuit scale large in size thereby being substantially unable to be incorporated in an LSI or an FPGA. As a conventional solution, the amount of arithmetic operation may be reduced by a derivation algorithm for WFQ, such as a virtual clock that does not re-compute γ values.

However, a packet scheduler having a derivation algorithm, such as a virtual clock, causes the time scale used to compute packet output completion due time F to differ from actual time as disclosed in Japanese Patent Application Laid-Open (Kokai) No.2000-101637 (hereinafter called "prior publication"). If a plurality of schedulers that control the order of outputting packets from the plural output ports are installed for service (QoS control), it is difficult to select a packet that is to be most-preferentially output or to perform other operations among such plural schedulers.

The technique proposed in the prior publication reduces the amount of arithmetic operations to compute γ values without introducing a derivation algorithm (such as a virtual clock). However, it is difficult for even the technique to install a WFQ (scheduler) having a number of output ports into an LSI and FPGA without increasing the scale of WFQ.

The prior publication focuses on the low possibility of changing over the size relation of packet output completion due times F for two packets having β values that are not much different even if their γ values change and on the short time difference between the two output completion due times F even if the size relation changes over. For this reason, the prior publication groups packets having evaluation factors F that have similar β values into clusters, and reflects changes in the γ values only on the evaluation factor F of the top pointer of each cluster. Thereby, it is possible to reduce the number of arithmetic operations by performing re-computing caused from a change in γ values as much as the number (M) of clusters.

However, the technique of the prior publication has the benefit of reducing the number of arithmetic operations when the difference of the β value is relatively small and the number M of clusters is much less than the number N of queues (M<<N). If the bandwidths φ of individual services change at a range of several dozen to several hundred kbps or several Gbps, flexibility of β values should be restricted or the number M of clusters needs to be changed in accordance with the flexibility.

Further, since changes in γ values are disregarded in each cluster, it is important to consider the number of clusters, which number tolerates the error of the γ values in QoS. Latency of management for pointers in each cluster creates bottlenecks in scheduling when the shortest packets are subsequently input to the apparatus. Even if the grouping into clusters reduces the number of arithmetic operations to some extent, more schedulers need to be installed in accordance with the increased number of output ports whereupon it is also difficult to install the schedulers into an LSI or FPGA.

SUMMARY OF THE INVENTION

With the foregoing problems in view, it is a first object of the present invention to provide an apparatus for controlling packet output that realizes accurate control of bandwidths of a plurality of queues classified according to various services provided over the Internet or the like, which services are diversifying and becoming large in capacity, in order to greately improve throughput in packet output. It is a second object of the present invention to provide an apparatus for controlling packet output that is small in size and realizes high-speed processing in order to be incorporated in hardware.

To attain the first and the second objects, according to a first generic feature of the present invention, there is provided an apparatus for controlling packet output comprising: a plurality of sets of queues, each set associated with the respective one of a plurality of output ports; enqueuing means for enqueuing each of packets input to the apparatus on corresponding one of the queues in accordance with a flow of each of the packets; a packet scheduler for scheduling issuing an instruction to dequeue each the packet enqueued by the enqueuing means; and dequeuing means for dequeuing a packet, one from the enqueued packets, for which such an instruction to dequeue is issued by the packet scheduler. Additionally, the packet scheduler includes the following means:

(1) parallel arithmetic operating means for performing parallel arithmetic operations using a predefined arithmetic formula on the enqueued packets on the top positions (hereinafter called "top packets") of the queues for each of the plural output ports based on parameters including at least information of the arrival time and the size of each of the top packets in order to obtain an evaluation factor indicating the outputting-completion due time for each of the top packets;

(2) arithmetic-operation controlling means for selecting one output port for which the parallel arithmetic operations are to be performed on the top packets by the parallel arithmetic operating means from the plural output ports and for inputting the parameters of the top packets of the queues for the selected output port to the parallel arithmetic operating means;

(3) intra-port selecting means for selecting the evaluation factor of a packet that is to be preferentially output, which factor has been obtained by the parallel arithmetic operating means, from the evaluation factors of the top packets of the queues for each of the output ports based on the evaluation factors of the top packets on the queues for each of the output ports;

(4) inter-port selecting means for retaining the evaluation factor of the top packet that is to be preferentially output from each output port, which factor has been selected by the intra-port selecting means, and for selecting one output port from which an enqueued packet is to be most-preferentially output from the apparatus based on the evaluation factors retained therein and on a bandwidth for each of the output ports; and (5) dequeue controlling means for providing the dequeuing means with the instruction to dequeue the top packet, which has been selected from the top packets by the intra-port selecting means, of the output port selected by the inter-port selecting means.

As a preferable feature, the arithmetic-operation controlling means may comprise a time-sharing port designation section for designating the one output port, for which the parallel arithmetic operations are to be performed on the top packets by the parallel arithmetic operating means, from the plural output ports in a time-sharing manner in accordance with the ratio of the bandwidths of the plural output ports.

As an additional preferable feature, the packet scheduler may further include a pre-processing section for performing an arithmetic operation on terms common with the queues for each the output port in the predefined formula based on the parameters of the enqueued packets to obtain an interim variable and for inputting the interim variable to the parallel arithmetic operating means for the first-named parallel arithmetic operations in order to obtain the evaluation factor for each of the top packets of each of the output ports.

As a further preferable feature, the packet scheduler further may comprise a bandwidth distribution rate computing section for computing, if one or more queues of each of the output ports are void of packets, a rate of distribution of the bandwidths for active queues having at least one packet of each of the output port so as to distribute bandwidths allocated to the void queues to the active queues; and the parallel arithmetic operating means may perform the first-named parallel arithmetic operations based on the distribution rate of the bandwidths, which have been computed for the active queues by the bandwidth computing section in order to obtain evaluation factors of the top packets on the active queues.

As a still further preferable feature, the packet scheduler may further comprise: destination-information retaining means for retaining destination information for designating two or more of the plural output ports through which one of the enqueued packets is to be multicasted; and distribution controlling means for controlling, each time when one of the two or more output ports is selected by the arithmetic-operation controlling means, the evaluating factor of the last-named enqueued packet that is to be multicasted to the two or more output ports designated by the destination information, which factor has been obtained by the parallel arithmetic operating means, by discriminating that the evaluating factor of the last-named enqueued packet is valid.

It is therefore possible for an apparatus for controlling packet output of the present invention to guarantee advantages as follows.

(1) Since the apparatus selectively designates an arithmetic-object output port from the plural output ports and the arithmetic operations are performed on the individual queues of the selected output port in parallel to obtain evaluation factors, it is possible to reduce the size of the packet scheduler beside the number of queues. That realizes arithmetic operations for a large number of queues by hardware, which has been difficult in conventional technique, whereupon the ability of arithmetic operations are greatly improved, realizing accurate WFQ scheduling.

(2) It is possible to incorporate a scheduler having a large number of queues into an LSI, a FPGA or the like by performing an arithmetic operation in the pre-processing section on terms common with the queues for each of the output ports in the predefined formula or by performing first-named parallel arithmetic operations based on the distribution rate of the bandwidths, which have been computed in accordance with the change in states of each queues (i.e., the presence or the absence of a packet).

(3) The arithmetic operations performed in parallel realizes QoS control over a WFQ fixed-bandwidth queue or a WFQ preferentially-controlled queue based on WFQ technique and control for multicast distribution.

(4) Shaping operation (burst control) for each of the output ports carried out by the output-port-shaping controlling section can avoid congestion due to the total output bandwidth re-computed for each queue. Similarly, shaping operation (burst control) for the dequeue bus carried out by the dequeue-bus-shaping controlling section can avoid congestion at the dequeue bus due to the total bandwidth output re-computed for each output port or for each queue.

(5) Designation of an arithmetic-object output port by the parallel arithmetic-operation controlling means or a feedback operation (the masking operation) at the number of points when dequeuing a packet can prevents a packet from being output more than once and further can realize high throughput by preventing accuracy of control for the bandwidth of each queue and each output port from lowering.

(6) Designation of an arithmetic-object output port in a time-sharing manner in accordance with the ratio of the bandwidths of the plural output ports by the parallel arithmetic-operation controlling means makes the first-named arithmetic operations common with the plural output ports whereupon the accuracy in the first-named arithmetic operations is prevented from lowering.

(7) Further, it is possible to select one from the computed distribution rate and the fixed bandwidth distribution rate of each output port when performing the first-named arithmetic operations for the evaluation factors. Therefore, a ratio of fixed-bandwidth queues to WFQ queues arbitrary set for each output port whereupon a flexible packet scheduler can be provided.

(8) Partly since the parameters of a number of packets which are successively enqueued on each queue of the same output port and which packets include the top packet of the queue are retained, and partly since, upon issuing of an instruction to dequeue the top packet, the parameter of the subsequent packet of the top packet is read from the leading-packets memory and stored in the parallel arithmetic operating means, it is possible to reduce latency in updating the parameter of the subsequent packet enqueued on the same queue. As a result, it is possible to improve the accuracy of control for the bandwidth of a high-speed output port to guarantee the bandwidth set for the output port.

(9) Masking for the evaluation factor of a top packet upon issuing of an instruction to dequeue the top packet can prevent the top packet from being output more than once thereby avoiding lowering of accuracy of control for the bandwidth of a queue.

Other objects and further features of the present invention will be apparent from the following detailed description when read in conjunction with the accompanying drawings.

BRIEF DESCRIPTION OF THE DRAWINGS

FIG. 5 is a table illustrating an example of an arithmetic-operation-object port table used in an arithmetic-operating controlling section in the packet scheduler of FIGS. 2 and 3;

FIG. 12 is a flow diagram illustrating a succession of procedural steps of φ-adding/subtracting operations carried out in the γ-arithmetic operating section of FIG. 9;

FIG. 19 is a diagram showing processes of selecting of an outputting-port selecting carried out by an inter-port selecting section of the packet scheduler of FIGS. 2 and 3;

FIGS. 20A and 20B are diagrams respectively showing examples of software algorithm that realizes the inter-port selecting section of the packet scheduler of FIGS. 2 and 3;

FIG. 28 is a diagram showing details of the procedural steps of FIG. 27;

FIG. 30 is a diagram showing details of the procedural steps of FIG. 29;

FIG. 44A and 44B are diagrams showing controlling multicast distribution, which controlling is performed by the bitmap controller of FIG. 41 and 42;

DESCRIPTION OF THE PREFERRED EMBODIMENTS

Various preferred embodiments of the present invention will now be described with reference to the accompanying drawings.

(A) First Embodiment

Figure 1:
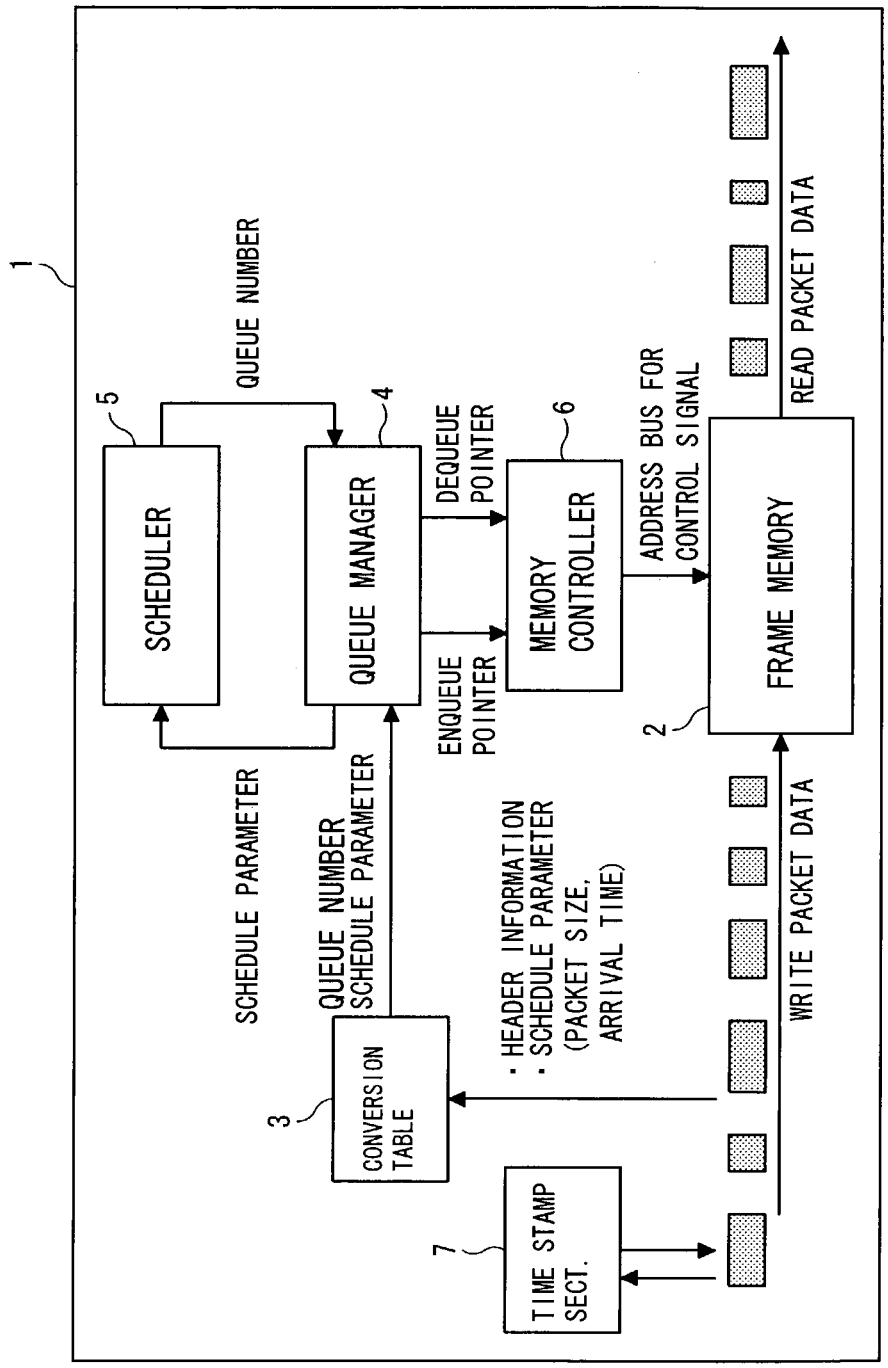
FIG. 1 is a block diagram schematically showing the entire configuration of an apparatus for controlling packet output according to a first embodiment of the present invention.

FIG. 1 is a block diagram schematically showing the entire configuration of an apparatus for controlling packet output according to a first embodiment of the present invention. Apparatus 1 for controlling packet output comprises frame memory 2, conversion table 3, queue manager 4, packet scheduler 5, memory controller 6 and time stamp section 7.

Frame memory 2 (hereinafter also called "memory 2") is a physical memory forming queues and retains data of each packet to be queued. Conversion table 3 identifies a flow of each packet that is to be input to the apparatus 1 for controlling packet output based on the header information, such as the destination IP address of the input packet, and then enqueues the input packet in a corresponding queue in accordance with the result of the flow identification. Conversion table 3 generally takes the form of CAM (Content Addressable Memory) or the like.

Queue manager 4 logically links to information of packets enqueued on each queue, and determines and manages pointers in relation to the enqueued packets, the pointers being used in frame memory 2. Queue manager 4 provides memory controller 6 with an enqueue pointer and a dequeue pointer so as to control enqueuing and dequeuing of the enqueued packets.

Packet scheduler (hereinafter simply called "scheduler") 5 computes (schedules) the order of and the timings of dequeuing packets based on later-described parameters of packets on the top positions of the individual queues. Scheduler 5 further notifies queue manager 4 of the number of the queue from which the top packet thereon is to be most-preferentially dequeued in accordance with the result of the scheduling.

Memory controller 6 receives the pointer (the address) of a packet that is to be enqueued or dequeued from queue manager 4 in order to control writing/reading of the packet on the address in frame memory 2, which address is indicated by the received pointer.

Namely, the combination of queue manager 4 and memory controller 6 serves to function as enqueuing means for enqueuing each of packets input to apparatus 1 for controlling packet output on corresponding one of the queues in accordance with a flow of each packet and as a dequeuing means for dequeuing a packet, one from the enqueued packets, for which such an instruction to dequeue is issued by scheduler 5.

Time stamp section 7 attaches the time of arrival (hereinafter also called "arrival time") to each packet that is to be enqueued.

Apparatus 1 for controlling packet output, having the above elements, performs the succession of procedural steps as follows:

(1) Time stamp section 7 attaches the arrival time to a packet input to apparatus 1 for controlling packet output;

(2) Conversion table 3 receives header information, the size, and the arrival time of the input packet to identify the flow of the input packet and assign an appropriate queue number;

(3) Queue manager 4 links packet information to the queue assigned, and outputs an enqueue pointer that is used to store the enqueue packet in frame memory 2 to memory controller 6 as a write instruction;

(4) Memory controller 6 writes the input packet in the address of frame memory 2, which address is indicated by the enqueue pointer received from queue manager 4;

(5) If the enqueued packet is on the top position of the queue, queue manager 4 inputs the schedule parameter of the enqueued packet into scheduler 5;

(6) Scheduler 5 performs a schedule operation (an arithmetic operation to obtain the scheduling evaluation factor F) based on the schedule parameters of the top packets of the individual queues in order to determine the order of and the timings of enqueuing the top packets, and then output the number of the queue from which the top packet is most-preferentially dequeued to queue manager 4;

(7) Queue manager 4 outputs the pointer (the dequeue pointer) that retains the top packet on the queue having the queue number received from scheduler 5 to memory controller 6 in order to instruct to read the top packet;

(8) At that time, queue manager 4 updates the linkage construction of packet information and, if the queue whose top packet is to be most-preferentially dequeued have next packet subsequent to the top packet, sends scheduler 5 the schedule parameter of the next packet, assuming the next packet as the top packet; and (9) Memory controller 6 reads packet data written in the address of frame memory 2, which address is indicated by the dequeue pointer received from queue manager 4.

In the above manner, apparatus 1 for controlling packet output schedules the order of and the timings of dequeuing the top packets of individual queues based on the scheduling evaluation factors F of the top packets obtained by arithmetic operations performed in scheduler 5. It is practically impossible to schedule more than a thousand queues at the same time. As a solution, scheduler 5 designates an output port in a time-sharing manner whereupon parallel arithmetic operations for the evaluation factors F of the top packets on the queues of each output port are commonly performed among all of the output ports.

(A-1) Details of Packet Scheduler:

The details of scheduler 5 will be now described.

Figure 2:
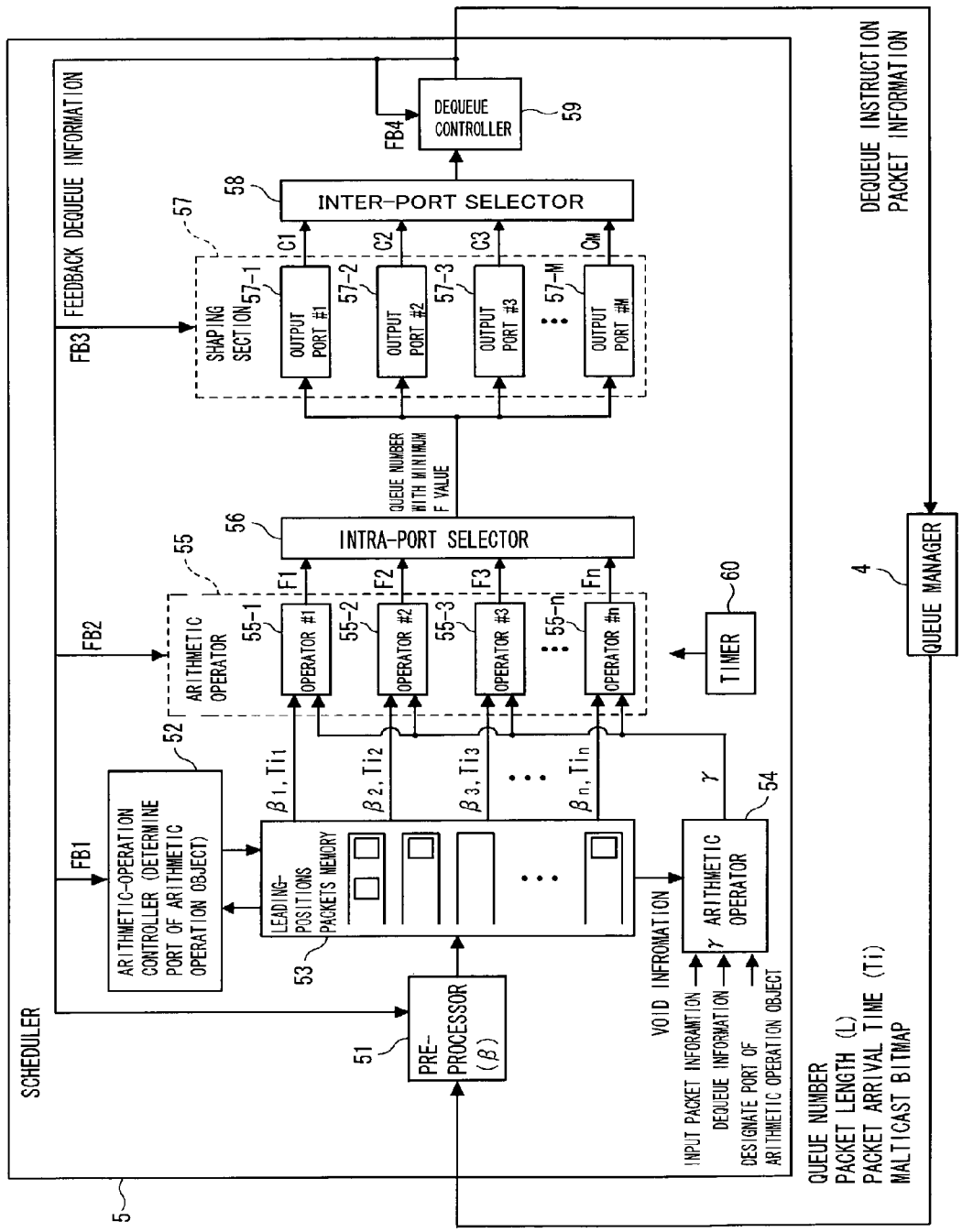
FIGS. 2 and 3 are block diagrams respectively showing a packet scheduler included in the apparatus of FIG. 1.
Figure 3:
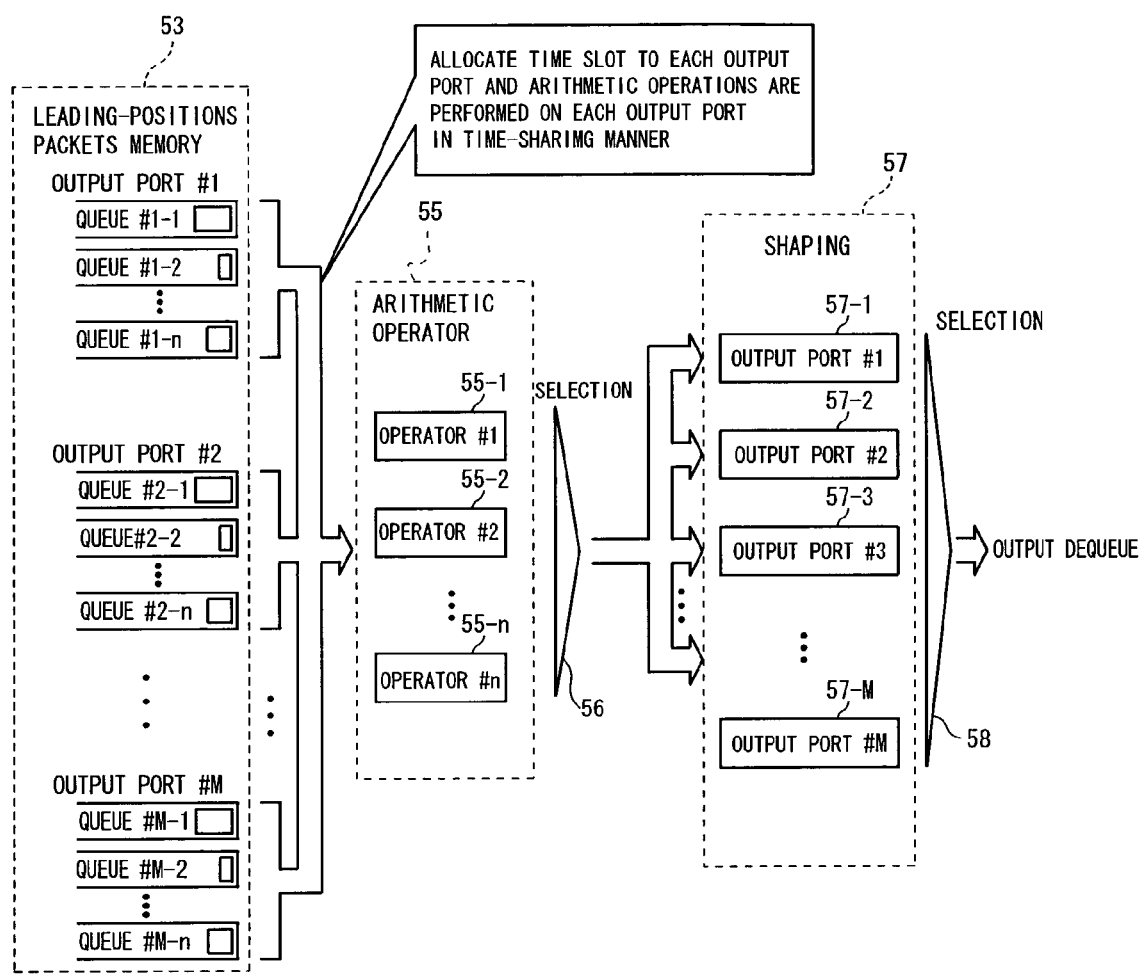

FIGS. 2 and 3 are block diagrams respectively showing scheduler 5. As shown in FIGS. 2 and 3, scheduler 5 of the present invention includes pre-processor 51, arithmetic-operation controller 52, leading-positions packets memory 53, γ-arithmetic operator 54, parallel arithmetic operator 55, intra-port (inter-queue) selector 56, shaping section 57, inter-port selector 58, dequeue controller 59 and timer 60.

Leading-positions packets memory 53 includes queues #j–1 through #j–n (j represents integers 1 through M) corresponding to flows (here, the number of flows is "n") of each of a plurality of output ports #1 through #M. Parallel arithmetic operator 55 has operators 55-1 through 55-n for evaluating factors, each corresponding to an associated one of the plural queues #j–1 through #j–n. Shaping section 57 includes output-port shaping circuits 57-1 through 57-M, each for one of output ports #1 through #M.

Scheduler 5 of FIGS. 2 and 3 performs the following processes.

First of all, pre-processor 51 obtains interim variables β of output ports #j–k (k=1 through n) for arithmetic operations for scheduling evaluation factors, and the interim variables β are stored in leading-positions packets memory 53 together with schedule parameters (e.g., arrival times Ti). Arithmetic-operation controller 52 determines an output port #j for which scheduling is to be performed at each predetermined time slot. Upon the determination of the output port, schedule parameters of top packets of queues of the output port #j are read from leading-positions packets memory 53 at the same time (in parallel), and then each of the read schedule parameters is input to corresponding one of operators 55-1 through 55-n.

Operators 55-1 through 55-n obtain evaluation factors F1 through Fn under pipeline control, and the obtained evaluation factors are output to intra-port selector 56 together with a later-described evaluation-factor validity flag. Intra-port selector 56 selects the smallest evaluation factor (i.e., selects the packet to be preferentially output to the corresponding output port #j) among outputs of operators 55-1 through 55-n, and then stores the selected smallest evaluation factor in output-port shaping circuit 57-j corresponding to the output port #j.

After that, shaping section 57 corrects, by a later-described shaping operation, the evaluation factor for future process overflow and control of burst output of packets in accordance with the bandwidth set for each output port #j. Shaping section 57 outputs the corrected evaluation factors of output ports #j to inter-port selector 58, which selects the smallest one from the received evaluation factors of output ports #1 through #M to output the smallest one to dequeue controller 59.

Upon receipt the smallest evaluation factor, dequeue controller 59 issues an instruction to dequeue the top packet of queue #j–k corresponding to the smallest evaluation factor, which has been selected in inter-port selector 58, to queue manager 4. Dequeue controller 59 feeds the number of the queue #j–k, as a queue-identification signal, to pre-processor 51, arithmetic-operation controller 52, parallel arithmetic operator 55, shaping section 57, inter-port selector 58, and dequeue controller 59. The feedback signal (queue-identification signal) is used to update an evaluation factor on a pipeline process, as described later.

Hereinafter, details of each element in Scheduler 5 will be described.

Leading-positions packets memory 53 retains and manages schedule parameters including information on the size and the arrival time of each packet input in apparatus 1 for controlling packet output, which parameters have been received from queue manager 4, as shown in FIG. 3. The schedule parameters of each packet are stored in a corresponding one of queues #j–1 through #j–n, which has been set in accordance with a number of flows of each of output ports #1 through #M.

Further, leading-positions packets memory 53 comprises operator's leading-position packets memories 53-1 through 53-n, each dedicated to a corresponding one of operators 55-1 through 55-n, as described later with reference to FIG. 8. Each of operator's leading-position packets memories 53-1 through 53-n retains the schedule data of queues #j–k of a corresponding one of output ports #1 through #M.

Each operator's leading-position packets memories 53-1 through 53-n retains schedule parameters of several subsequent packets including the top packet, as described later. Leading-positions packets memory 53 (operator's leading-position packets memories 53-1 through 53-n) is in the form of RAM (Random Access Memory) or the like.

Parallel arithmetic operator 55 obtains scheduling evaluation factors F1 through Fn for all of the queues #j–1 through #j–n of the output port #j by causing operators 55-1 through 55-n, which are in one-to-one correspondence with queues #j–1 through #j–n, to concurrently perform arithmetic operations using the following WFQ arithmetic formula (4) within a time slot (in parallel).

$$F_i^k = \max\{F_{i-1}^{k-1}, T_i\} + \left(\frac{L_i}{\phi_i}\right) \times \left(\frac{\phi_b}{R}\right) = \alpha_i^k + \beta_i^k \times \gamma \quad (4)$$

Scheduler 5 of the present invention switches output port #j for which the arithmetic operations are to be performed at each time slot. Namely, when switching output port #j, scheduler 5 switches a set of schedule parameters of the top packets on the queues #j–1 through #j–n, which parameters are to be read from leading-positions packets memory 53, whereupon operators 55-1 through 55-n are shared by output ports #1 through #M.

Arithmetic-operation controller (time-sharing port designation section) 52 controls designation of one of output ports #1 through #M to a time slot, i.e., designation of output port #j, whose schedule parameters are to be read, in a time-sharing manner. In the present embodiment, such designation of output port #j is performed in the time-sharing manner based on arithmetic-operation-object port table 521 of FIG. 5.

In FIG. 5, 16 steps (time slots; TS) for a combination of arithmetic-operation objects are assumed to be a predetermined period. If bandwidths of 16 outputs ports (output ports #1 through #16, simply depicted port #1 through #16 in FIG. 5) are set identical 1 Gbps as shown in portion (1) of FIG. 5, output ports #1 through #16 have equal opportunities to be designated as an arithmetic-operation-object whereupon arithmetic-operation controller 52 determines an arithmetic-operation-object port each time when receiving feedback information (dequeue-identification signal, which is information to identify a queue for which an instruction to dequeue is issued) from dequeue controller 59. As a result, the designation of an arithmetic-operation-object port is carried out once at a time slot (TS).

As shown in portion (2) of FIG. 5, a combination of 8 output ports #1 through #8 of 1 Gbps and 1 output port #9 of 10 Gbps causes arithmetic-operation controller 52 to designate an arithmetic-operation-object port at a ratio of port #1: port #2: port #3: port #4: port #5: port #6: port #7: port #8: port #9=1:1:1:1:1:1:1:1:8, which ratio is a simplification in relation to 8 Gbps:10 Gbps=4:5. Similarly, in the cases depicted by portions (3) to (5) in FIG. 5, the larger a bandwidth allocated to an output port is, the greater the opportunity to be designated as an arithmetic-operation-object port by arithmetic-operation controller 52 is.

Figure 6:
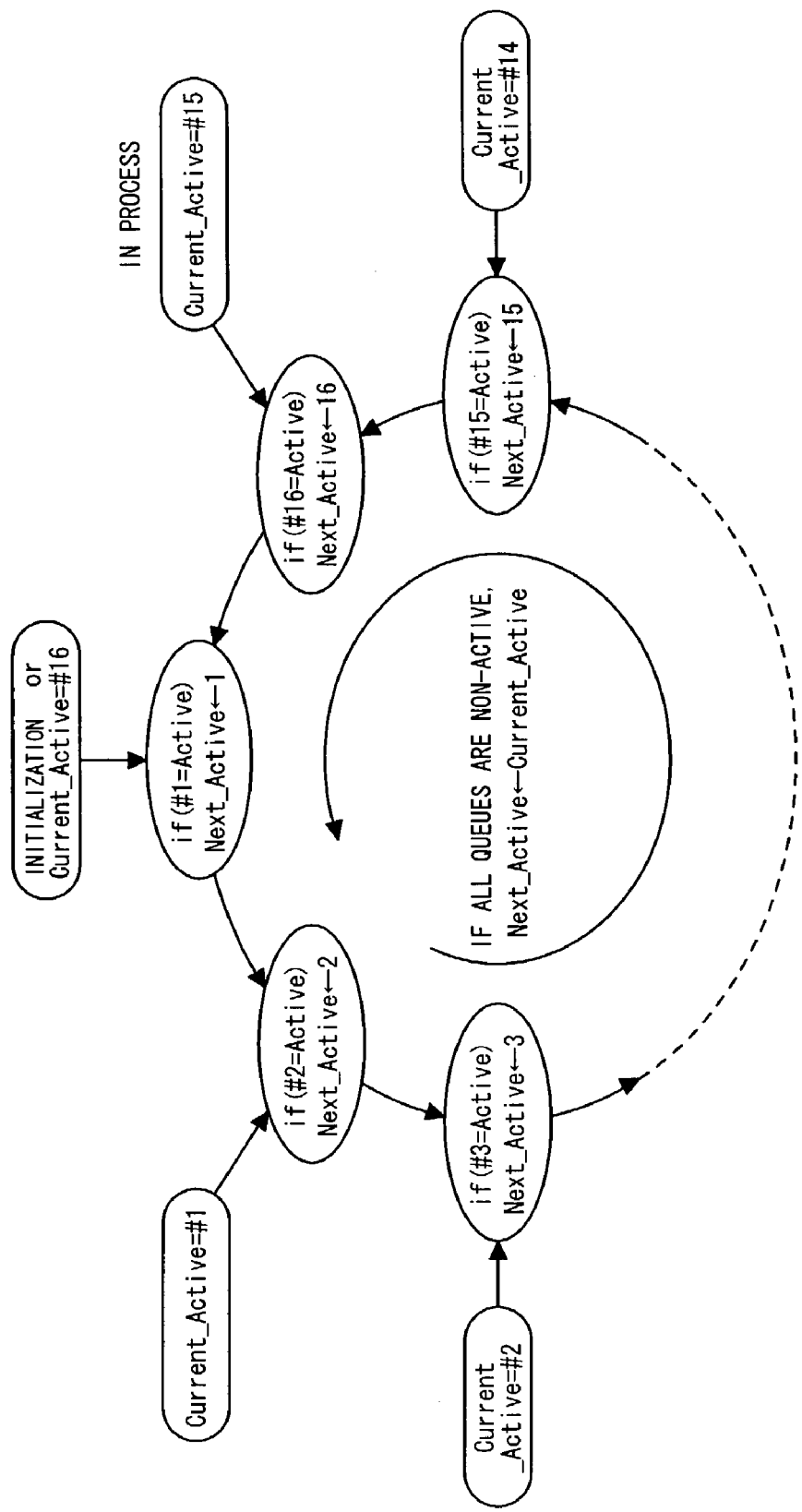
FIG. 6 is a diagram showing operations to determine a port for which an arithmetic operation is to be performed by the arithmetic-operating controlling section of FIGS. 2 and 3.

When designating an arithmetic-operation-object port, arithmetic-operation controller 52 determines whether each output port #j is active or non-active based on a packet presence/absence flag (see FIG. 4) received from leading-positions packets memory 53, as shown in FIG. 6 for example. If output port #j+1 that is to be designated as an arithmetic-operation-object port at the next step is determined to be non active, arithmetic-operation controller 52 sequentially seeks an active output port #j to designate an arithmetic-operation-object port.

Such switching of an arithmetic-operation-object port in accordance with the bandwidth set for each output port makes the interval of dequeuing packets from queues #j–k (k=1 to n) of an output port having a larger bandwidth shorter than that of dequeuing packets from queues #p–k (k=1 to n, p=1 through M, p≠j) of an output port having smaller bandwidth. An output port #j having a larger bandwidth enables improvement of the throughput of dequeuing of packets.

Figure 7:
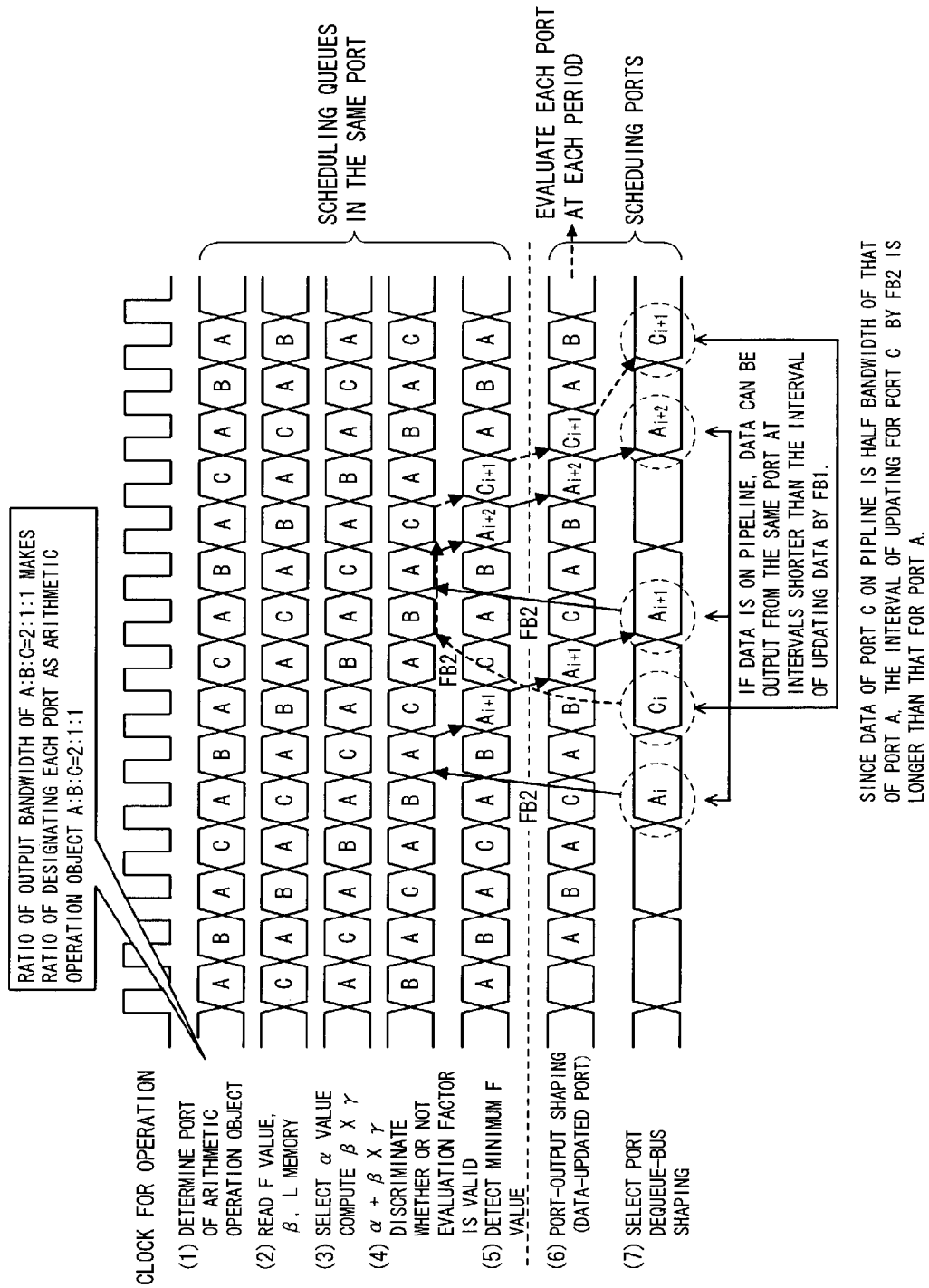
FIG. 7 is a time chart showing designations of posts for which arithmetic operations are to be performed, which designation is carried out by the packet scheduler of FIGS. 2 and 3 and throughputs of the designated ports.

For example shown in FIG. 7, when switching of an arithmetic-operation-object port is carried out in accordance with a ratio of bandwidths of output ports A:B:C=2:1:1 (1), packets of an output port having a larger bandwidth account for a greater ratio than those of output ports having smaller bandwidths during the following pipeline processes (2) to (6): (2) reading schedule parameters from leading-positions packets memory 53; (3) selecting a value and computing β×γ in operator 55-$k$ ("×" should be read as "multiplying"); (4) discriminating whether or not an evaluation factor F ($\alpha+\beta\times\gamma$) is valid; (5) detecting the minimum F in intra-port selector 56; and (6) shaping operation by shaping section 57. As a result, when inter-port selector 58 executes shaping of the dequeue bus (7), instructions to dequeue packets from queues belonging to output port A are issued at shorter intervals of instructions to dequeue packets from queues belonging to output port C whereupon the throughput of dequeuing packets from output port A is improved.

Figure 4:
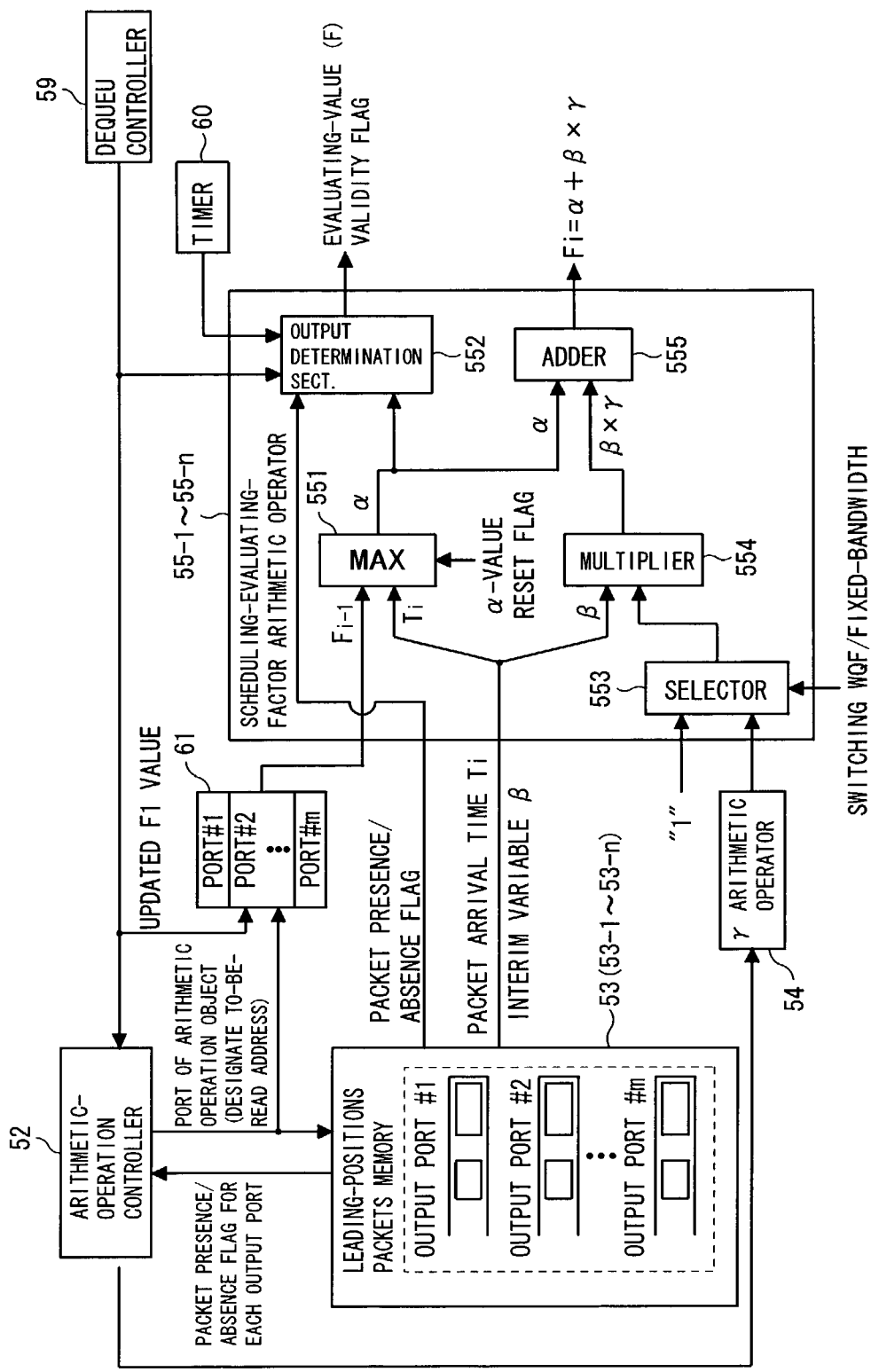
FIG. 4 is a block diagram schematically showing a main part of the packet scheduler of FIGS. 2 and 3, focusing on a scheduling-evaluation-factor arithmetic operator therein.

Each operator 55-$k$ has the configuration shown in FIG. 4 in order to obtain evaluation factors using WFQ arithmetic formula (4). Each operator 55-$k$ includes α selecting logic 551, output determination section 552, selector 553, multiplier 554 and adder 555. The element with a reference number 61 in FIG. 4 represents previous F-value memory to retain the results of previous arithmetic operations for evaluation factors (of previous-packet output completion due time $F_{i-1}$) for each output port #j, however previous F-value memory 61 does not appear on FIGS. 2 and 3.

α selecting logic 551 compares a packet arrival time Ti read from leading-positions packets memory 53 with previous-packet output completion due time $F_{i-1}$ retained in previous F-value memory 61 with respect to each output port #j and selects the larger one in order to obtain the term max $\{F_{i-1}, Ti\}$ (the suffix indicating a flow number is omitted here) in formula (4). Previous-packet output completion due time $F_{i-1}$ is read from previous F-value memory 61 by arithmetic operation controller 52 designating an arithmetic-operation-object port designating signal as a to-be-read address.

Each time when an instruction to dequeue is issued from dequeue controller 59, output determination section 552 determines whether or not an evaluation factor $F_i$ obtained in adder 555 is valid based on a packet presence/absence flag from leading-positions packets memory 53, which flag indicates the state of each output port #j (presence/absence of a packet) when switching an arithmetic-operation-object port and current time Tr provided from timer 60, and outputs the result of the determination. If current time Tr is greater than evaluation factor $F_i$, output determination section 552 outputs a flag indicating "valid". An evaluation factor $F_i$ of which evaluation-factor validity flag indicates "invalid" is not used for the future selection in intra-port selector 56.

Selector (bandwidth selecting means) 553 selectively outputs one of a γ value (a distribution rate after re-allocation of unused bandwidth) and a fixed bandwidth (a distribution rate γ of a fixed bandwidth is 1) based on the setting for switching of WFQ/fixed-bandwidth. When the bandwidths are controlled by WFQ (i.e., unused bandwidth of each non-active queue is re-allocated to active queues), selector 553 selects the output of γ-arithmetic operator 54; and when bandwidths are controlled without such re-allocation of unused bandwidth, selector 553 selects a fixed γ value 1 and outputs the γ value 1 to multiplier 554. WFQ arithmetic formula (4) becomes the following formula (5) if γ=1 is given:

$$F_i^k = \max\{F_{i-1}^{k-1}, T_i\} + \left(\frac{L_i}{\phi_i}\right) \quad (5)$$

The fixed γ value 1 is set in and stored in a register or the like (fixed bandwidth control means).

Figure 35:
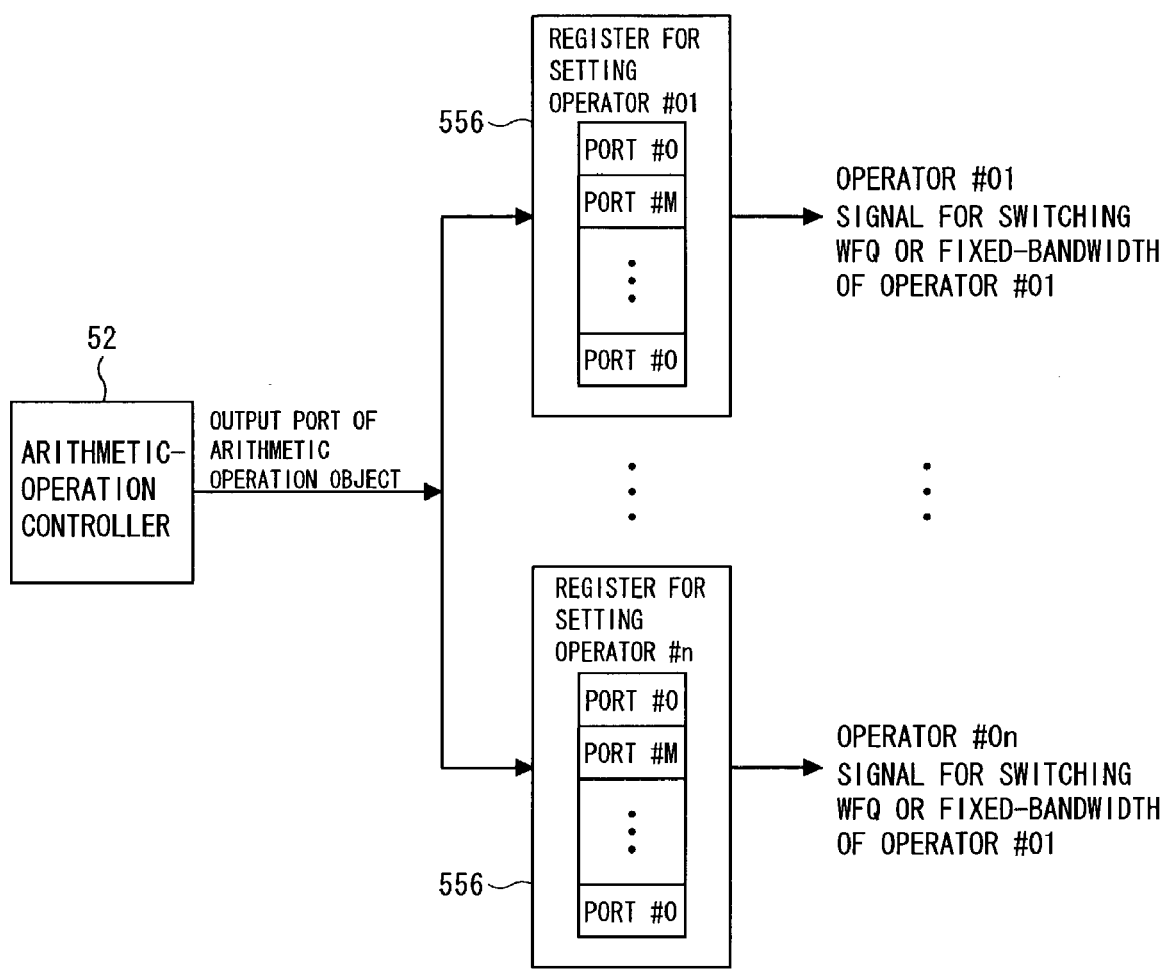
FIG. 35 is a block diagram showing a register to retain WFQ(Weighted Fair Queuing)/fixed-bandwidth switching information for a selector in the scheduling-evaluation-factor arithmetic operator of FIG. 4.

As mentioned above, setting of a WFQ/fixed-bandwidth queue for each operator 55-$k$ allows each output port #j to arbitrary changes a ratio of a WFQ bandwidth control and a fixed bandwidth control whereupon it is possible to control bandwidth of the individual output ports #j in various ways. Such setting of WFQ/fixed-bandwidth queue is performed by inputting, to selector 553, a signal for switching WFQ/fixed-bandwidth queue, which signal is formed by setting information for switching WFQ/fixed-bandwidth queue retained in setting register 556 for each output port #j installed in each operator 55-$k$, as shown in FIG. 35.

Figure 36:
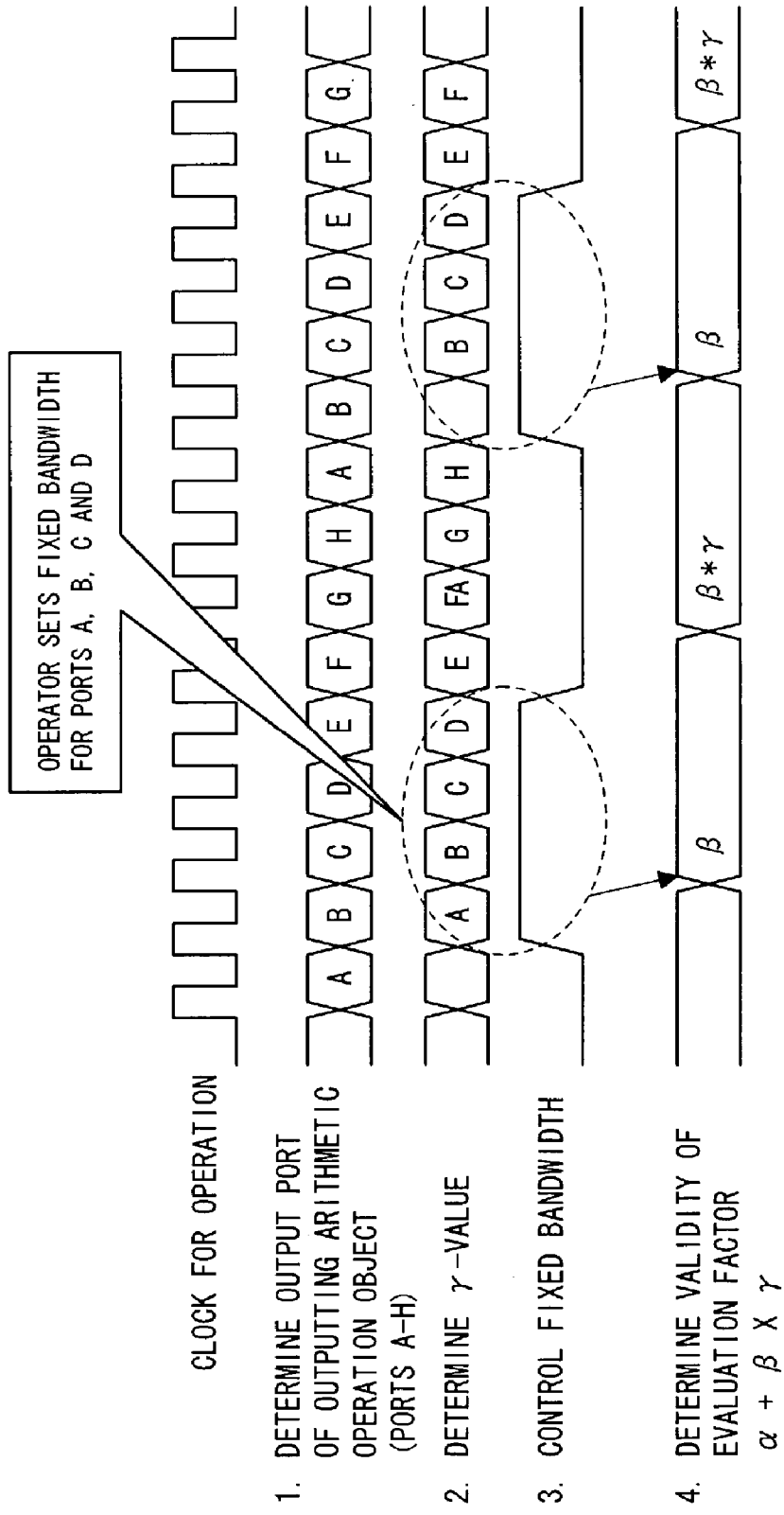
FIG. 36 is a time chart illustrating controlling of WFQ/fixed-bandwidth switching performed by an arithmetic-operation controller of the packet scheduler of FIGS. 2 and 3.

As shown in FIG. 36, if setting information for switching WFQ/fixed-bandwidth queue in relation to output ports A, B, C and D are set to "fixed-bandwidth queues" in setting register 556, selector 553 selects the fixed γ value 1 when arithmetic-operation controller 52 designates output ports A, B, C and D as arithmetic-operation-object ports and, on the other hand, selector 553 selects a γ value that is a result of re-computing by γ-arithmetic operator 54 when an output port except output ports A, B, C and D is designated as an arithmetic-object port.

Multiplier 554 of FIG. 4 obtains the term β×γ of WFQ arithmetic formula (4) by multiplying an output of selector 553 and an interim variable β read from leading-positions packets memory 53. Adder 555 adds β×γ obtained by multiplier 554 to α value selected by α selecting logic 551 in order to obtain an evaluation factor Fi ($\alpha+\beta\times\gamma$) derived by WFQ arithmetic formula (4).

An interim variable β ($L_i/\phi_i$) is defined in terms of a packet length Li and a bandwidth $\phi_i$ set for queue #j–k. Assuming that a set bandwidth $\phi_i$ does not change with the passage of time, the interim variable β need not be re-computed each time an instruction to dequeue is issued. For this reason, pre-processor 51 computes an interim variable β that is common to queues #j–k of each of output ports #j in advance. The computed interim variable β for queues #j–k of each of output ports #j is retained in leading-positions packets memory 53 together with schedule parameters (packet arrival time Ti, packet length Li) of top packets on each queue #j–k of the identical output port #j so as to be read at an identical time slot to those for the schedule parameters.

Figure 8:
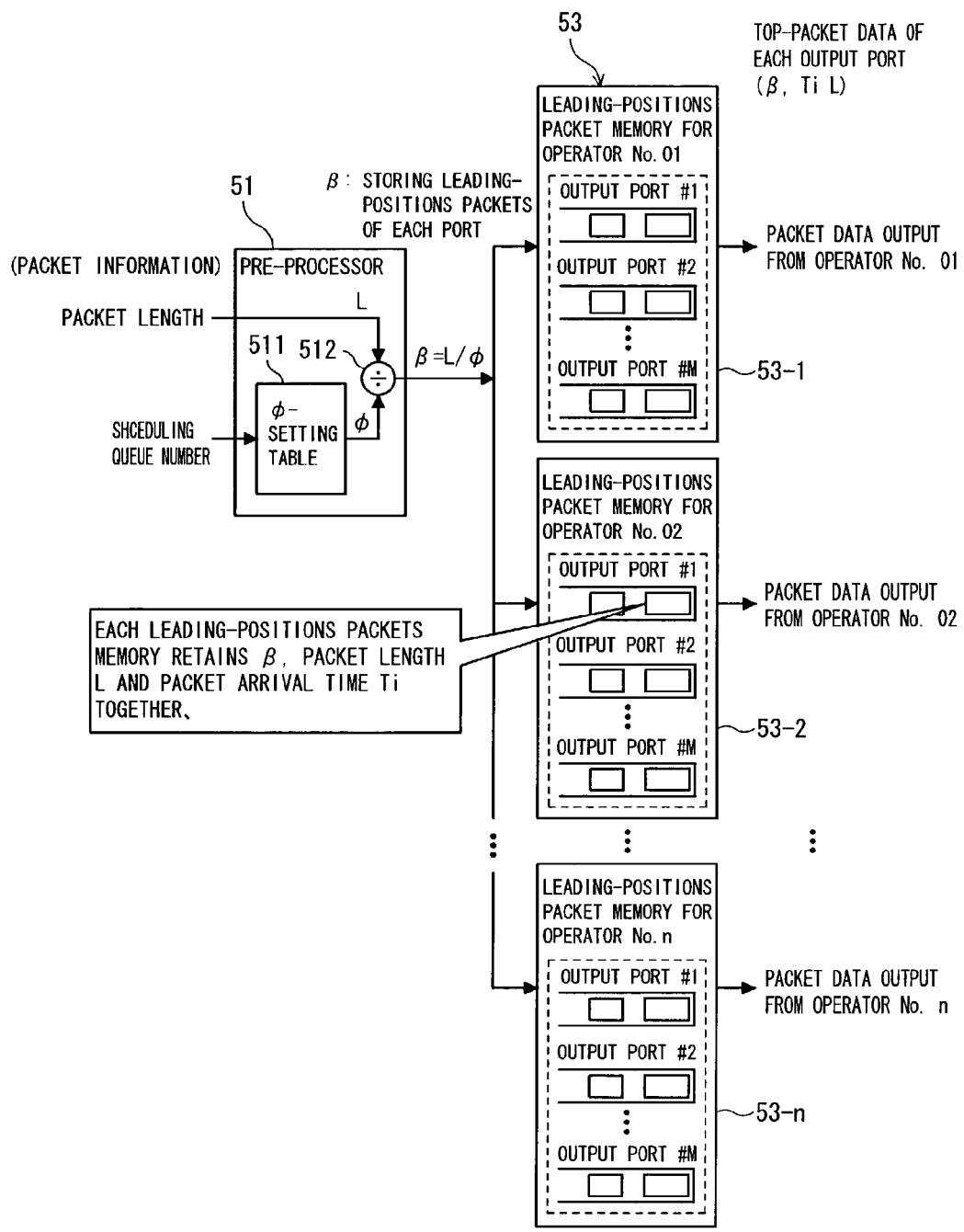
FIG. 8 is a block diagram schematically showing a pre-processor and a leading-positions packet memory of the packet scheduler of FIGS. 2 and 3.

Specifically, leading-positions packets memory 53 is formed by operator's leading-position packets memories 53-1 through 53-$n$, each retains packets of the leading positions on the corresponding one of queues #j–k of the individual output ports #j, as shown in FIG. 8. A bandwidth $\phi$i set for an object queue #j–k is read from $\phi$-setting table 511 of pre-processor 51, which table retains bandwidths set for queues #j–k in advance, using an address in the form of the queue number notified by queue manager 4. The interim variable $\beta$ is obtained by dividing the read bandwidth $\phi$i by packet length Li that is also notified by queue manager 4 in divider 512, and is retained in operator's leading-position packets memories 53-$k$ as the interim variable for top packets of queues #j–k of identical output ports #j. The computing of an interim variable $\beta$ that is common to queues of the same output ports #j in pre-processor 51 can realize the reduction in size of scheduler 5.

Figure 9:
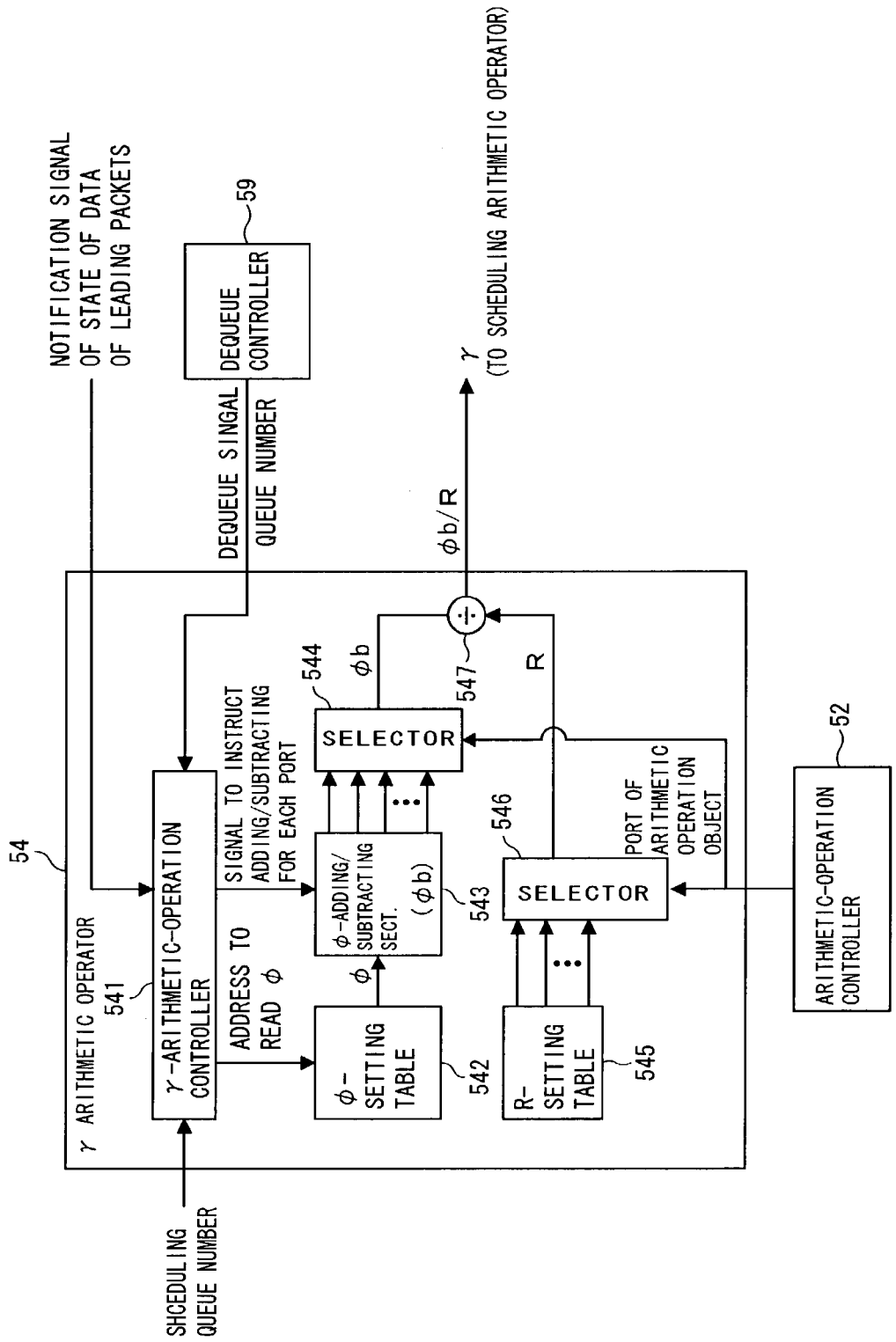
FIG. 9 is a block diagram schematically showing a γ-arithmetic operating section of the packet scheduler of FIGS. 2 and 3.
Figure 10:
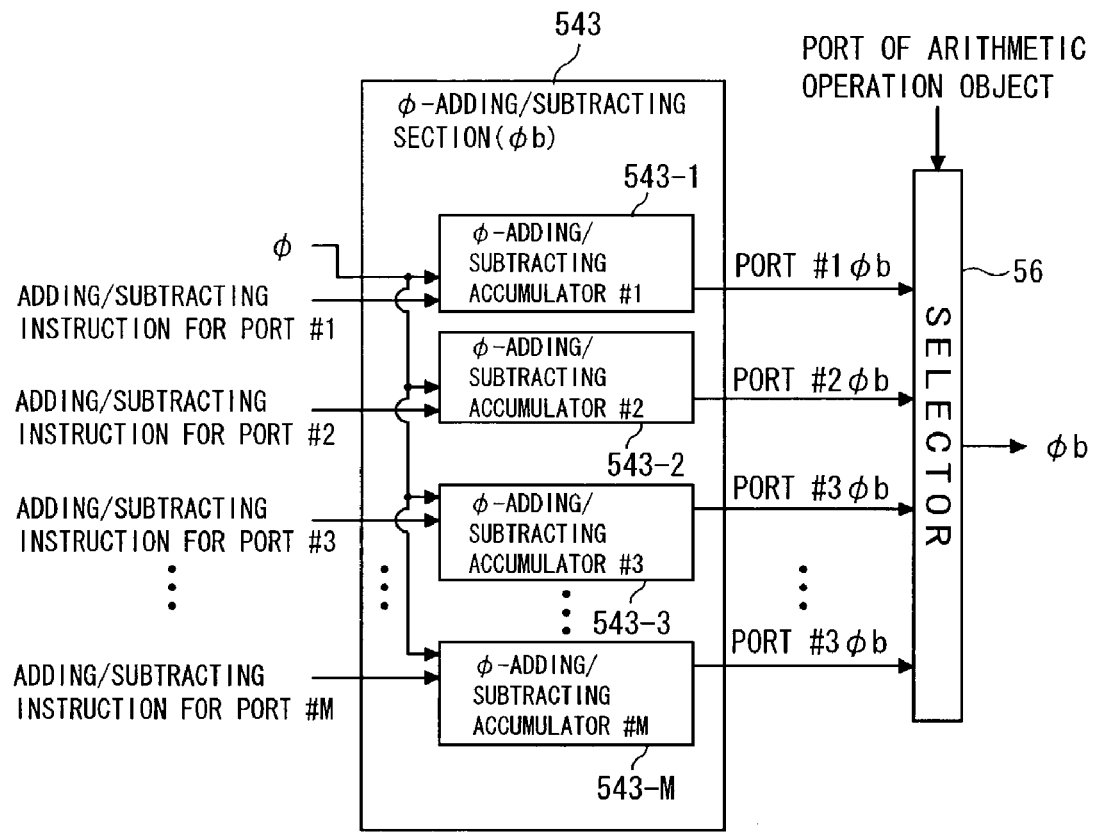
FIG. 10 is a block diagram schematically showing a φ-adder/subtracter of FIG. 9.
Figure 11:
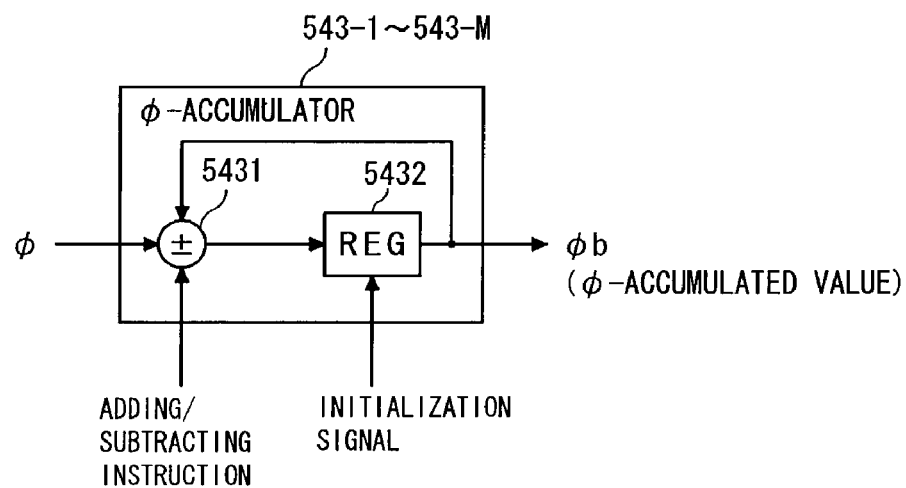
FIG. 11 is a block diagram schematically showing a φ-accumulator of FIG. 10.

$\gamma$-arithmetic operator (a bandwidth distribution rate computing section) 54 of FIGS. 2 and 4 obtains a $\gamma$ value for WFQ arithmetic formula (4). In the present embodiment, an obtained $\gamma$ value is used for arithmetic operations in individual operators 55-$k$ for queues #j–k (#j–1 through #j–n) for the individual output port #j at the same time. As shown in FIG. 9, $\gamma$-arithmetic operator 54 includes $\gamma$-arithmetic-operation controller 541, $\phi$-setting table 542, $\phi$-adding/subtracting section 543, selector 544, R-setting table 545, selector 546 and divider 547.

$\phi$-setting table 542 retains bandwidths $\phi$i, set for queues #j–k. $\phi$-adding/subtracting section 543 performs addition or subtraction on $\phi$i read from $\phi$-setting table 542 and a total bandwidth $\phi$b (the total bandwidth of those of active queues) for an individual output port (hereinafter also simply called "port") #j in accordance with a signal to instruct adding/subtracting. For this purpose, $\phi$-adding/subtracting section 543 includes accumulators 543-1 through 543-M, each having adder/subtructer 5431 and register 5432, for each port #j.

Selector 544 selects and outputs a total bandwidth $\phi$b obtained by $\phi$-adding/subtracting section 543 (accumulator 543-$j$) for port #j, which arithmetic-operation controller 52 has been determined as an arithmetic-operation-object port when allocation of time slots is carried out. R-setting table 545 retains bandwidths R set for the individual output ports #j (i.e., bandwidth R is the total bandwidth of bandwidths set for queues #j–k for each port #j). Selector 546, similar to selector 544, selects and outputs a bandwidth R set for output port #j that arithmetic-operation controller 52 has been determined as an arithmetic-operation-object port when allocation of time slots is carried out.

Divider 547 divides a total bandwidth $\phi$b selected by selector 544 by a bandwidth R selected by selector 546 thereby obtaining a $\gamma$ value. The obtained $\gamma$ value is input, as a rate of distribution of a bandwidth recomputed considering the unused bandwidth of each void (non-active) queue of an individual port #j, to operators 55-$k$. WFQ arithmetic operations represented by formula (4) are performed using the obtained $\gamma$ value (a recomputed distribution rate) for all queues #j–k of the arithmetic-operation-object port #j in order to obtain evaluation factors $F_i$ of top packets on queues #j–k at the same time.

Each time when an instruction to enqueue or dequeue a packet in relation to queue #j–k, $\gamma$-arithmetic-operation controller 541 determines whether or not one or more packets are present in the queue #j–k (i.e., discriminates whether the queue #j–k is active or non-active) and outputs a signal to instruct adding/subtracting for each output port #j to $\phi$-adding/subtracting section 543 as shown in flow diagram FIG. 12. Where upon $\gamma$-arithmetic-operation controller 541 updates a total bandwidth $\phi$b (the total bandwidth of those of active queues) in accordance with the number of active queues of each output port #j each time when an enqueue/dequeue instruction is issued.

The presence or the absence of a packet in each queue #j–k is discriminated not by a packet-number counter (not shown) installed in queue manager 4 but by the presence or the absence of packets (actually, parameters of packets) at leading-positions packets memory 53 (53-$k$) in the illustrated embodiment. Because queue manager 4 manages several packets on sequential leading positions including top packet on each queue as shown in FIGS. 25 through 30 so that leading-positions packets memory 53 always retains packets, it is possible to discriminate the presence or the absence of a packet for each queue by checking leading-positions packets memory 53.

$\gamma$-arithmetic-operation controller 541 monitors whether or not a packet is input to scheduler 5 (Step S1 of FIG. 12) and at the same time monitors whether or not dequeue controller 59 issues an instruction to dequeue a packet (Step S6). For example, scheduler 5 receives a queue number (Yes judgment in Step S1), scheduler 5 provides $\phi$-setting table 542 with an address to read $\phi$i. Then the bandwidth $\phi$i set for the queue #j–k of an arithmetic-operation object is read (Step S2).

$\gamma$-arithmetic-operation controller 541 checks whether or not leading-positions packets memory 53 (53-$k$) corresponding to the object queue #j–k is void (Step S3). If leading-positions packets memory 53 (53-$k$) is void (Yes judgment in Step S3), $\gamma$-arithmetic-operation controller 541 further discriminates whether or not dequeue controller 59 issues an instruction to dequeue a packet from the object queue #j–k (Step S4). If the result of the discrimination is negative (No judgment in Step S4), an instruction to enqueue a packet on the object queue #j–k is issued whereupon $\gamma$-arithmetic-operation controller 541 instruct adder/subtracter 5431 of accumulator 543-$j$ corresponding to the output port #j of which the instruction to enqueue is issued for the queue #j–k to add the bandwidth $\phi$i so that the bandwidth $\phi$i read from $\phi$-setting table 542 is added to the total bandwidth $\phi$b retained in register 5432 (Step S5).

If no packet is input to scheduler 5 (No route in Step S1) or leading-positions packets memory 53 (53-$k$) corresponding to the object queue #j–k is not void (No route in Step S3), $\gamma$-arithmetic-operation controller 541 continues monitoring inputting of a packet to scheduler 5 and issuing of a dequeue instruction. Further, if an instruction to enqueue a packet on the object queue #j–k is issued at the same time when issuing of an instruction to dequeue a packet from the same object queue #j–k (Yes route in Step S4), $\gamma$-arithmetic-operation controller 541 continues the monitoring because the number of packets on the object queue #j–k does not change.

Meanwhile, dequeue controller 59 issues an instruction to dequeue (Yes route in Step S6), $\gamma$-arithmetic-operation controller 541 reads the bandwidth $\phi$i set for the object queue #j–k corresponding to the input queue number in the instruction to dequeue (Step S7) in the same manner as Step S2 and checks whether or not leading-positions packets memory 53 (53-$k$) corresponding to the input queue number retains one packet (Step S8).

If the result of the checking is positive (Yes judgment in Step S8), γ-arithmetic-operation controller 541 further discriminates whether or not an instruction to enqueue a packet on the same object queue #j–k at the same time (Step S9). When the result of the discriminating is negative (No judgment in Step S9), γ-arithmetic-operation controller 541 instruct adder/subtracter 5431 of accumulator 543-j corresponding to the output port #j of which the instruction to enqueue is issued for the queue #j–k to subtract the bandwidth φi so that the bandwidth φi read from φ-setting table 542 is subtracted from the total bandwidth φb retained in register 5432 (Step S10).

Also in this case, if an instruction to dequeue is not issued (No route in Step S6) or leading-positions packets memory 53 (53-k) corresponding to the object queue #j–k retains two or more packets (No route in Step S8), γ-arithmetic-operation controller 541 continues the monitoring. Further, if an instruction to dequeue a packet from the object queue #j–k is issued at the same time an instruction to enqueue a packet on the same queue #j–k (Yes route in Step S9), γ-arithmetic-operation controller 541 continues the monitoring because the number of packets on the object queue #j–k does not change.

As mentioned above, in γ-arithmetic operator 54, each time when an instruction of enqueue or dequeue of a packet is issued on the basis of the queue number in the instruction, the bandwidth φi of the object queue #j–k in question is read from φ-setting table 542 and the total bandwidth φb of the object queue #j–k is updated using the read bandwidth φi. The updated total bandwidth φb is used to re-compute a γ value. The re-computed γ value is input to operators 55-k so that the re-computed γ value is reflected on evaluation factors Fi for top packets of queues #j–k of the same output port #j at the same time.

The computing of a γ value (are-computed distribution rate) that is common to queues of a same output port #j can realizes the reduction in size of scheduler 5.

Intra-port selector 56 selects the minimum evaluation factor (that is to be most-preferentially output) from evaluation factors $F_1$ through $F_n$ obtained by operators 55-1 through 55-n. As an example of FIG. 13, arrival times of the top packets of queues a, b, c and d are assumed to be respectively Tai, Tbj, Tck and Tdm (Tai<Tbj<Tck<Tdm), and evaluation factors (output completion due times) of the previous packets of queues a, b, c and d are assumed to be respectively Fai–1 (<Tai), Fbj–1 (<Tbj), Fck–1 (<Tck) and Fdk–1 (>Tdk).

Since arrival times of queues a, b and c are later (larger) than output completion times of the previous packets (Fai–1<Tai, Fbj–1<Tbj and Fck–1<Tck). Tai, Tbj and Tck are selected as α values respectively for queues a, b and c. On the contrary, arrival time of queue d is earlier than output completion due time of the previous packet (Fdk–1>Tdk), the output completion due time Fdk–1 of the previous packet for queue d is selected as an α value. As a result, output completion due time Fai, Fbj, Fck and Fdm (Fai<Fbj<Fck<Fdm) of the current packets for queues a, b, c and d are obtained in operators 55-k.

Figure 13:
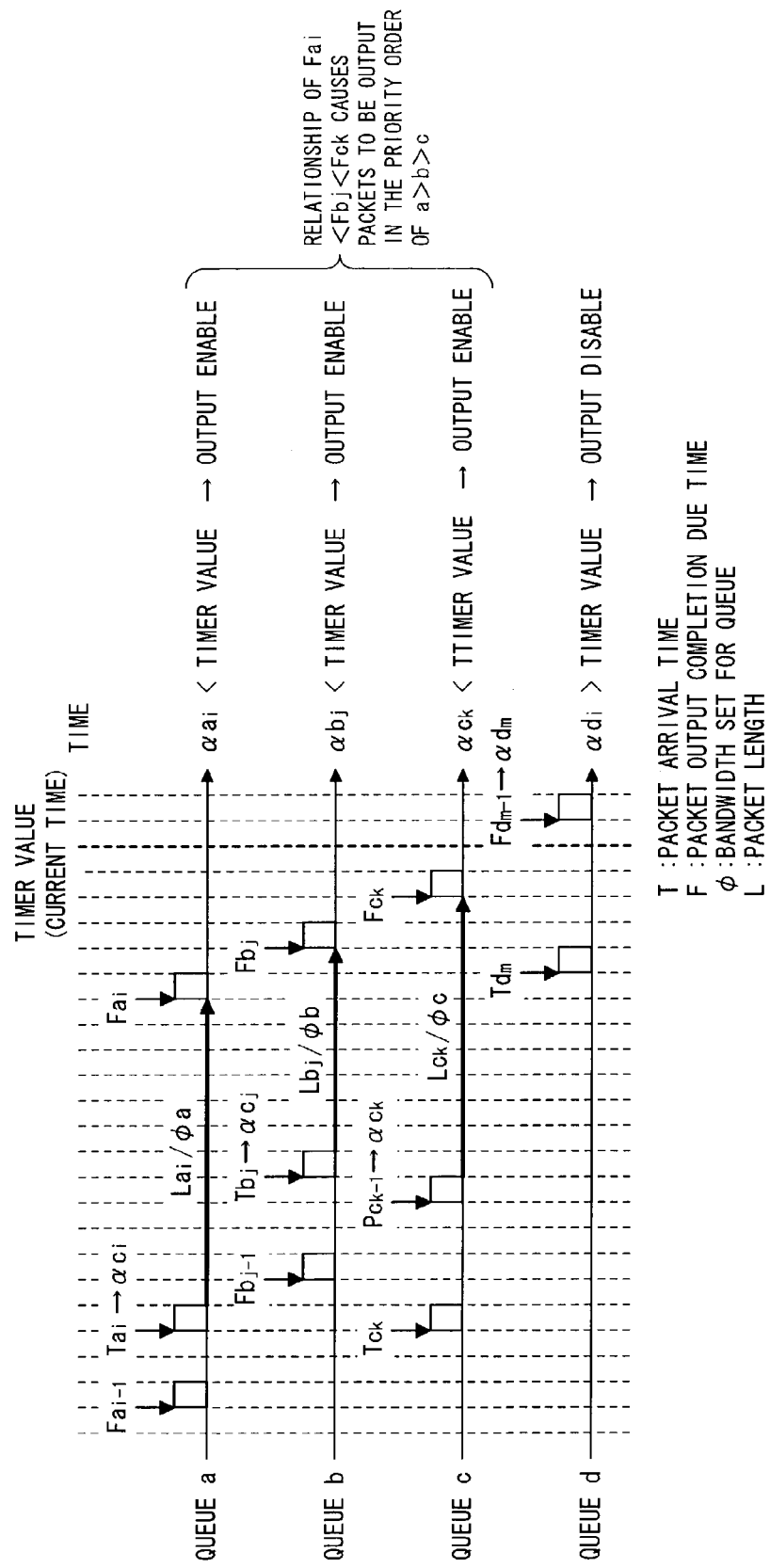
FIG. 13 is a diagram showing an intra-port packet outputting operation performed by an intra-port selecting section of the packet scheduler of FIGS. 2 and 3.

In this example of FIG. 13, output of packets is carried out in order from queues a, b, c and d. However, since the α value for queue d is larger than the value of timer 60 (i.e., α<Timer value), output of a packet from queue d is not permitted. Namely, a preferentially output packet is selected from the top packet of queues a, b and c, the relationship of Fai<Fbj<Fck causes the top packets to be output in order from queue a, b and c.

Algorithm for the selection performed at intra-port selector 56 is identical with that for later-described inter-port selector 58 shown in FIGS. 20A and 20B.

Figure 14:
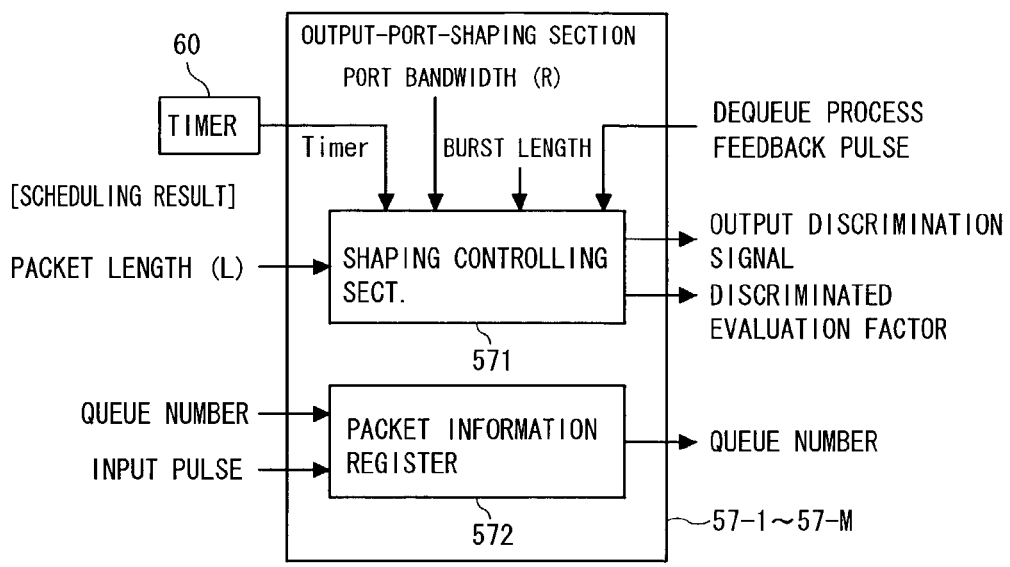
FIG. 14 is a block diagram schematically showing an output-port shaping circuit of the packet scheduler of FIGS. 2 and 3.
Figure 15:
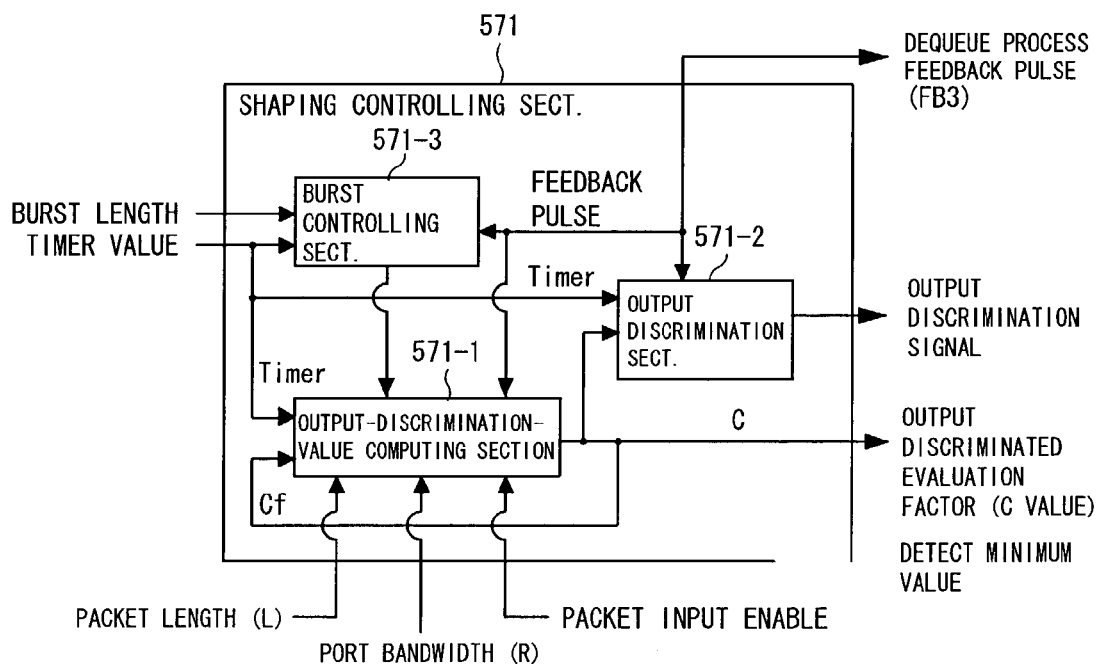
FIG. 15 is a block diagram schematically showing a shaping control section carried out by the shaping circuit of FIG. 14.

Each of output-port shaping circuits 57-1 through 57-M in shaping section 57 buffers an evaluation factor F of the output port #j corresponding to each circuit, which factor is selected by intra-port selector 56, for shaping operation in accordance with the bandwidth set for the output port #j. In the present embodiment, each output-port shaping circuit 57-j includes shaping controlling section 571 and packet information register 572, as shown in FIG. 14. Shaping controlling section 571 further includes, as shown in FIG. 15, output-discrimination-value computing section 571-1, output discrimination section 571-2 and burst controlling section 571-3.

Shaping controlling section 571 performs shaping control in accordance with the bandwidth set for each output port #j. Packet information register 572 retains scheduling results (evaluation factors F) of the top packets on queues #j–k of the same output port #j.

When dequeue controller 59 issues an instruction to dequeue for output port #j, shaping controlling section 571 performs an arithmetic operation using the following formula (6) to obtain an output discrimination value $C_i$ (evaluation factor F corrected).

$$C_i = SEL\{C_{i-1}, \text{Timer}\} + \left(\frac{L_i}{R}\right) \quad (6)$$

In this formula, $C_i$ denotes a packet output completion due time; $C_{i-1}$, a previous-packet output completion due time; $SEL\{C_{i-1}, \text{Timer}\}$ represents either one of $C_{i-1}$ and a Timer value; Li denotes the length of the packet to be dequeued; and R, the bandwidth set for the output port.

Figure 16:
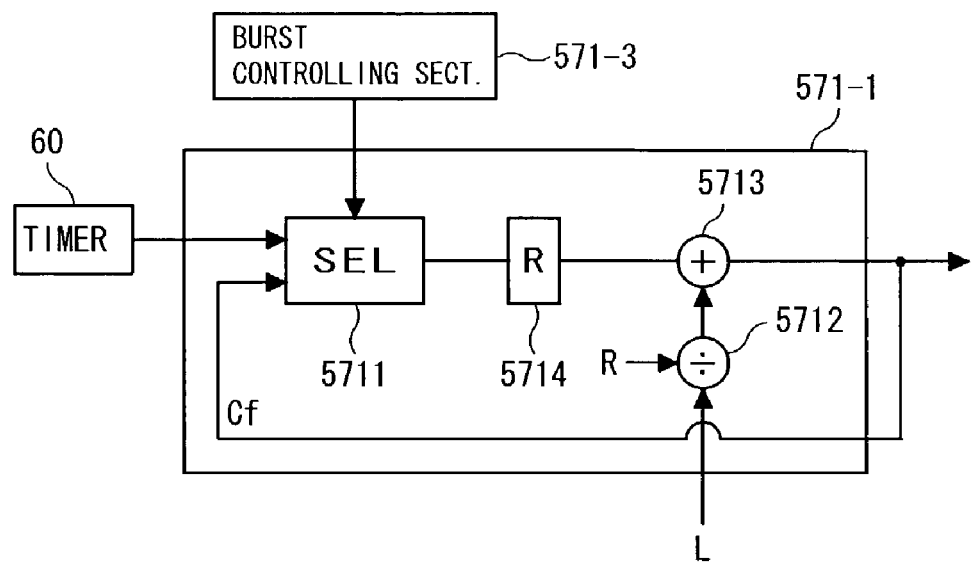
FIG. 16 is a block diagram schematically showing an output-discrimination-value computing section of FIG. 15.

Output-discrimination-value computing section 571-1 includes, as shown in FIG. 16, selector 5711, divider 5712, adder 5713 and register (R) 5714. Selector 5711 performs an arithmetic operation in relation to the first term $SEL\{C_{i-1}, \text{Timer}\}$ of formula (6); divider 5712, the second term Li/R; and adder 5713 performs the addition between the first and the second terms. Register 5714 latches an output from selector 5711.

When an output discrimination value $C_i$ becomes smaller than a Timer value (i.e., $C_i$<Timer value), output discrimination section 571-2 asserts an output discrimination signal (permission) for the subsequent (next) packet. An output discrimination value $C_i$ which is not allowed to be output by an output discrimination signal (the value is disable) is excluded from objects for a future selection of the minimum output discrimination value $C_i$ by inter-port selector 58. An output discrimination value $C_i$ is determined to be disabled when the corresponding queue has no packets to output or dequeue controller 59 issues a feedback output (a mask-instruction signal), which is described later.

Figure 17:
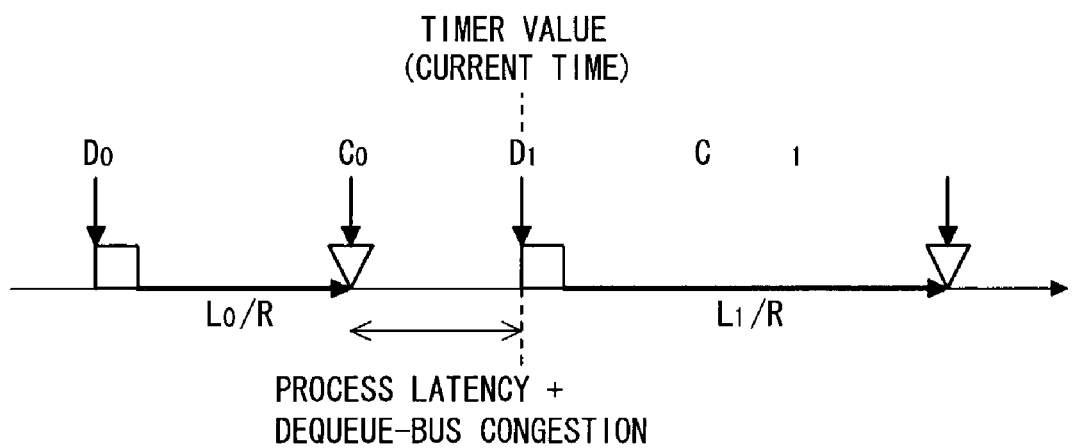
FIG. 17 is a diagram showing the principle of processes of output-port shaping carried out by the output-port shaping circuit of FIG. 14.

FIG. 17 shows the principle of processes of output-port shaping. When a dequeue instruction is issued for a top packet (having packet number 0), shaping controlling section 571, first of all, computes an output discrimination value $C_0$ using the following formula (7).

$$C_0 = D_0 + \left(\frac{L_i}{R}\right) \quad (7)$$

Here, the previous packet of the packet number "0" is assumed to be invalid or selector 5711 is assumed to have selected a Timer value $D_0$ at the time of the dequeue as the first term (i.e., SEL{$C_{i-1}$, Timer}) of formula (6) due to a burst control by burst controlling section 571-3.

When the value (current time) of timer 60 is smaller than the output discrimination value $C_0$, the subsequent packet is not allowed to be output (an output discrimination flag for output port #j in question indicates "invalid") even if the subsequent packet is buffered by output-port shaping circuit 57-j (in packet information register 572). As shown in FIG. 17, the subsequent packet is allowed to be output (an output discrimination flag for output port #j in question indicates "valid") under the condition of the Timer value being equal to or larger than the output discrimination value $C_0$.

Selection for a packet that is to be most-preferentially output is carried out by considering an output discrimination flag of each output port#j in accordance with bandwidth set. As a result, since inter-port selector 58 dequeues a packet having the nearest output completion due time of the previous packet, it is possible to equally control a bandwidth of which packets are output for each output port #j with ease. Further, inter-port selector 58 can be simplified.

When the difference (D–C) between an output discriminating value and actual dequeue processing time becomes large due to latency for processes and congestion of the dequeue bus, output of subsequent packets causes bursts in the dequeue bus, which may result in further congestion of the dequeue bus and a breakdown of process in frame memory 2.

Figure 18:
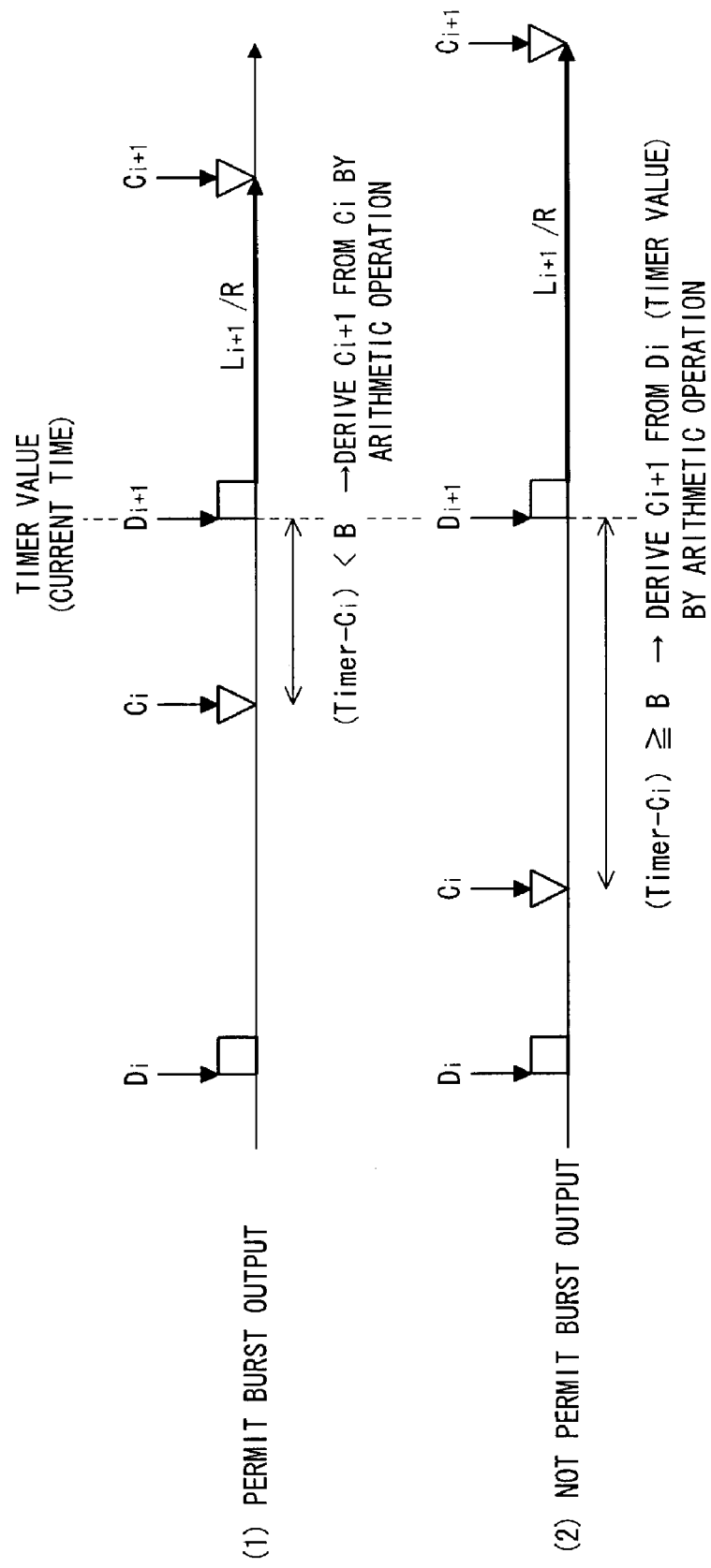
FIG. 18 is a diagram showing the principle of processes of output-port shaping and burst controlling carried out by the output-port shaping circuit of FIG. 14.

In order to avoid a burst of output, the present invention installs burst controlling section 571-3 of FIG. 15 which controls a burst of output by monitoring the difference (D–C) between an output discriminating value and actual dequeue processing time, when the controlling of the bandwidth of each output port is performed by the shaping controlling section 571. FIG. 18 shows the principle of processes of burst controlling. In the accompanying drawing, B represents the burst threshold value permissible for burst output, which value is set in each output-port shaping circuit 57-j.

If the difference of a Timer value C and an output discrimination value is smaller than B (<B) when issuing an instruction to dequeue as shown in (1) of FIG. 18, $C_{i-1}$ is selected in the first term SEL{$C_{i-1}$, Timer} in formula (7) whereupon burst output of one or more subsequent packets is permitted.

On the other hand, if the difference of a Timer value C and an output discrimination value is equal to or larger than B ($\geq$B) when issuing an instruction to dequeue as shown in (2) of FIG. 18, timer value is selected in the first term SEL{$C_{i-1}$, Timer} in formula (7) whereupon burst output of the one or more subsequent packets is not permitted.

Such a burst control for each output port #j equally controls the bandwidths of individual queues #j–k of the output port #j thereby effectively avoiding overflowing of packets of the output port #j caused by issuing of instructions to dequeue.

Inter-port selector 58 of FIGS. 2 and 3 selects an output port #j having the smallest output discrimination value of output port #j based on output discrimination flags and output discrimination values $C_i$ of output ports #1 through #M, which flags and values are received from shaping section 57. Inter-port selector 58 outputs the selected discrimination value of the queue #j–k of the output port #j, which queue has been selected by intra-port selector 56, to dequeue controller 59.

FIG. 19 shows the principle of selection performed by inter-port selector 58. In FIG. 19, the states of output discrimination flags of output ports A, B and C which states are in shaping section 57 at the current time (Timer value) are enable ("valid") because each output completion due time C is smaller than the Timer value (C<Timer); on the other hand, the state of an output discrimination flag of output port D at the current time is disable ("invalid") because its output completion due time C is equal to or larger than the Timer value (C$\geq$Timer).

On the basis of the states of each output discrimination value, inter-port selector 58 selects one output port #j that is to be output to dequeue controller 59 from output ports A, B and C except port D. The relationship among output completion due times $C_{ai}$, $C_{bj}$, and $C_{ck}$ with respect to output ports A, B, and C is $C_{bj}$>$C_{ai}$>$C_{ck}$. However, output completion due time $C_{ck}$ of output port C is invalid because the difference between Timer value and output discrimination value of output port C is equal to or larger than the burst threshold value B. Therefore, the time $S_{ck+1}$ of inputting a packet of output port C in shaping section 57 is used as a substitution for $C_{ck}$.

The relationship of $C_{bj}$>$C_{ck+1}$>$C_{ai}$ makes inter-port selector 58 output packets to dequeue controller 59 in order of output port A, C and then B. The combination of shaping section 57 and inter-port selector 58 serves to function as inter-port selecting means to retain the evaluation factor of the top packet that is to be preferentially output from each output port #j, which factor has been selected by intra-port selector 56, and to select one output port from which an enqueued packet is to be most-preferentially output from apparatus 1 for controlling packet output based on the evaluation factors retained therein and on a bandwidth for each of the output ports.

FIG. 20B shows the description of the algorithm of the selection performed by inter-port selector 58 in C language or the like. The arithmetic operation indicated by the selection algorithm of FIG. 20B is executed based on output discrimination values (Sa, Sb, Sc, Sd) for four output ports and their discrimination flags (Valid_Sa, Valid_Sb, Valid_Sc, Valid_Sd) in the same manner as that of FIG. 20A.

Figure 21:
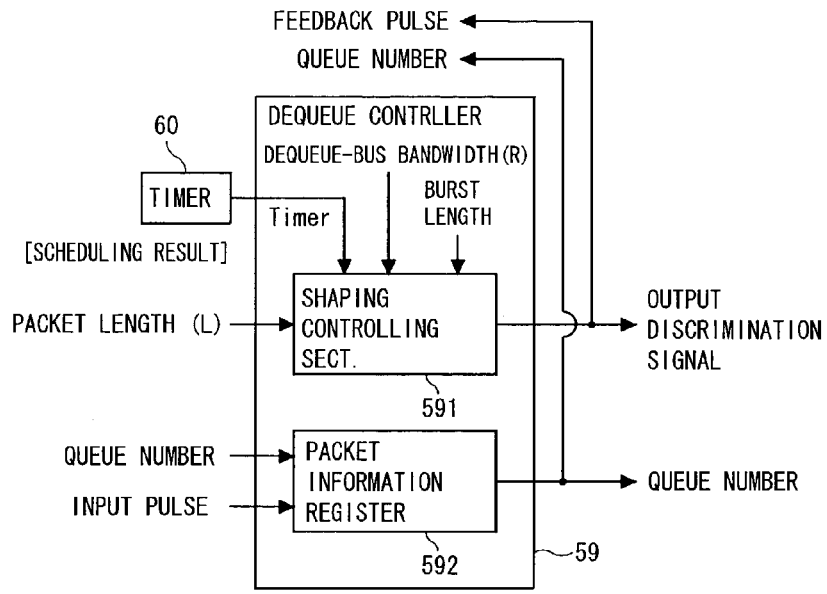
FIG. 21 is a block diagram schematically showing a dequeue controller of the packet scheduler of FIG. 2.

Dequeue controller 59 of FIG. 2 buffers an output from inter-port selector 58 to perform a shaping operation in accordance with the bandwidth of the dequeue bus, through which packets are to be output from apparatus 1 for controlling packet output. Dequeue controller 59 is identical in configuration with those of output-port shaping circuit 57-j (see FIGS. 14 and 15). For example, as shown in FIG. 21, dequeue controller 59 includes shaping controlling section (a dequeue-bus-shaping controlling section) 591 to control a shaping operation of the bandwidth of each output port based on the bandwidth for the dequeue bus and packet information register 592 to retain the result of selection by inter-port selector 58.

Figure 22:
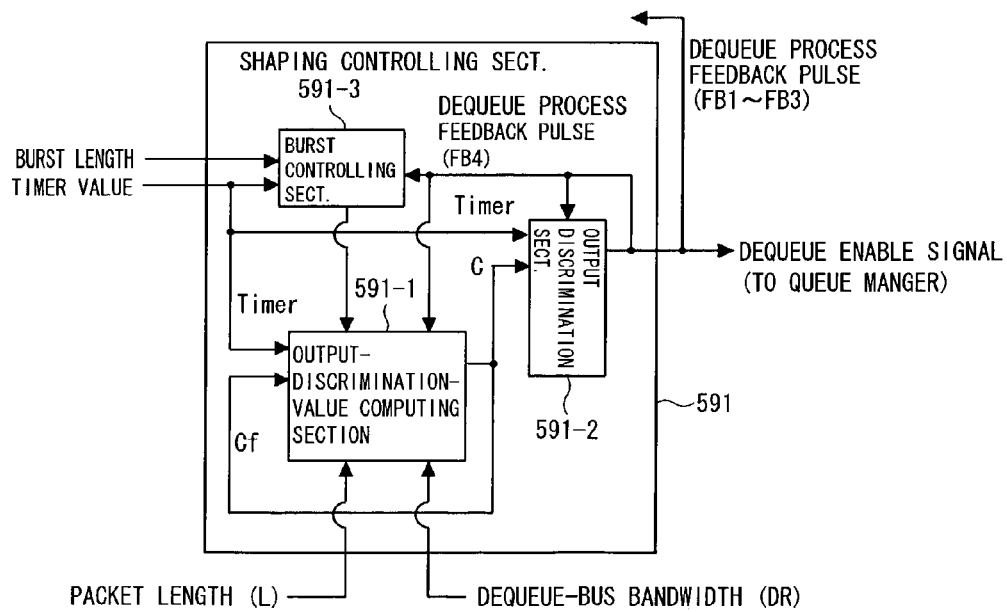
FIG. 22 is a block diagram schematically showing a shaping controller of the dequeue controller of FIG. 21.

Further, shaping controlling section 591 has output-discrimination-value computing logic 591-1, output discrimination section 591-2 and burst controlling section (dequeue-bus-burst controlling section) 591-3, as shown in FIG. 22.

Output-discrimination-value computing logic 591-1 of shaping controlling section 591 performs an arithmetic operation indicated by the following formula (8) to obtain an output discrimination value each time output discrimination section 591-2 asserts that dequeuing a packet is enabled.

$$C_i = SEL\{C_{i-1}, \text{Timer}\} + \left(\frac{L_i}{DR}\right) \quad (8)$$

In this formula (8), $C_i$ represents an output completion due time of a current packet; $C_{i-1}$, an output completion due time of a previous packet; SEL$\{C_{i-1}, \text{Timer}\}$, either one of $C_{i-1}$, and a Timer value; Li, the length of a packet to be dequeued; and DR, a bandwidth set for the dequeue bus.

If the result $C_i$ of the arithmetic operation by output-discrimination-value computing logic 591-1 is smaller than the value of timer 60 ($C_i$<Timer), output discrimination section 591-2 asserts a signal to permit dequeuing of the subsequent packet (dequeue enable signal), in other words, instructs queue manager 4 to dequeue the packet.

Figure 23:
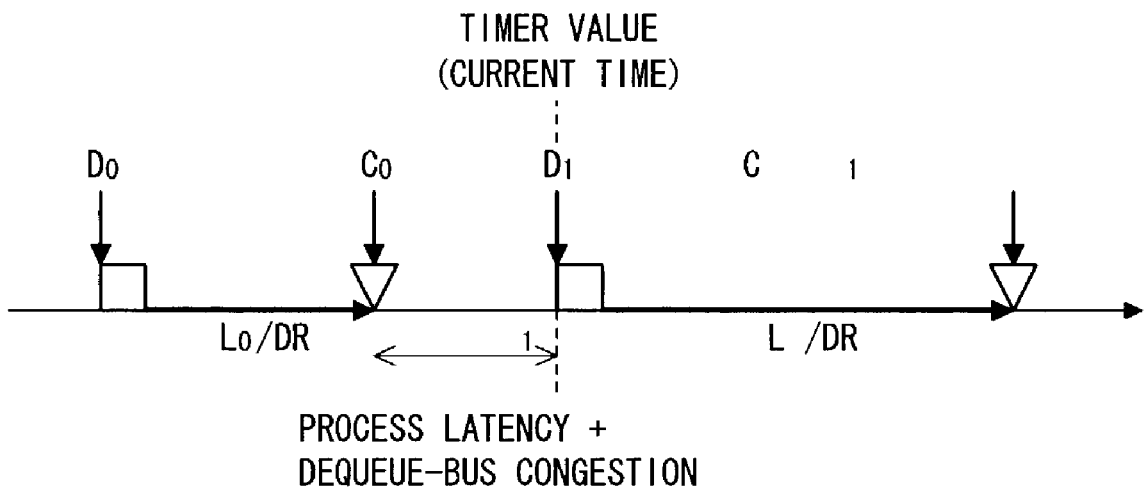
FIG. 23 is a diagram showing the principle of controlling of dequeue-bus shaping performed by the shaping controller of FIGS. 21 and 22.

The combination of output-discrimination-value computing logic 591-1 and output discrimination section 591-2 realizes a shaping operation in accordance with the bandwidth (DR) set for the dequeue bus. FIG. 23 shows the principle of a shaping operation. The shaping operation to be performed in dequeue controller 59 is identical to that in output-port shaping circuit 57-*j*; an arithmetic operation using the following formula (9) is performed when an instruction to dequeue a top packet (whose packet number is "0") is issued.

$$C_0 = D_0 + \left(\frac{L_i}{DR}\right) \quad (9)$$

This case also assumes that the previous packet of the packet with packet number "0" is discriminated to be invalid, or that the value ($D_0$) of Timer at the time when issuing of an instruction to dequeue is selected by a burst control performed by burst controlling section 591-3, which is described later.

If the result $C_0$ of the arithmetic operation using formula (9) is larger than the Timer value (Timer<$C_0$), output discrimination section 591-2 disables a dequeue enable signal so that an instruction to dequeue is not issued. On the other hand, if Timer$\geq C_0$ and packet information register 592 retains data valid at that time, output discrimination section 591-2 assert the dequeue enable signal and notifies queue manager 4 of the number of the packet that is to be dequeued.

The number of the packet to be dequeued is fed back to pre-processor 51, arithmetic-operation controller 52, parallel arithmetic operator 55, shaping section 57 and output-discrimination-value computing logic 591-1 and output discrimination section 591-2 in shaping controlling section 591 in order to update the evaluation factors on the pipeline process (to prevent the same packet from being dequeued more than once).

As mentioned above, dequeue controller 59 performs a shaping operation in accordance with the bandwidth set for the dequeue bus whereupon dequeuing is preferentially carried out on a packet having earlier output completion due time of the previous packet. As a result, it is possible to equally control the bandwidth for each output port in the dequeue bus, and dequeue controller 59 can be simple in construction.

Also in this case, when the difference (D–C) between an output discriminating value and actual dequeue processing time becomes large due to latency for processes and congestion of the dequeue bus, output of subsequent packets comes in bursts in the dequeue bus, which may result in further congestion of the dequeue bus and a breakdown of process in frame memory 2.

Figure 24:
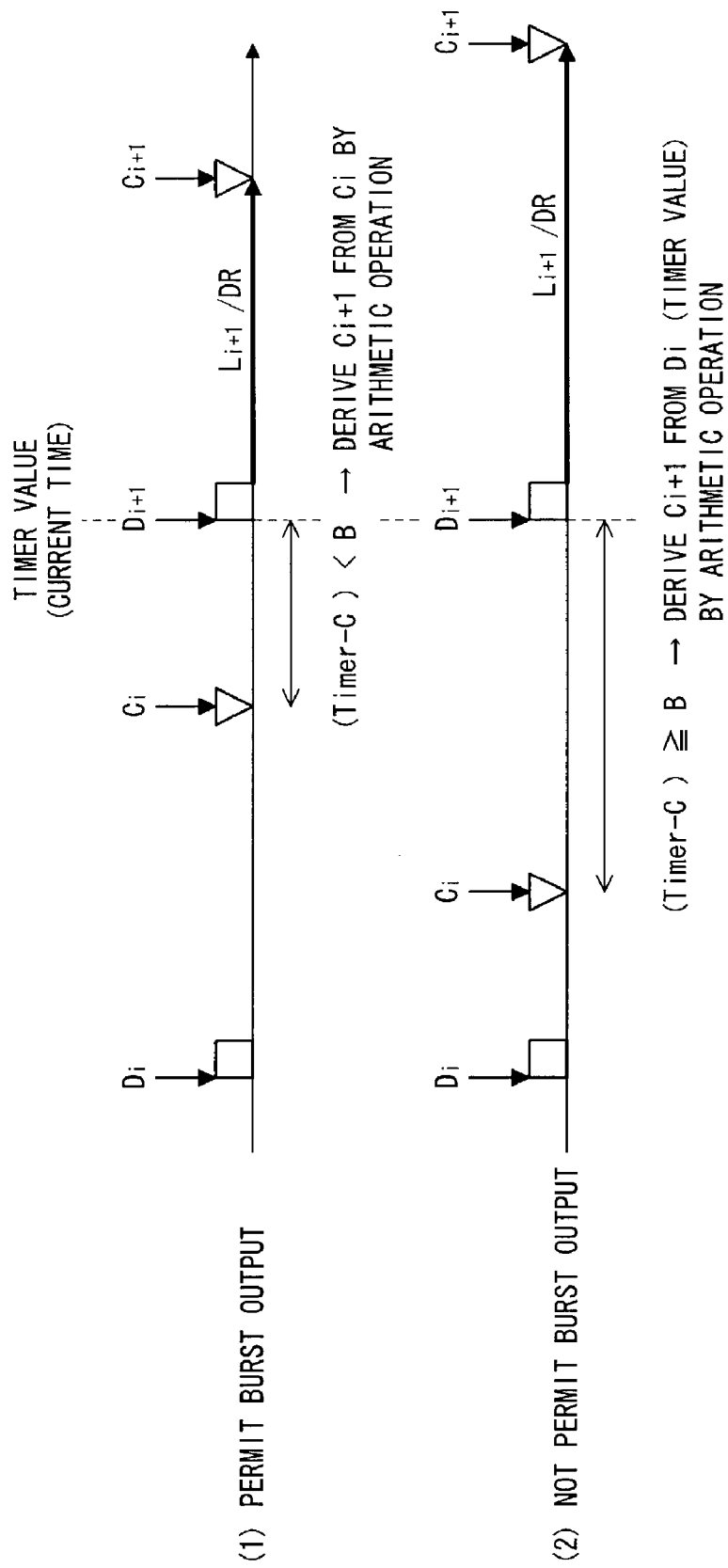
FIG. 24 is a diagram showing the principle of controlling of dequeue-bus burst performed by the shaping controller of FIGS. 21 and 22.

In order to avoid bursts of output, the present invention installs burst controlling section 591-3 of FIG. 22 which controls output bursts by monitoring the difference (D–C) between an output discriminating value and actual dequeue processing time likewise output-port shaping circuit 57-*j*. FIG. 24 shows the principle of processes of burst controlling. In the accompanying drawing, B represents the burst threshold value permissible for burst output.

If the difference of a Timer value and an output discrimination value C is smaller than B (<B) when issuing an instruction to dequeue as shown in (1) of FIG. 24, $C_{i-1}$ is selected in the first term SEL$\{C_{i-1}, \text{Timer}\}$ in formula (9) whereupon burst output of the subsequent packets is permitted.

On the other hand, if the difference of a Timer value and an output discrimination value C is equal to or larger than B ($\geq$B) when issuing an instruction to dequeue as shown in (2) of FIG. 24, Timer value is selected in the first term SEL$\{C_{i-1}, \text{Timer}\}$ in formula (9) whereupon burst output of the one or more subsequent packets is not permitted.

Such a burst control for each output port #j equally controls the bandwidth of the output port #j thereby effectively avoiding overflowing of packets of the output port #j due to issuing of an instruction to dequeue.

Queue management of queue manager 4 will now be described.

Figure 25:
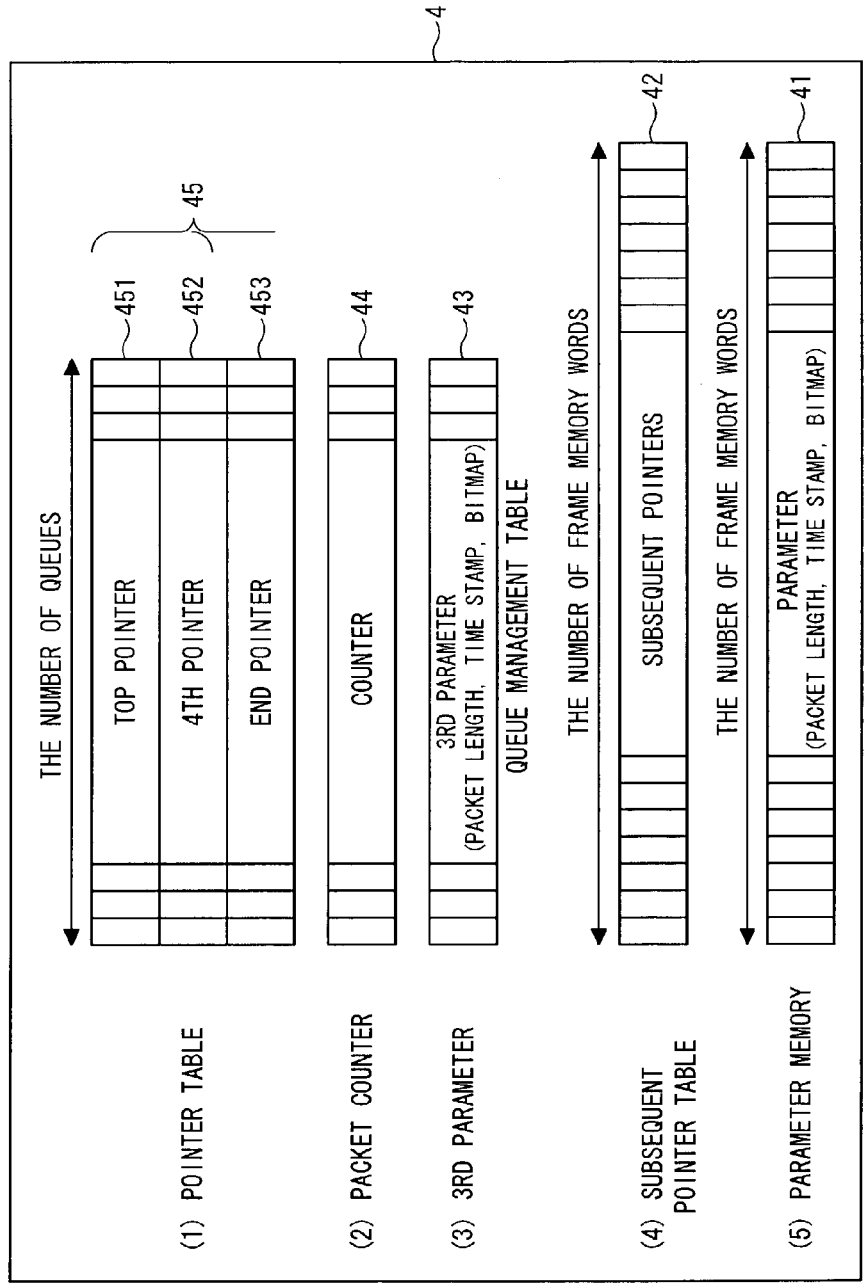
FIG. 25 is a block diagram schematically showing the structure of a memory of a queue manager in the apparatus of FIG. 1.

As shown in FIG. 25, queue manager 4 of the first embodiment comprises parameter memory 41, subsequent pointers table memory 42, 3rd parameter memory 43, packet counter memory 44 and pointer table memory 45.

Parameter memory 41 has a capacity the same as the number of words of frame memory 2 of FIG. 1. Schedule parameters (a packet length, a time stamp (an arrival time), bitmap information, etc.) of the leading packets of queues #j–k of output ports #j input from conversion table 3 of FIG. 1 are stored in parameter memory 41. Bitmap information is required when multicast of a packet is performed likewise in the following modification and therefore can be dispensable if multicast is not performed.

Subsequent pointers table memory 42 also has a capacity same as the number of words of parameter memory 41, and retains pointers indicating the subsequent packets, each for a previous packet whose schedule parameters are on a pointer of parameter memory 41, on a pointer therein as the same pointer of pointer memory 41 in which the schedule parameters of the corresponding previous packet is retained. Therefore, it is possible to obtain schedule parameters of subsequent packets of the queues #j–k from parameter memory 41 by retrieving in the subsequent pointers table memory 42.

3rd parameter memory 43 retains schedule parameters (3rd parameters) of the third-top packets of queues #j–k respectively. Namely, 3rd parameters of each packet are retained in both parameter memory 41 and 3rd parameter memory 43. It is therefore possible to immediately output 3rd parameters based on the address of the number of the object queue without retrieving in subsequent pointers table memory 42.

Packet counter memory 44 retains the number of packets enqueued on the individual queues #j–k. Pointer table memory 45 is in the combination of top pointer memory 451, 4th pointer memory 452 and end pointer memory 453, and retains pointers indicating the positions in parameter memory 41 which positions retain the top packet, the 4th packet and the end packet of the individual queues #j-k are retained. By referring to the address allocated to the number of the individual queue, it is possible to retrieve each of the top, 4th and end packets of the individual queues #j-k.

For example, a queue #j-k has seven packets a, b, c, d, e, f and g, with packet a on the top position (i.e. in order of a, b, c, d, e, f and g). The data linkage structure of pointers retained in parameter memory 41, subsequent pointer table memory 42, 3rd parameter memory 43, packet counter memory 44 and pointer table memory 45 is shown in FIG. 26.

Figure 26:
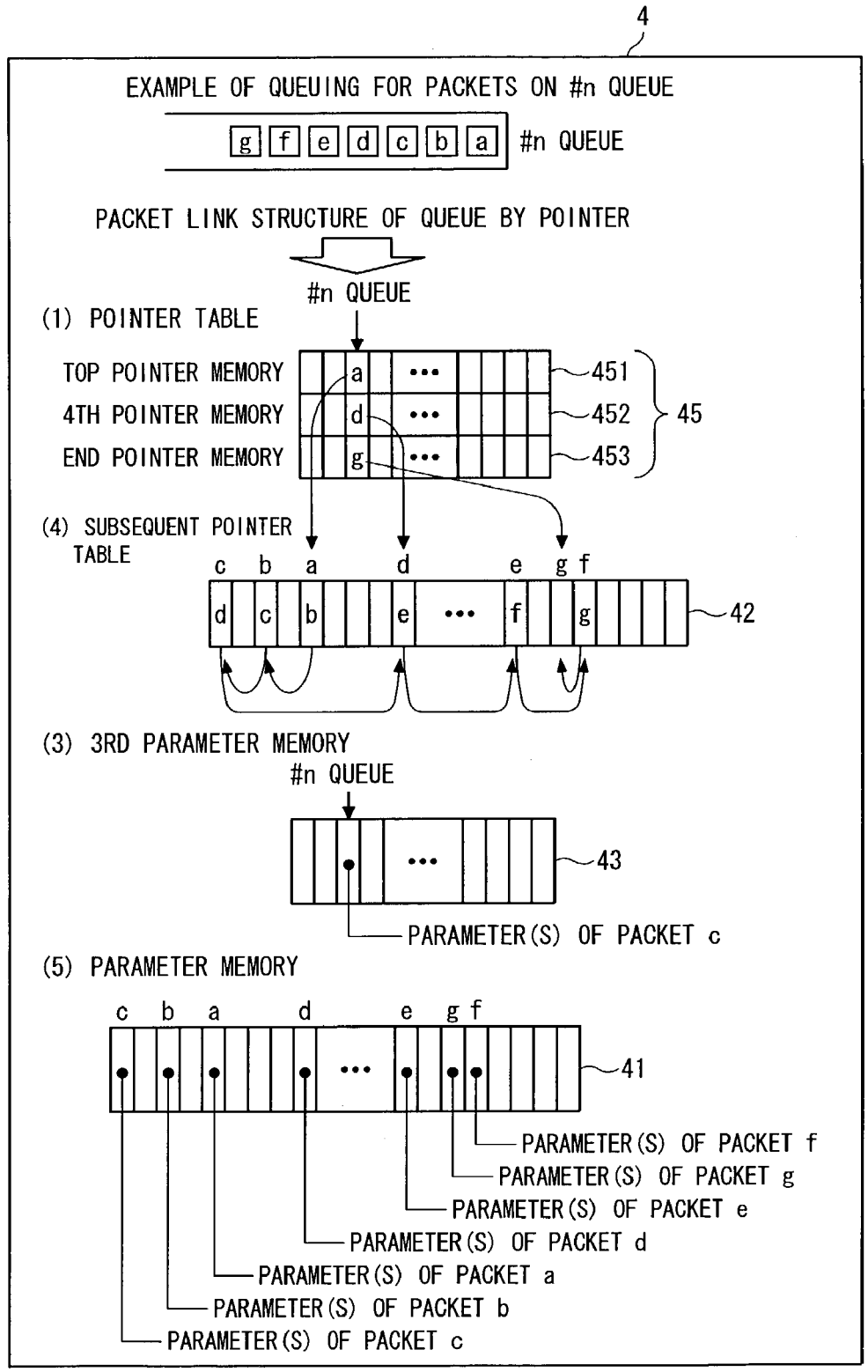
FIG. 26 is a diagram showing an example of a pointer linkage of the memory of the queue manager of FIG. 25.

As shown in FIG. 26, parameters of packets a, b, c, d, e, f and g on a queue #j-k are respectively stored in parameter memory 41. Pointers indicating each of the subsequent packets b, c, d, e, f and g are stored in subsequent pointer table memory 42 at the same positions as the parameters of packets a, b, c, d, e, and f being stored on parameter memory 41. Further, in addition to in parameter memory 41, parameter of the 3rd packet c is also stored in 3rd parameter memory 43.

Pointers indicating top packet a, 4th packet d and end packet g are respectively stored in an address allocated to queue #n on top pointer memory 451, 4th pointer memory 452 and end pointer memory 453 of pointer table memory 45.

The procedural steps are performed by queue manager 4 having the above data linkage structure when enqueueing or dequeuing a packet.

Figure 27:
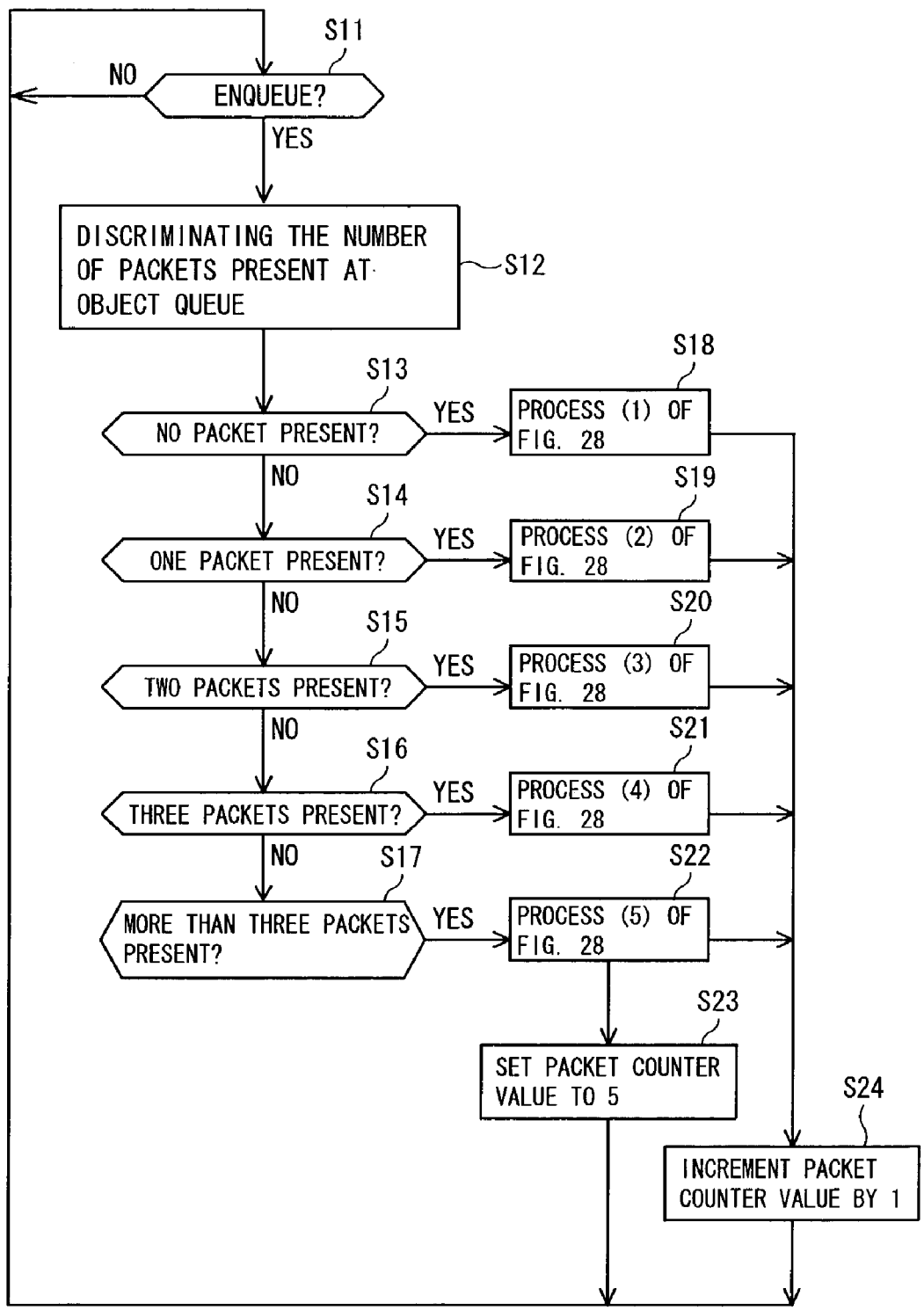
FIG. 27 is a flow diagram illustrating a succession of procedural steps of enqueuing performed by the queue manager of the apparatus of FIG. 1.

(1) Succession of Procedural Steps as Enqueuing:

Queue manager 4 monitors, as shown in FIG. 27, whether or not conversion table 3 of FIG. 1 issues an instruction to enqueue a packet (No route in Step S11). Upon receipt an enqueue instruction (Yes route in Step S11), queue manager 4 reads the number of packets already stored in a queue based on the number of the queue for which the enqueue instruction is issued from packet counter memory 44 to discriminate the current number of packets in the object queue (Step S12). After that, queue manager 4 executes output of parameters to scheduler 5 and control of pointers retained in queue manger 4 (updating of the pointer linkage) in accordance with the discriminated number of packets as follows.

When the current number of packets is zero, that is, no packet is present at the object queue #j-k (Yes route in Step S13), queue manager 4 performs processes illustrated in (1) of FIG. 28 to output parameters received for the packet that is to be enqueued to scheduler 5 and to update the pointer linkage of memories of queue manager 4 (Step S18). After that, queue manager 4 updates the number of packets on the object queue #j-k, which number is stored in packet counter memory 44, in increment of 1 (+1) (Step S24).

When the discriminated current number of packets indicates one packet present at the object queue #j-k (No route in Step S13 and Yes route in Step S14), queue manager 4 performs processes illustrated in (2) of FIG. 28 to output the received parameters, as those of the second top packet, to scheduler 5 and to update the pointer linkage of memories of queue manager 4 (Step S19). After that, queue manager 4 updates the number of packets on the object queue #j-k, which number is stored in packet counter memory 44, in increments of 1 (+1) (Step S24).

When the discriminated current number of packets indicates two packets present at the object queue #j-k (No route in Steps S13 and S14, and Yes route in Step S15), queue manager 4 performs processes illustrated in (3) of FIG. 28 to store the received parameters, as those of the third top packet, in 3rd parameter memory 43 and to update the pointer linkage of memories of queue manager 4 (Step S20). After that, queue manager 4 updates the number of packets on the object queue #j-k, which number is stored in packet counter memory 44, in increments of 1 (+1) (Step S24).

When the discriminated current number of packets indicates three packets present at the object queue #j-k (No route in Steps S13 to S15, and Yes route in Step S16), queue manager 4 performs processes illustrated in (4) of FIG. 28 to store the received parameters, as those of the fourth top packet, in 4th pointer memory 452 and to update the pointer linkage of memories of queue manager 4 (Step S21). After that, queue manager 4 updates the number of packets on the object queue #j-k, which number is stored in packet counter memory 44, in increments of 1 (+1) (Step S24).

When the discriminated current number of packets indicates more than three packets present at the object queue #j-k (No route in Steps S13 to S16, and Yes route in Step S17), queue manager 4 performs processes illustrated in (5) of FIG. 28 to update pointer for the end packet (Step S22) and updates the number of packets on the object queue #j-k, which number is stored in packet counter memory 44, in increments of 1 (+1) (Step S24).

In the illustrated embodiment, the maximum number of packets in an individual queue, which number is stored in packet counter memory 44, is five. Therefore, if the discriminated current number of packets is equal to or more than five, the number of packets in the object queue #j-k in packet counter memory 44 is not updated after the processes illustrated in (5) of FIG. 28 (i.e., the count of the object queue #j-k in packet counter memory 44 is fixed to "5") (Step S23).

Figure 29:
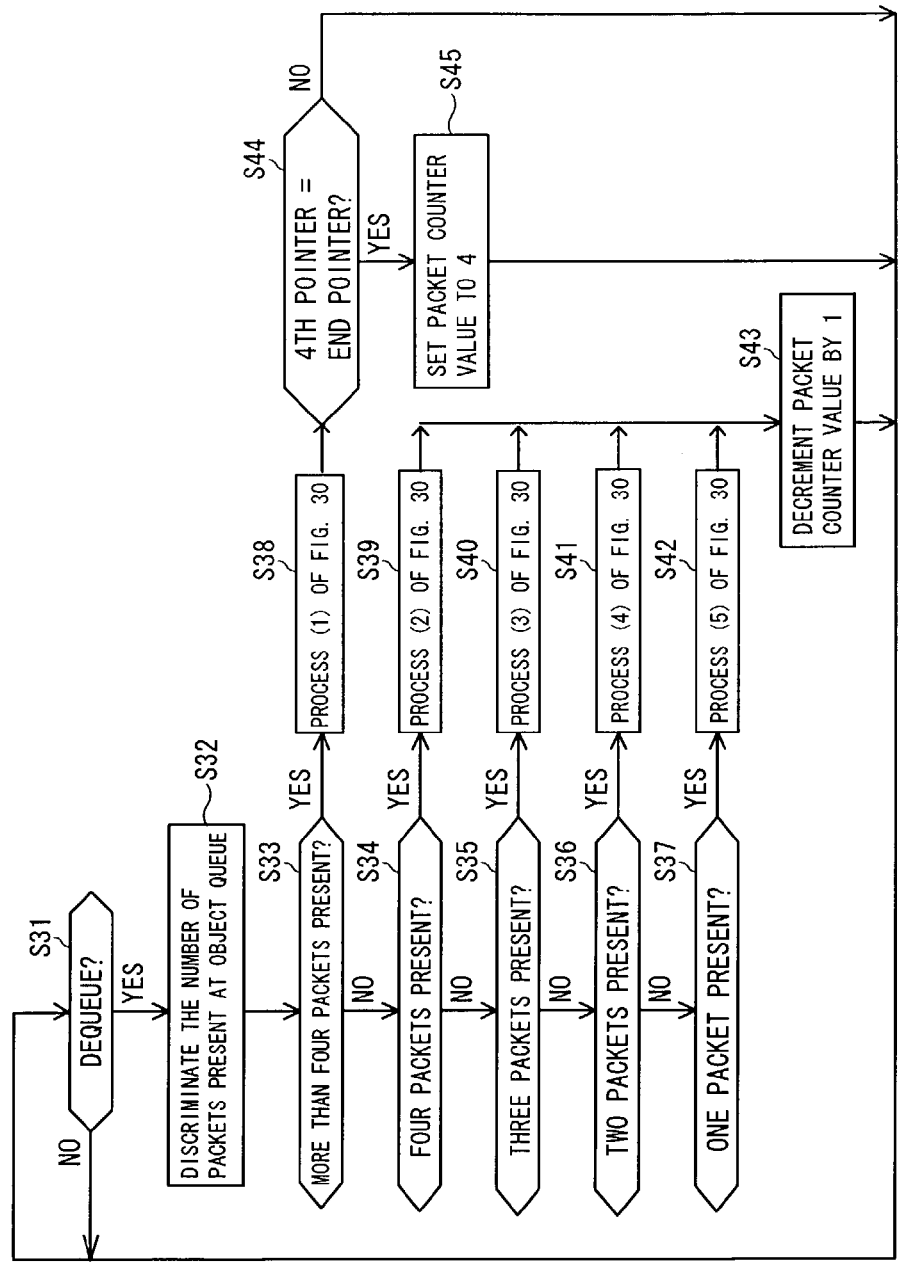
FIG. 29 is a flow diagram illustrating a succession of procedural steps of dequeueing performed by the queue manager of the apparatus of FIG. 1.

(2) Succession of Procedural Steps as Dequeuing:

When an instruction to dequeue is issued, queue manager 4 performs a succession of procedural steps S31 to S45 of flow diagram FIG. 29. First of all, queue manager 4 monitors whether or not scheduler 5 issues a dequeue instruction (No route in Step S31). Upon receipt of an instruction to dequeue a packet from an object queue #j-k (Yes route in Step S31), queue manager 4 reads the number of packets enqueued in the object queue #j-k from packet counter memory 44 to discriminate the current number of packets in the object queue #j-k (Step S32). After that, queue manager 4 executes output of parameters to scheduler 5 and control of pointers retained in queue manager 4 (updating of the pointer linkage) in accordance with the discriminated number of packets as follows.

When the discriminated current number of packets indicates five or more packets present at the object queue #j-k (Yes route in Step S33), queue manager 4 performs processes illustrated in (1) of FIG. 30 to output the top pointer of the object queue #j-k, as a dequeue pointer, to memory controller 6, the parameters of the third packets to scheduler 5 and to update the pointer linkage (Step S38).

Queue manager 4 further checks whether or not the fourth pointer becomes identical to the end pointer (Step S44) If the result of the checking is positive, the count for the object queue #j-k in packet counter memory 44 is set to fixed value (4) (Yes route in Step S44 to Step S45); and if the result is negative, queue manager 4 monitors issuing of the next dequeue instruction (No route in Step S44).

When the discriminated current number of packets indicates four packets present at the object queue #j-k (No route in Step S33 and Yes route in Step S34), queue manager 4 performs processes illustrated in (2) of FIG. 30 to output the top pointer of the object queue #j-k, as a dequeue pointer, to memory controller 6 and the parameters of the third pointer stored in 3rd parameter memory 43, as a third pointer, to scheduler 5 and to update the pointer linkage (Step S39). After that, queue manager 4 updates the number of packets on the object queue #j–k, which number is stored in packet counter memory 44, in decrements of 1 (−1) (Step S43).

Similarly, when the discriminated current number of packets indicates three packets present at the object queue #j–k (No route in Steps S33 and S34 and Yes route in Step S35), queue manager 4 performs processes illustrated in (3) of FIG. 30 to output the top pointer of the object queue #j–k, as a dequeue pointer, to memory controller 6 and the parameter of the third pointer stored in 3rd parameter memory 43, as a third pointer, to scheduler 5 and to update the pointer linkage (Step S40). After that, queue manager 4 updates the number of packets in the object queue #j–k, which number is stored in packet counter memory 44, in decrements of 1 (−1) (Step S43).

When the discriminated current number of packets indicates two packets present at the object queue #j–k (No route in Steps S33 to S35 and Yes route in Step S36), queue manager 4 performs processes illustrated in (4) of FIG. 30 to output the top pointer of the object queue #j–k, as a dequeue pointer, to memory controller 6 and to update the top pointer (parameter of the top pointer is not output to scheduler 5) (Step S41). After that, queue manager 4 updates the number of packets in the object queue #j–k, which number is stored in packet counter memory 44, in decrements of 1 (−1) (Step S43).

When the discriminated current number of packets indicates a packet present at the object queue #j–k (No route in Steps S33 to S36 and Yes route in Step S37), queue manager 4 performs processes illustrated in (5) of FIG. 30 to output only the top pointer of the object queue #j–k, as a dequeue pointer, to memory controller 6 (Step S42) and updates the number of packets in the object queue #j–k, which number is stored in packet counter memory 44, in decrements of 1 (−1) (Step S43).

As described above, when the object queue #j–k has three or more packets, queue manager 4 outputs parameters (of the third packet) on 3rd parameter memory 43 to scheduler 5 and updates the pointer linkage. On the contrary, when less than three packets are present at the object queue #j–k, queue manager 4 outputs the top pointer to memory controller 6 but, does not output the parameters of the third packet to scheduler 5.

Figure 31:
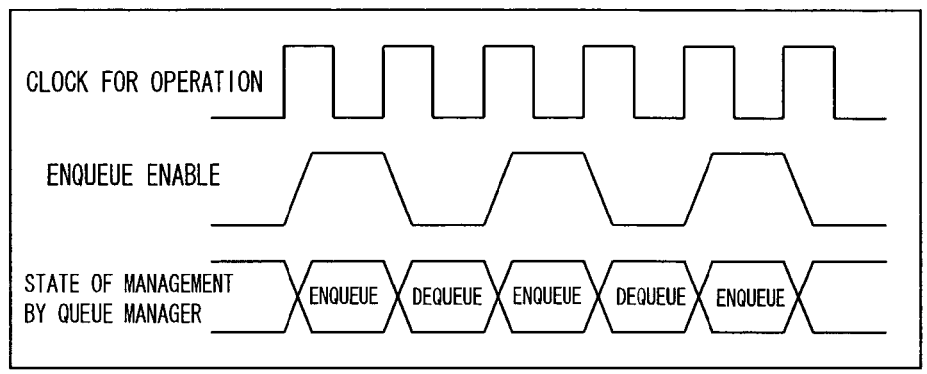
FIG. 31 is a diagram illustrating phases of enqueuing and dequeuing performed by the queue manager of the apparatus of FIG. 1.

Enqueuing and dequeuing are executed alternately, as shown in FIG. 31, so as not to conflict the processes in relation to dequeuing and enqueuing.

Such queue management (updating the pointer linkage) outputs parameters of two packets successively arranged in the object queue #j–k to scheduler 5 whereupon leading-positions packets memory 53 retains the parameters of the two packets (on which pre-processor 51 has performs pre-process).

Figure 32:
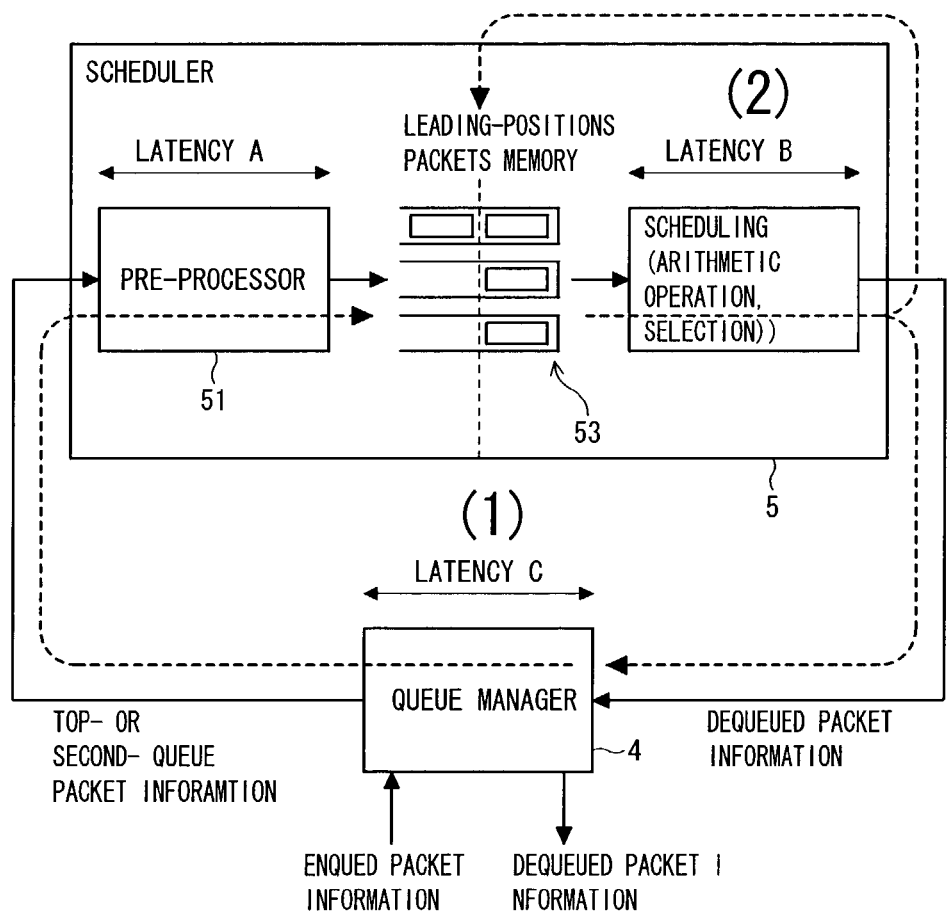
FIG. 32 is a diagram showing latency for processes carried out between the queue manager and the packet scheduler of FIG. 1.

As shown in FIG. 32, cycle A represents latency for a packet from being input to scheduler 5 to being stored in leading-positions packets memory 53; cycle B, latency from updating data in leading-positions packets memory 53 caused by a dequeue instruction to outputting the updated data to scheduler 5; and cycle C, latency for queue manager 4 performing processes from instructing dequeue in scheduler 5 to outputting the subsequent packet.

If scheduler 5 performs processes only on parameters of the top packet, the shortest interval of dequeuing packets from an identical queue #j–k depends on the process of encircled 1 in FIG. 32 thereby being cycle (A+B+C). However, storing parameters of two leading packets of an identical queue #j–k in leading-positions packets memory 53 realizes that the shortest interval of dequeuing packets from the queue #j–k is latency of the process of encircled 2 (cycle B) of FIG. 32. The shortest dequeuing interval of cycle B requires the relationship of B to be equal to or larger than the combination of A and C (i.e., B≧(A+C)). Conversely, when B is smaller than the combination A and C (i.e., B<(A+C)), the interval of dequeuing depends on cycle (A+C).

Figure 33:
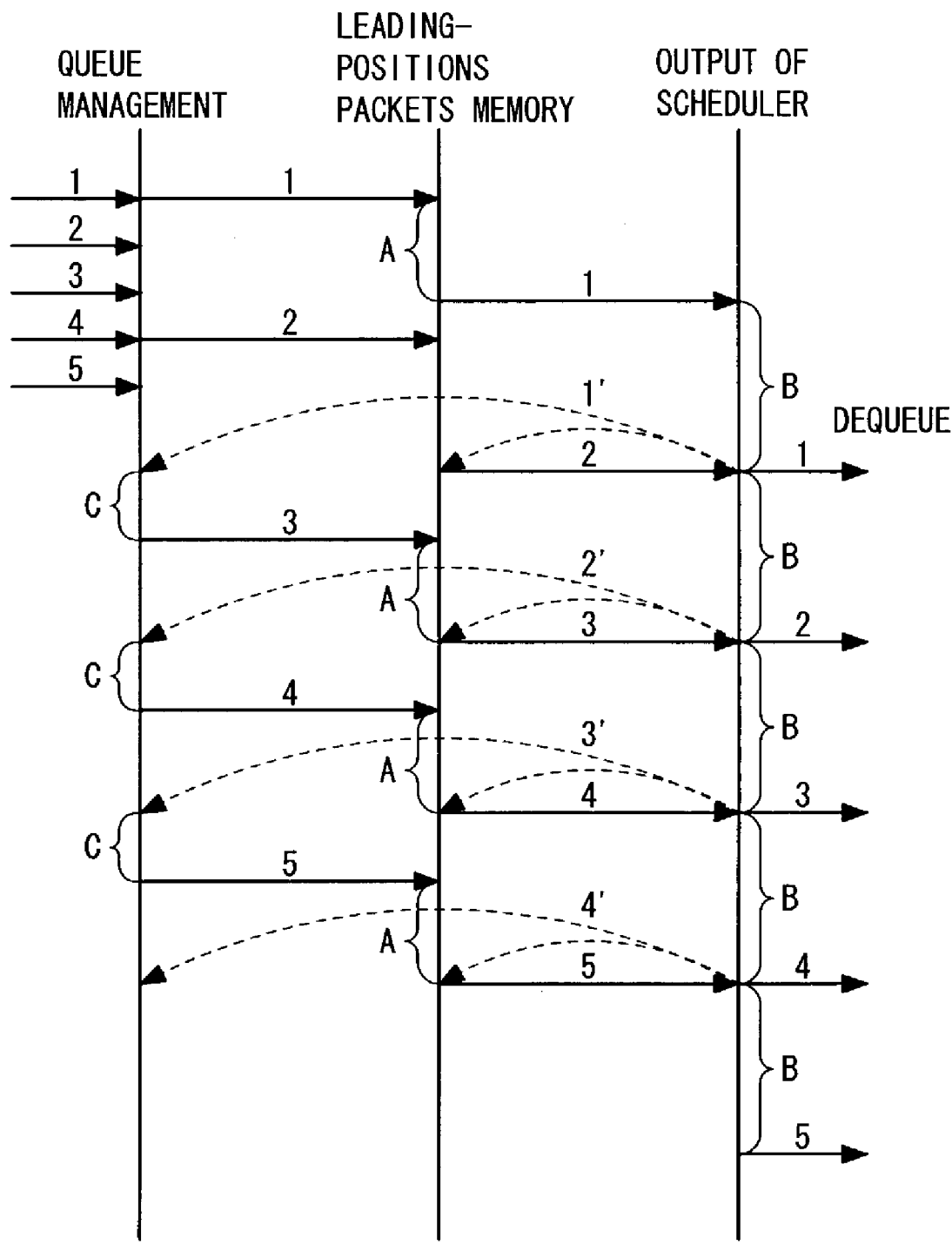
FIG. 33 is a diagram showing the latency for processes of FIG. 32 and a throughput of dequeuing carried out between the queue controller and the packet scheduler.

As shown in FIG. 33, if five packets 1 to 5, whose length is small enough to be dequeued in the shortest interval, are input into a queue #j–k and cycle B is equal to or larger than cycle (A+C), it is possible to successively dequeue the five packets in the ensured shortest interval of cycle B when dequeueing of a packet issues an instruction to dequeue the subsequent packets of the dequeued packet to both queue manager 4 and leading-positions packets memory 53 at the same time.

As a result, it is possible to greatly reduce latency of process, which has been a bottleneck in successively dequeuing packets, whereupon control for output port #j having a high-speed bandwidth of 5 Gbps, 10 Gbps or the like and for queues #j–k can be executed with accuracy, ensuring the bandwidths set for the output port #j and for each queue #j–k.

When issuing of the instruction to dequeue, a dequeue enable signal to queue manager 4 is asserted and at the same time a masking operation is performed on parameter of a packet under a pipeline process in scheduler 5 so as to prevent the packet from being dequeued more than once.

Namely, upon issuing of the dequeue instruction, dequeue information (dequeue discrimination signals: FB1, FB2, FB3 and FB4) is fed back to arithmetic-operation controller 52, output determination section 552 of each operator 55-*k* in parallel arithmetic operator 55, output discrimination section 571-2 of each output-port shaping circuit 57-*j* in shaping section 57, and output discrimination computing section 591-2 of dequeue controller 59, respectively as shown in FIG. 2.

Upon receipt of the dequeue information (FB1), arithmetic-operation controller 52 designates an output port #j of a packet to be dequeued as an arithmetic-operation-object port for the subsequent cycle. Output determination section 552 of operator 55-*k* which is specified by the dequeue information (FB2) turns an output discrimination flag disable in order to mask the output of the result of the arithmetic operation in relation to the queue #j–k of the output port #j–k.

Output discrimination section 571-2 of each output-port shaping circuit 57-*j* which is specified by the dequeue information (FB3) also turns the output discrimination flag disable in order to mask the output of the discrimination value. Further, output discrimination section 591-2 receives the dequeue information (FB4) thereby masking the output of the discrimination value in order to mask all output in relation to the subsequent cycle.

The above masking operation can avoid redundant outputs of an identical packet and resulting decline in accuracy of controlling of the bandwidth set for queue #j–k.

Figure 34:
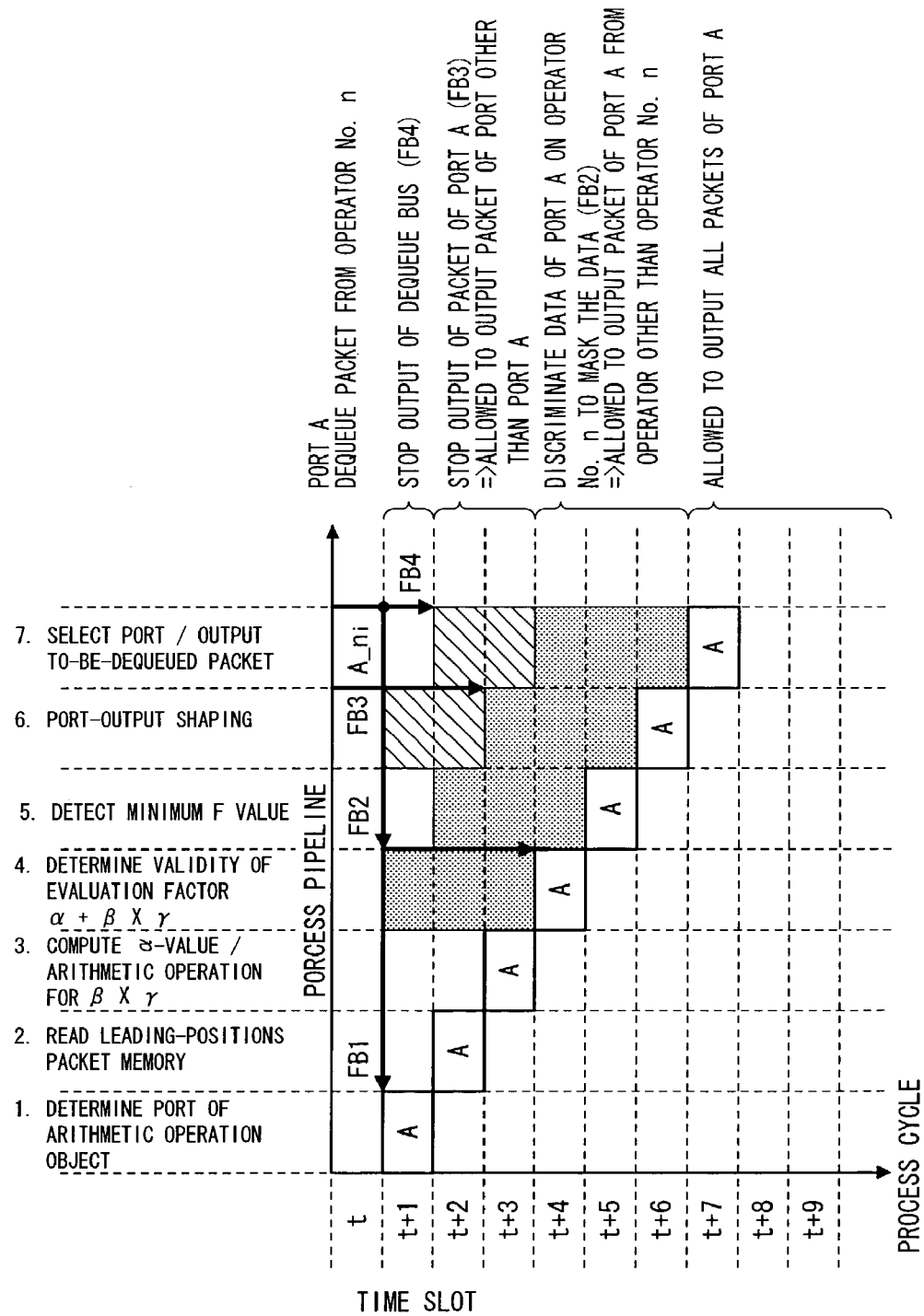
FIG. 34 is a diagram showing a process of masking performed by a feedback of dequeue information of a dequeue controller in a packet scheduler of FIGS. 2 and 3.

For example, assuming an instruction to dequeue a packet from a queue #n (operator 55-*n*) of output port A is issued at cycle t, as shown in FIG. 34. In this case, dequeue information (FB4) masks all outputs in relation to the subsequent cycle whereupon no packet is output (dequeued) through the dequeue bus at that time. The dequeue information (FB3) masks the output of shaping section 57 for output port A until cycle t+2. The mask operation allows output ports other than output port A to dequeue packets after cycle t+2.

Further, the dequeue information (FB2) masks the output of operators 55-k until cycle t+3. At this point, discrimination of data is performed on data in order to identify the output port of the data so as not to mask data of an output port other than output port A thereby enabling masking of the data of only output port A. After cycle t+3, operators 55-k other than operator 55-n therefore output data of output port A to dequeue. The dequeue information (FB1) designates output port A as an arithmetic-operation-object port to update data of the subsequent packet of leading-positions packets memory 53. In the above manner, the dequeue packets under the entire pipeline processes perform such updating process. The masking operations performed at a number of points enables dequeuing of packets from respective different ports at the intervals of at least two cycles; and dequeuing of packets from the same port at intervals of at least four cycles. Since leading-positions packets memory 53 always stores parameters of two leading packets enqueued on the same queue in the present embodiment, packets can be dequeued from the same queue at intervals of eight cycles.

Apparatus 1 for controlling packet output of the first embodiment designates an arithmetic-operation-object port #j for a WFQ evaluation factor in a time sharing manner, and operator 55-k, which is common with output ports #1 to #M, performs a WFQ arithmetic operation to obtain an evaluation factor of each queue #j-k belonging to the designated arithmetic-operation-object port #j whereupon it is possible to reduce the circuit scale of scheduler 5 compared to the number of queues of the plural output ports.

It is therefore possible to perform arithmetic operations for WFQ scheduling in relation to a large number of queues by hardware, which has been difficult in a conventional technique. As a result, such hardware vastly improves capability of performing arithmetic operations thereby realizing accurate WFQ scheduling.

Additionally, pre-processor 51 and γ-arithmetic operator 54 are commonly used by the plural output ports and the queues thereof, scheduler 5 can be incorporated in an LSI or an FPGA even if scheduler 5 deals with a great number of queues. Further, such common pre-processor 51 and γ-arithmetic operator 54 realizes QoS control over WFQ fixed baseband queues or WFQ preferentially-controlled queues with ease.

The shaping operation for individual output ports #j by shaping section 57 can avoid congestion due to the total output bandwidth re-computed for each output port #j. Additionally, the shaping operation for the dequeue bus of dequeue controller 59 can also avoid the congestion of the dequeue bus due to the total output bandwidth re-computed of each output port #j or of each queue #j-k.

The designation of an arithmetic-operation-object port and the feedback operation (the masking operation) at the number of points when dequeuing a packet realize the higher throughput of the individual queues #j-k and the individual output ports #j.

(A-2) First Modification:

A first modification of scheduler 5 will be now described.

Figure 37:
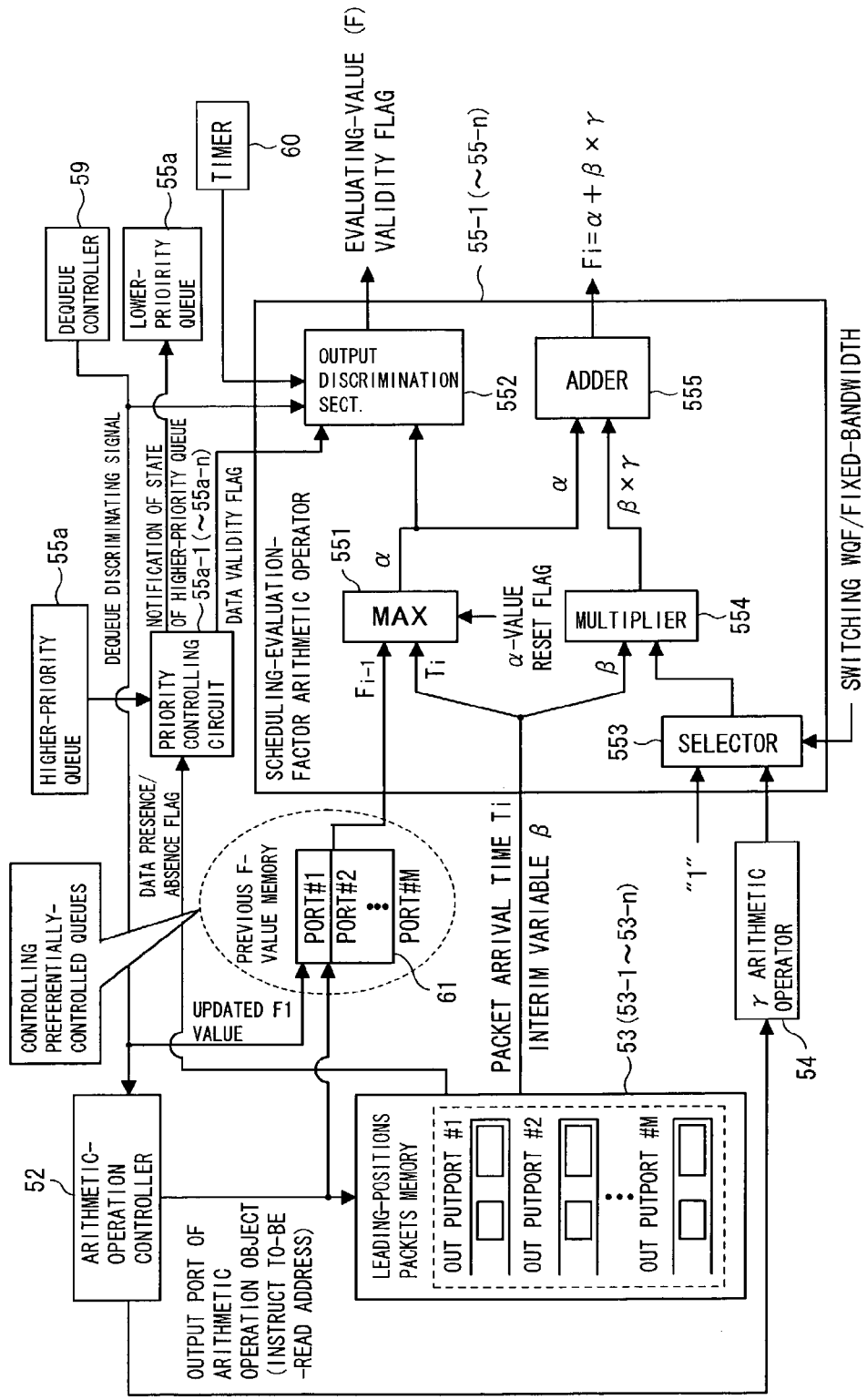
FIG. 37 is a block diagram schematically showing a packet scheduler according to a first modification of that of FIG. 4 according to the first embodiment.

FIG. 37 is a block diagram showing the first modification of scheduler 5. Comparing scheduler 5 of FIG. 4, scheduler 5 of FIG. 37 includes priority control circuits 55a-1 through 55a–n, each corresponding to one from operators 55-k for individual queues (hereinafter called preferentially-controlled queues) #j-1 through #j-n for which priorities of controlling the bandwidths are determined in order to control the bandwidths of the queue #j-1 through #j-k in the priority order determined. In the following description, elements and parts with identical reference numbers in FIGS. 4 to 37 are identical or substantially identical if further explanation is not made.

Figure 39:
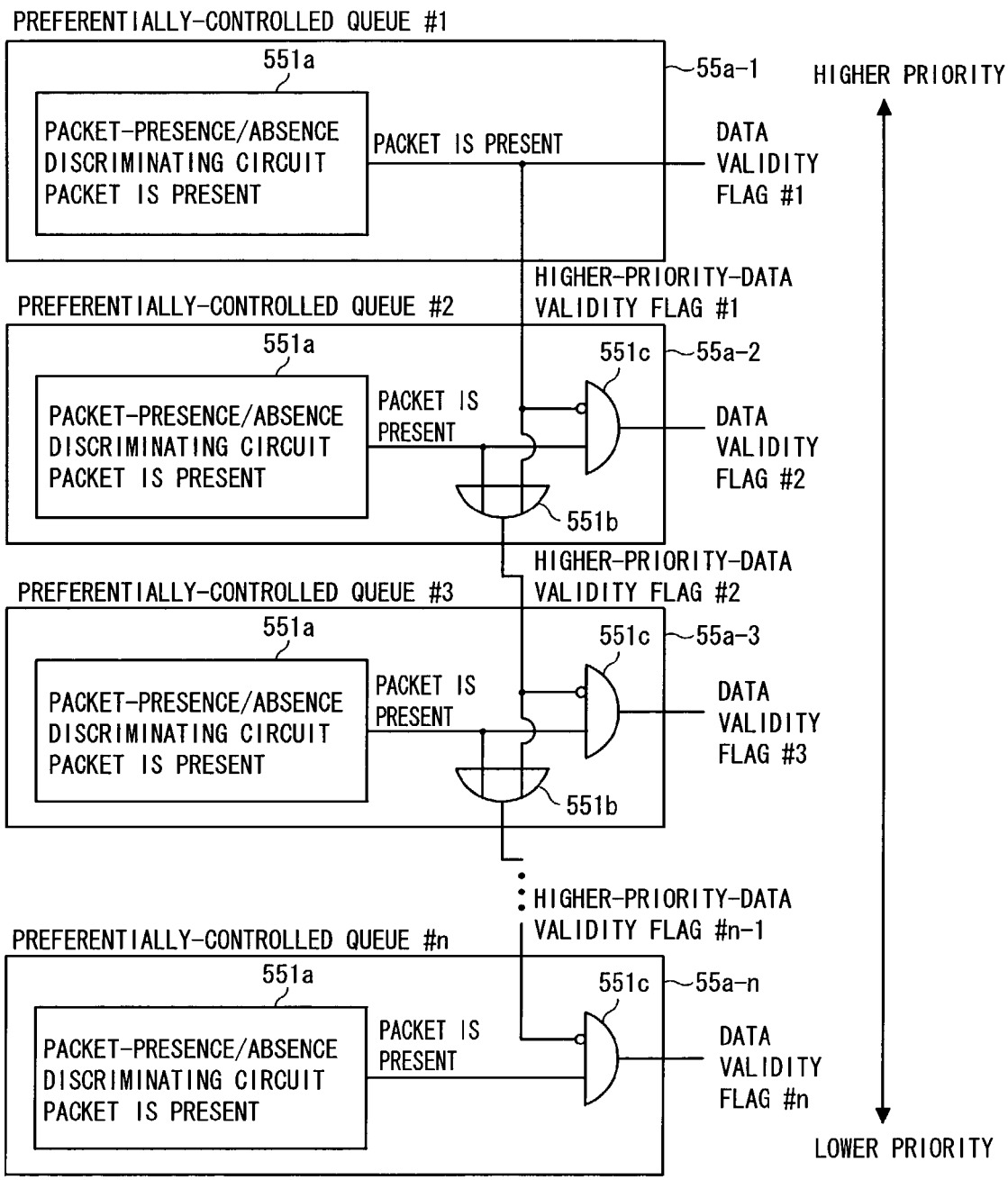
FIG. 39 is a block diagram schematically showing a preferentially-controlled circuit of the packet scheduler of FIG. 37.

Priority controlling circuit (priority control means) 55a–k includes, as shown in FIG. 39, packet-presence/absence discrimination circuits 551a, each to discriminate whether or not at least one packet is present at leading-positions packets memory 53 of an associated one of the queues. Priority controlling circuits 55a-1 through 55-n are connected in a cascade from the higher priorities to the lower priorities via logical sum (OR) circuits 551b.

Each of priority controlling circuits 55a-2 through 55a–n, which are except priority controlling circuit 55a-1 of the highest priority, includes logical product (AND) circuit 551c whose one input has been inverted, to obtain a logical product of an inverter of the output from packet-presence/absence discrimination circuit 551a of the immediate higher priority and an output from packet-presence/absence discrimination circuit 551a in question. The output of each priority controlling circuit 55a–k as a data-validity flag is connected to output determination section 552 of the corresponding operator 55-k.

Priority controlling circuits 55a-1 through 55a–k in scheduler 5 of the first modification monitors the state of the immediate higher-priority queue and the presence/absence of a packet on the queue in question in relation to each output port #j. If packet-presence/absence discrimination circuit 551a detects a packet on the immediate higher-priority queue even when the queue in question has a packet, the result of arithmetic operation (evaluation factor of the queue in question obtained) by the corresponding operator 55-k is masked by not outputting the data-validity flag (making the data-validity flag disabled).

Figure 38A:
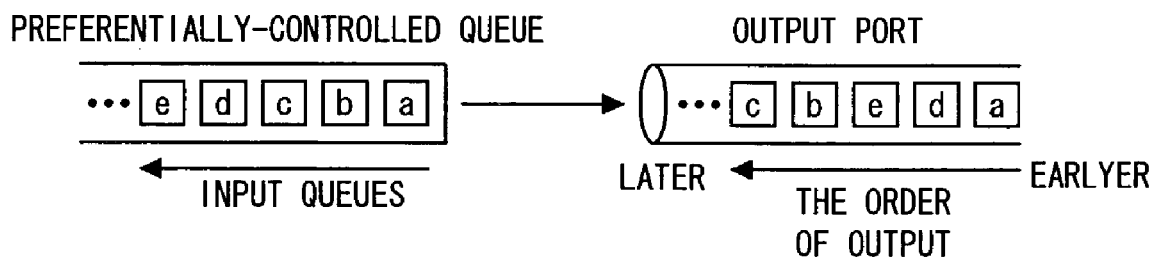
FIGS. 38A and 38B are diagrams showing processes of outputting packets from preferentially-controlled queues.
Figure 38B:
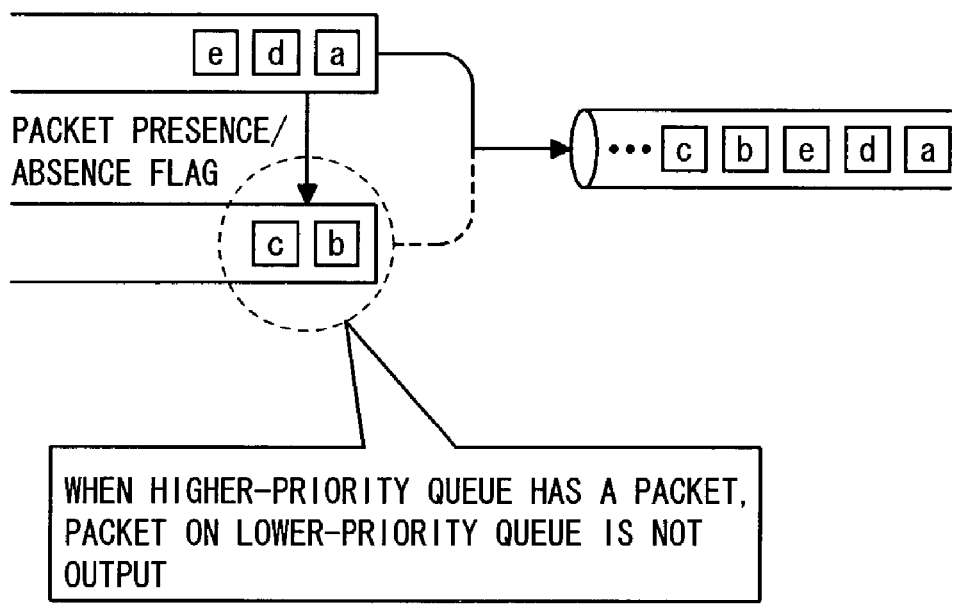

For example, when packets are enqueued on a queue in the order of a, b, c, d, e . . . , as shown in FIG. 38A and the enqueued packets are dequeued under the two-priority-stage control as shown in FIG. 38B, the enqueued packets are distributed to either higher- or lower-priority queue (In FIG. 38B, packets a, d and e are distributed to the higher-priority queue; and packets b and c, to the lower-priority queue). The higher-priority queue notifies the lower-priority queue of the state of presence/absence of a packet on the higher-priority queue. After all packets on the higher-priority queue are dequeued (i.e., no packets are left on the higher-priority queue), a packet on the lower-priority queues is allowed to be dequeued. As a result, the input packets a to e are dequeued in the order of a, d, e, b, and c, as shown in FIG. 38A.

Therefore, it is possible to preferentially dequeue data (e.g., picture or audio), which should be dealt with in real time. Further, scheduler 5 of the first modification can regard a plurality of preferentially-controlled queues #j as a single queue and control the bandwidths of the queues by retaining evaluation factors (output completion due times $F_{i-1}$) of the prior packets in common with the preferentially-controlled queues #j in previous F-value memory 61.

Figure 40:
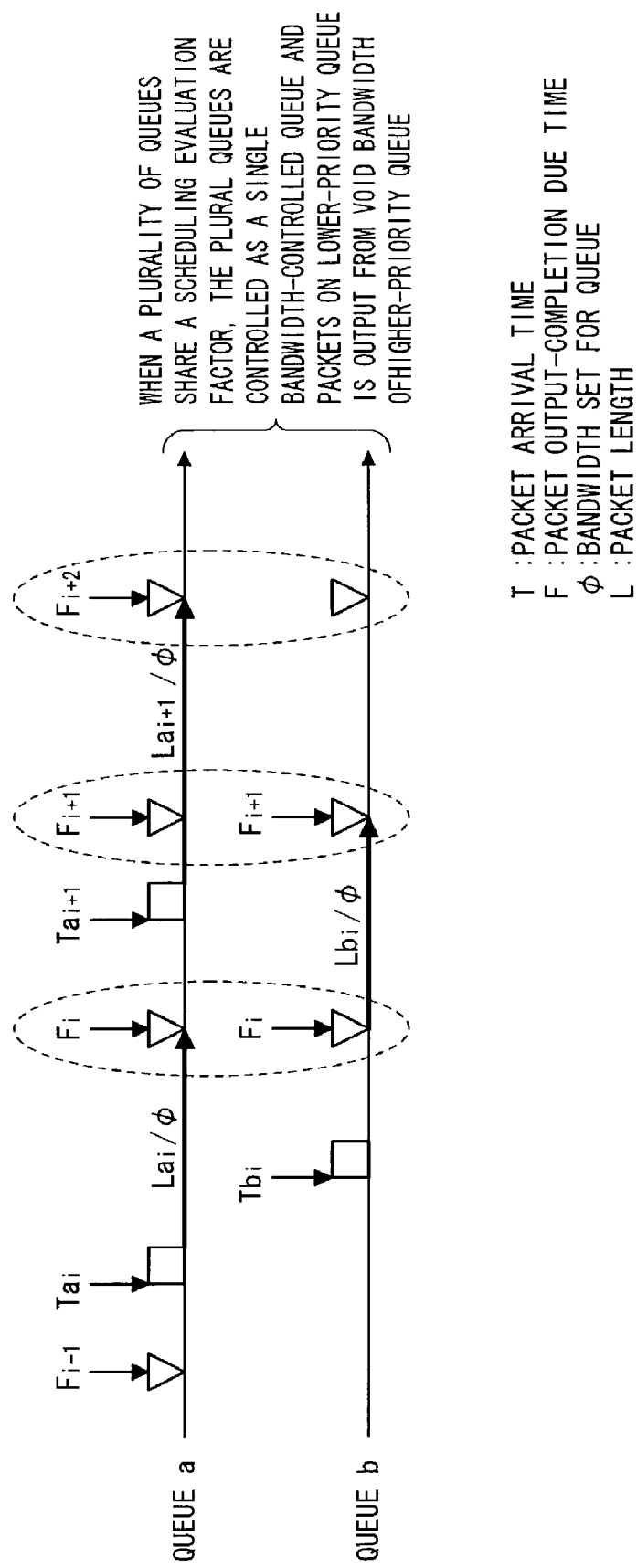
FIG. 40 is diagram showing a manner of sharing an evaluation factor with preferentially-controlled queues, which sharing is performed by the preferentially-controlled circuit.

As shown in FIG. 40, assuming that two queues a and b share a bandwidth. A bandwidth φ is set commonly with queues a and b, and queue a has a higher priority than queue b. When the higher-priority queue a has a packet, outputting a packet from the lower-priority queue b is masked; when a packet is not present at the higher-priority queue or entire packet on the higher-priority queue are dequeued, a packet on the lower-priority queue b is allowed to be dequeued. At that time, a packet enqueued on the lower-priority queue b is dequeued through an unused bandwidth set for the higher-priority queue a.

Of course, the priorities should by no means be limited to be determined over the entire queues; alternatively, the priorities may be defined over a part of the entire queues.

(A-3) Second Modification:

As mentioned above, since each operator 55-$k$ is shared by output ports #j and therefore having a process path identical to the plural output ports #j, scheduler 5 can easily make copies of a packet that are to be dequeued from two or more of the plural output ports #j (i.e., a multi-cast distribution can be performed with ease).

Figure 41:
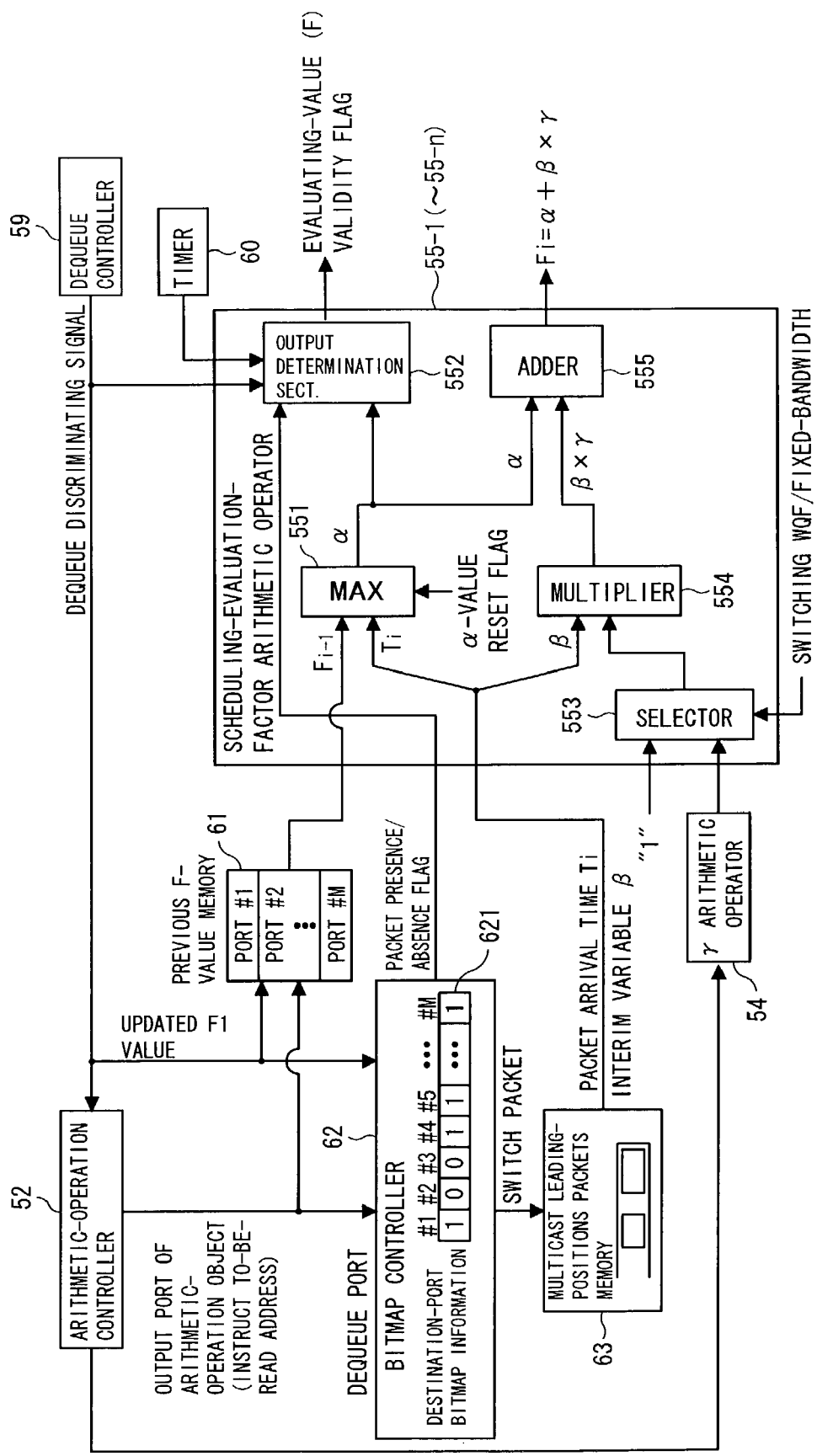
FIG. 41 is a block diagram schematically showing a packet scheduler according to a second modification of that of FIG. 4 according to the first embodiment.

FIG. 41 is a block diagram showing scheduler 5 of a second modification realizing a multi-cast distribution. Compared with scheduler 5 of FIG. 4, scheduler 5 of FIG. 41 includes bitmap controller 62 and multicast leading-positions packets memory 63 for some or all operators 55-$k$. In the following description, elements and parts with identical reference numbers between FIGS. 4, 37 and 41 are identical or substantially identical if further explanation is not made.

Figure 42:
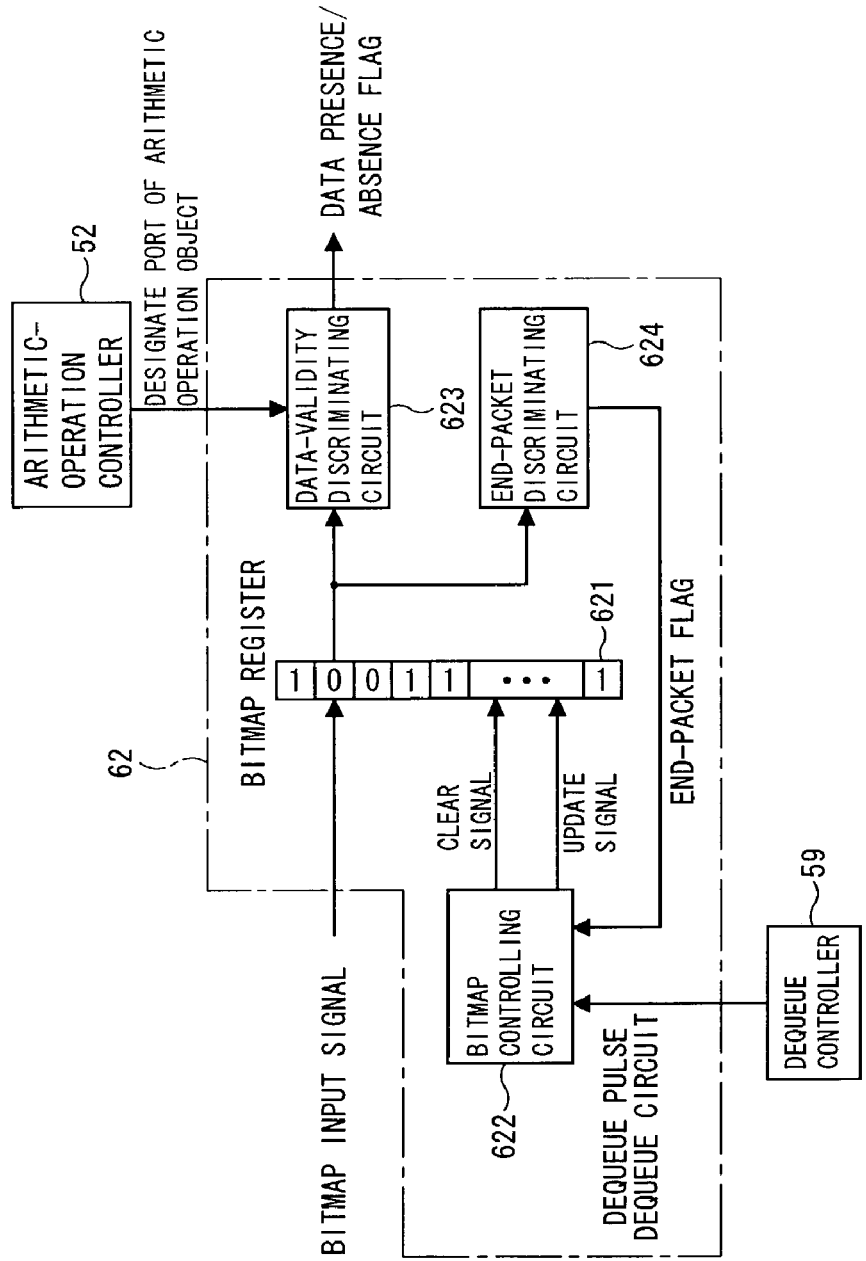
FIG. 42 is a diagram schematically showing a bitmap controller of the packet scheduler of FIG. 41.

Bitmap controller 62 controls validity and invalidity of outputting of parameter of a packet that is to be multicasted, which packet is stored in multicast leading-positions packets memory 63, in accordance with a time slot for an arithmetic operation designated by arithmetic-operation controller 52. Bitmap controller 62, as shown in FIGS. 41 and 42, includes bitmap register 621, bitmap controlling circuit 622, data-validity discriminating circuit 623 and end-packet discriminating circuit 624.

Bitmap register (destination-information retaining means) 621 retains bitmap destination information to designate two or more of the plural output ports #j for which a packet is to be multicasted (for example, an output port on which a packet is multicasted is indicated by "1"; a queue for which a packet is not multicasted is indicated by "0", as shown in FIG. 44A). For example, bitmap register 621 receives the bitmap destination information from conversion table 3 of FIG. 1 together with schedule parameters.

Bitmap controlling circuit (distribution controlling means) 622 updates and clears the bitmap destination information (hereinafter simply called "bitmap information") retained in bitmap register 621 based on dequeue information fed back by dequeue controller 59. Data-validity discriminating circuit 623 outputs a flag indicating validity of schedule parameters of a multicast packet read from multicast leading-positions packets memory 63 to output determination section 552 of operator 55-$k$ each time when arithmetic-operation controller 52 designates an arithmetic-operation-object port.

End-packet discriminating circuit 624 monitors whether or not the current multicast-object port #j is the last. When the result of the monitoring is positive, bitmap controlling circuit 622 receives the result (enabling the last packet flag) and updates the bitmap information in bitmap register 621 using information with respect to the next multicast packet upon completion of dequeueing the current multicast packet from the last multicast-object port #j.

In scheduler 5 having the above elements, schedule parameters of each multicast packet are stored in multicast leading-positions packets memory 63 and bitmap information is stored in bitmap register 621 of bitmap controller 62.

Validity of parameters input in each operator 55-$k$ in relation to a unicast queue of the first embodiment and the first modification is judged by discrimination of presence or absence of the top packet on the unicast queue. In the second modification, in addition to the above operation, data-validity discriminating circuit 623 discriminates validity of data under the bitmap control in order to judgment of validity of parameters for a multicast packet.

Namely, when arithmetic-operation controller 52 designates a time slot for an arithmetic operation on an output port #j whose bitmap is asserted (is set to "1"), data-validity discriminating circuit 623 makes the validity flag of output of operator 55-$k$ "enable" (see FIG. 44B).

Figure 43:
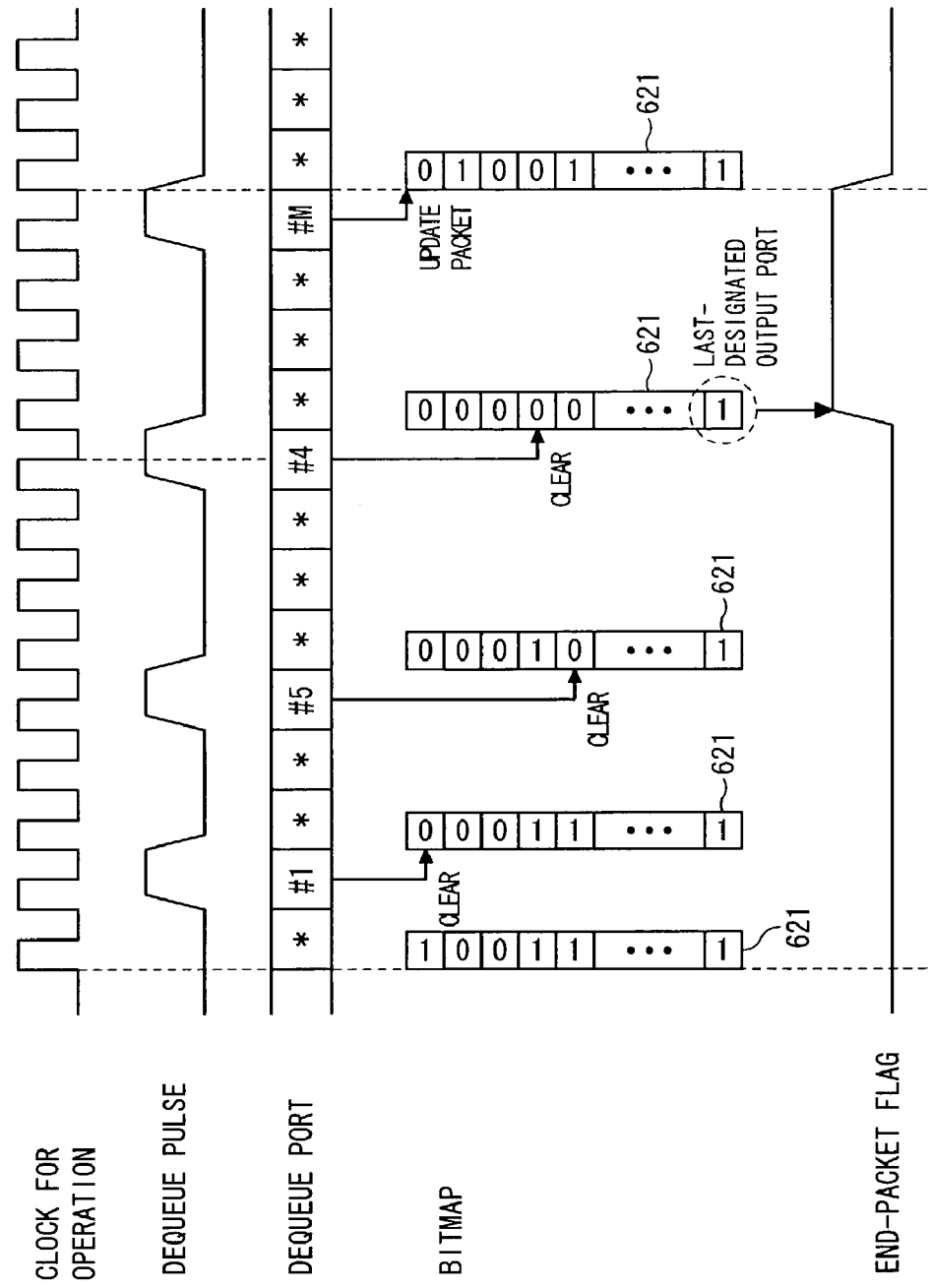
FIG. 43 is a time chart illustrating controlling of multicast distribution, which controlling is performed by the bitmap controller of FIGS. 41 and 42.
Figure 45:
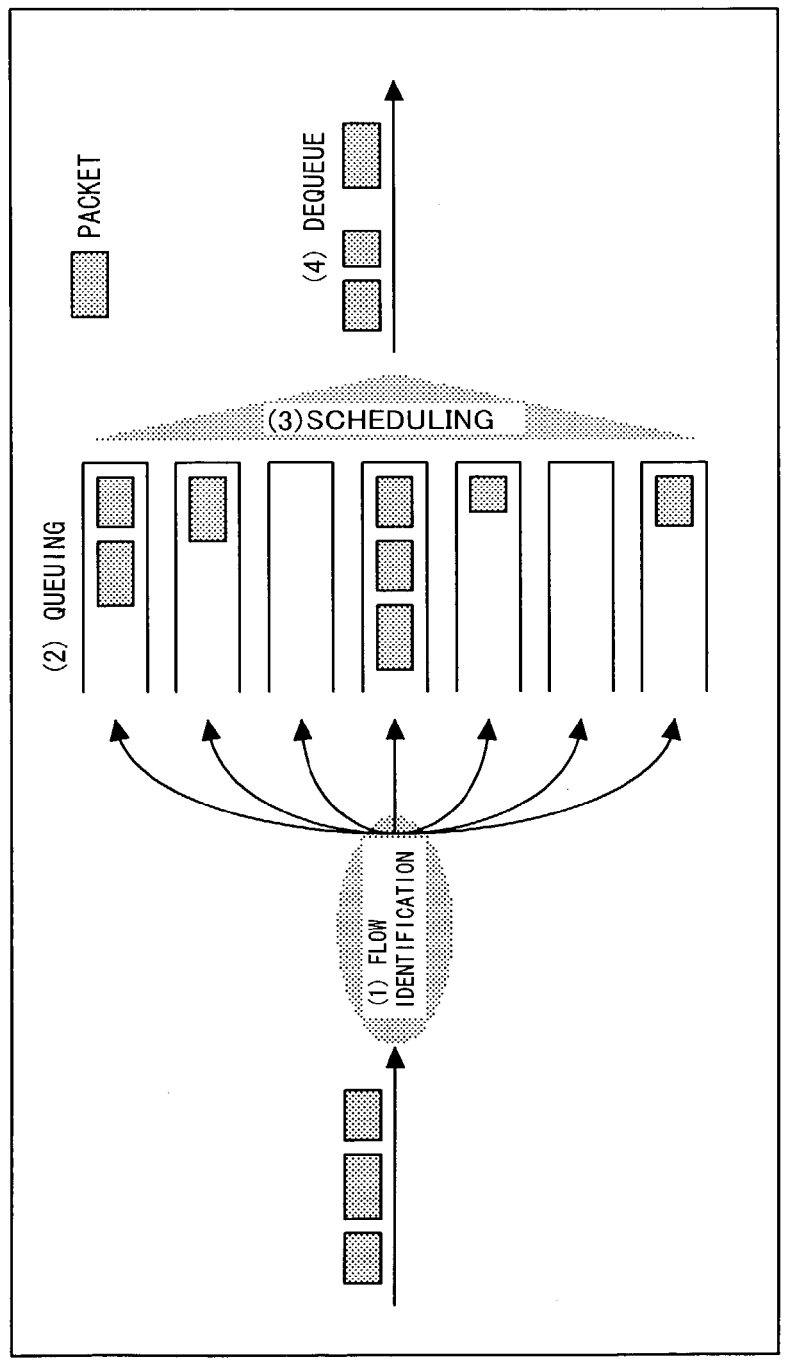
FIG. 45 is a diagram showing the principle of technique of QoS (Quality of Service) controlling.
Figure 46:
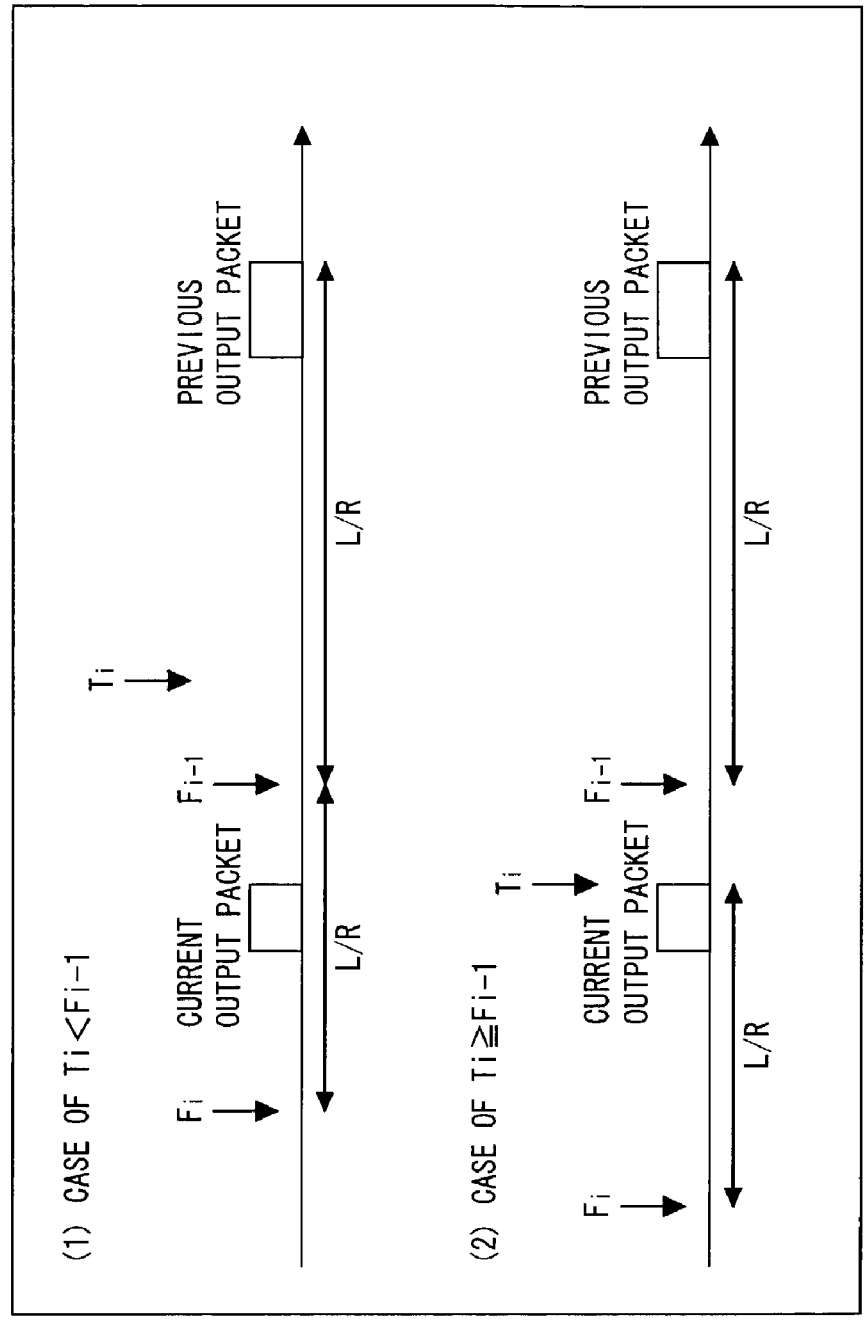
FIGS. 46 and 47 are diagrams respectively showing the principles of technique of controlling of bandwidths by WFQ.
Figure 47:
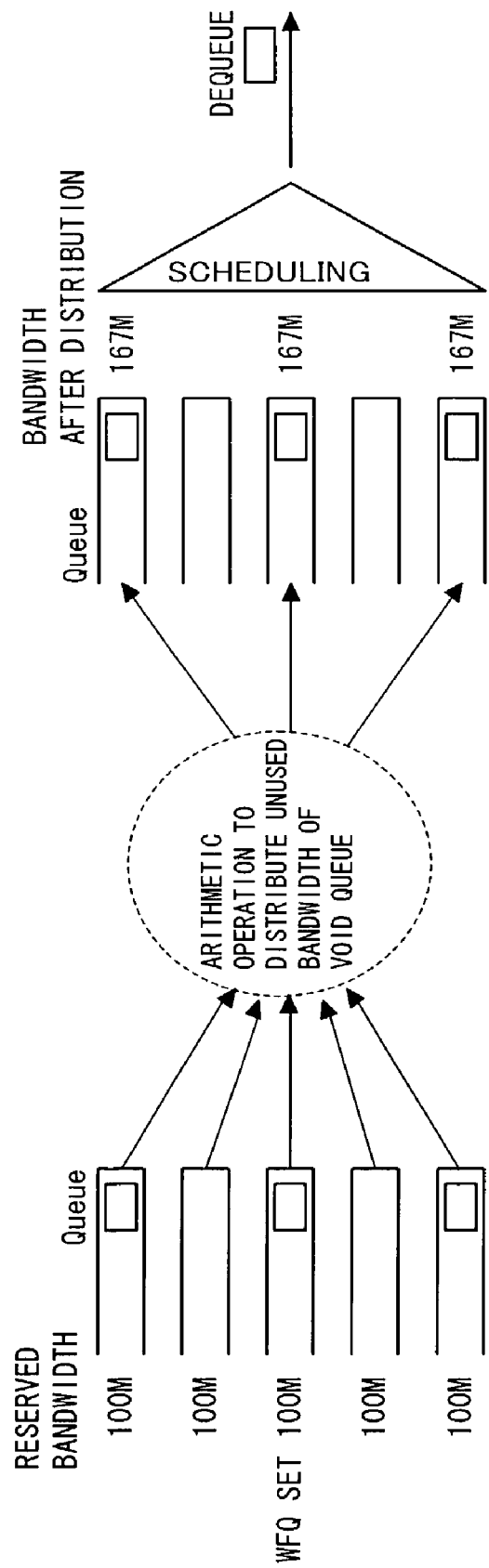

As shown in FIG. 43, bitmap controlling circuit 622 sequentially clears the bitmap information in bitmap register 621 in order of output ports #j for which a multicast packet is dequeued. At the time when a multicast packet is dequeued from the last output port which bitmap information designates, end-packet discriminating circuit 624 outputs an end-packet flag (enable) to bitmap controlling circuit 622 whereupon bitmap register 621 is updated so as to have bitmap information in relation to the subsequent multicast packet.

As mentioned above, operators 55-$k$ are shared by the plural output ports #j in scheduler 5 of the second modification whereupon the plural output ports #j have an identical process path in scheduler 5. It is therefore possible to dequeue a packet for a number of output ports that has been designated (to perform multicast distribution) by simple control of making the result of an arithmetic operation for the multicast packet, which arithmetic operation is performed by operators 55-$k$, valid when designation of a time slot of the arithmetic operation for the output packet that is designated by the multicast destination information of the multicast packet.

Further, the present invention should by no means be limited to the foregoing embodiment and modifications, and various changes or modifications may be suggested without departing from the gist of the invention.

What is claimed is:

1. An apparatus for controlling packet output comprising:
a plurality of sets of queues, each set associated with the respective one of a plurality of output ports;
enqueuing means for enqueuing each of packets input to said apparatus on corresponding one of said queues in accordance with a flow of each said packet;
a packet scheduler for scheduling issuing an instruction to dequeue each said packet enqueued by said enqueuing means; and
dequeuing means for dequeuing a packet, one from said enqueued packets, for which such an instruction to dequeue is issued by said packet scheduler,
said packet scheduler including:
parallel arithmetic operating means for performing parallel arithmetic operations using a predefined arithmetic formula on said enqueued packets on the top positions (hereinafter called "top packets") of said queues for each of said plural output ports based on parameters including at least information of the arrival time and the size of each of said top packets in order to obtain an evaluation factor indicating the outputting-completion due time for each said top packets;
arithmetic-operation controlling means for selecting one output port for which the parallel arithmetic operations are to be performed on said top packets by said parallel arithmetic operating means from said plural output ports and for inputting the parameters of said top packets of said queues for said selected output port to said parallel arithmetic operating means;

intra-port selecting means for selecting the evaluation factor of a packet that is to be preferentially output, which factor has been obtained by said parallel arithmetic operating means, from the evaluation factors of said top packets of said queues for each said output port based on the evaluation factors of said top packets on said queues for each said output port;

inter-port selecting means for retaining the evaluation factor of said top packet that is to be preferentially output from each said output port, which factor has been selected by said intra-port selecting means, and for selecting one output port from which an enqueued packet is to be most-preferentially output from said apparatus based on the evaluation factors retained therein and on a bandwidth for each said output ports; and dequeue controlling means for providing said dequeuing means with the instruction to dequeue said top packet, which has been selected from said top packets by said intra-port selecting means, of said output port selected by said inter-port selecting means.

2. An apparatus for controlling packet output according to claim 1, said arithmetic-operation controlling means comprising a time-sharing port designation section for designating the one output port, for which the parallel arithmetic operations are to be performed on said top packets by said parallel arithmetic operating means, from said plural output ports in a time-sharing manner in accordance with the ratio of the bandwidths of said plural output ports.

3. An apparatus for controlling packet output according to claim 2, said packet scheduler further including a pre-processing section for performing an arithmetic operation on terms common with said queues for each said output port in the predefined formula based on the parameters of said enqueued packets to obtain an interim variable and for inputting the interim variable to said parallel arithmetic operating means for the first-named parallel arithmetic operations in order to obtain the evaluation factor for each said top packets of each said output port.

4. An apparatus for controlling packet output according to claim 2, wherein:

said packet scheduler further comprises a bandwidth distribution rate computing section for computing, if one or more queues of each said output port are void of packets, a rate of distribution of the bandwidths for active queues having at least one packet of each said output port so as to distribute bandwidths allocated to said void queues to said active queues; and said parallel arithmetic operating means performs the first-named parallel arithmetic operations based on the distribution rate of the bandwidths, which have been computed for said active queues by said bandwidth computing section in order to obtain evaluation factors of said top packets on said active queues.

5. An apparatus for controlling packet output according to claim 2, wherein:

said packet scheduler further comprises fixed bandwidth control means for outputting a fixed rate of the distribution of bandwidths predetermined for said queues of each said output port to said parallel arithmetic operating means; and said parallel arithmetic operating means performs the first-named parallel arithmetic operations based on the fixed distribution rate of the bandwidths output from said fixed bandwidth control means in order to obtain the evaluation factor for each said top packet of each said output port.

6. An apparatus for controlling packet output according to claim 2, wherein:

said packet scheduler further comprises
a bandwidth distribution rate computing section for computing, if one or more queues of each said output port are void of packets, a rate of distribution of the bandwidths for active queues having at least one packet of each said output port so as to distribute bandwidths allocated to said void queues to said active queues, and fixed bandwidth control means for outputting a fixed rate of distribution of the bandwidths predetermined for said queues of each said output port to said parallel arithmetic operating means;

said parallel arithmetic operating means further comprises bandwidth selecting means for selecting one from the computed distribution rate of the bandwidths from said bandwidth distribution rate computing and the fixed distribution rate of the bandwidths from said fixed bandwidth control means for each of said queues of each said output ports; and said parallel arithmetic operating means performs the first-named parallel arithmetic operations based on the distribution rate of the bandwidths selected by said bandwidth selecting means in order to obtain the evaluation factor for each said top packet on each said queue of each said output port.

7. An apparatus for controlling packet output according to claim 2, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

8. An apparatus for controlling packet output according to claim 2, said time-sharing port designation section determines a ratio of the designating of said plural output ports in the time-sharing manner for a predetermined time period in accordance with the ratio of the bandwidths of said plural output ports.

9. An apparatus for controlling packet output according to claim 3, wherein:

said packet scheduler further comprises a bandwidth distribution rate computing section for computing, if one or more queues of each said output port are void of packets, a rate of distribution of the bandwidths for active queues having at least one packet of each said output port so as to distribute bandwidths allocated to said void queues to said active queues; and said parallel arithmetic operating means performs the first-named parallel arithmetic operations based on the distribution rate of the bandwidths, which have been computed for said active queues by said bandwidth computing section in order to obtain evaluation factors of said top packets on said active queues.

10. An apparatus for controlling packet output according to claim 3, wherein:

said packet scheduler further comprises fixed bandwidth control means for outputting a fixed rate of the distribution of bandwidths predetermined for said queues of each said output port to said parallel arithmetic operating means; and said parallel arithmetic operating means performs the first-named parallel arithmetic operations based on the fixed distribution rate of the bandwidths output from said fixed bandwidth control means in order to obtain the evaluation factor for each said top packet of each said output port.

11. An apparatus for controlling packet output according to claim 3, wherein:

said packet scheduler further comprises
   a bandwidth distribution rate computing section for computing, if one or more queues of each said output port are void of packets, a rate of distribution of the bandwidths for active queues having at least one packet of each said output port so as to distribute bandwidths allocated to said void queues to said active queues, and
   fixed bandwidth control means for outputting a fixed rate of distribution of the bandwidths predetermined for said queues of each said output port to said parallel arithmetic operating means;
said parallel arithmetic operating means further comprises bandwidth selecting means for selecting one from the computed distribution rate of the bandwidths from said bandwidth distribution rate computing and the fixed distribution rate of the bandwidths from said fixed bandwidth control means for each of said queues of each said output ports; and
said parallel arithmetic operating means performs the first-named parallel arithmetic operations based on the distribution rate of the bandwidths selected by said bandwidth selecting means in order to obtain the evaluation factor for each said top packet on each said queue of each said output port.

12. An apparatus for controlling packet output according to claim 3, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

13. An apparatus for controlling packet output according to claim 1, said packet scheduler further including a pre-processing section for performing an arithmetic operation on terms common with said queues for each said output port in the predefined formula based on the parameters of said enqueued packets to obtain an interim variable and for inputting the interim variable to said parallel arithmetic operating means for the first-named parallel arithmetic operations in order to obtain the evaluation factor for each said top packets of each said output port.

14. An apparatus for controlling packet output according to claim 13, wherein:

said packet scheduler further comprises a bandwidth distribution rate computing section for computing, if one or more queues of each said output port are void of packets, a rate of distribution of the bandwidths for active queues having at least one packet of each said output port so as to distribute bandwidths allocated to said void queues to said active queues; and
said parallel arithmetic operating means performs the first-named parallel arithmetic operations based on the distribution rate of the bandwidths, which have been computed for said active queues by said bandwidth computing section in order to obtain evaluation factors of said top packets on said active queues.

15. An apparatus for controlling packet output according to claim 13, wherein:

said packet scheduler further comprises fixed bandwidth control means for outputting a fixed rate of the distribution of bandwidths predetermined for said queues of each said output port to said parallel arithmetic operating means; and
said parallel arithmetic operating means performs the first-named parallel arithmetic operations based on the fixed distribution rate of the bandwidths output from said fixed bandwidth control means in order to obtain the evaluation factor for each said top packet of each said output port.

16. An apparatus for controlling packet output according to claim 13, wherein:

said packet scheduler further comprises
   a bandwidth distribution rate computing section for computing, if one or more queues of each said output port are void of packets, a rate of distribution of the bandwidths for active queues having at least one packet of each said output port so as to distribute bandwidths allocated to said void queues to said active queues, and
   fixed bandwidth control means for outputting a fixed rate of distribution of the bandwidths predetermined for said queues of each said output port to said parallel arithmetic operating means;
said parallel arithmetic operating means further comprises bandwidth selecting means for selecting one from the computed distribution rate of the bandwidths from said bandwidth distribution rate computing and the fixed distribution rate of the bandwidths from said fixed bandwidth control means for each of said queues of each said output ports; and
said parallel arithmetic operating means performs the first-named parallel arithmetic operations based on the distribution rate of the bandwidths selected by said bandwidth selecting means in order to obtain the evaluation factor for each said top packet on each said queue of each said output port.

17. An apparatus for controlling packet output according to claim 13, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

18. An apparatus for controlling packet output according to claim 1, wherein:

said packet scheduler further comprises a bandwidth distribution rate computing section for computing, if one or more queues of each said output port are void of packets, a rate of distribution of the bandwidths for active queues having at least one packet of each said output port so as to distribute bandwidths allocated to said void queues to said active queues; and
said parallel arithmetic operating means performs the first-named parallel arithmetic operations based on the distribution rate of the bandwidths, which have been computed for said active queues by said bandwidth computing section in order to obtain evaluation factors of said top packets on said active queues.

19. An apparatus for controlling packet output according to claim 18, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

20. An apparatus for controlling packet output according to claim 19, wherein:

said packet scheduler further comprises a previous evaluation factor memory for retaining evaluation and factors obtained as the results of previous parallel arithmetic operations using the predefined arithmetic formula in said parallel arithmetic operating means with respect to said plural queues (hereinafter called "preferentially-controlled queues") of which priorities have been determined; and said parallel arithmetic operating means performs the first-named arithmetic operations based on the last-named evaluation factors retained in said previous evaluation factor memory in order to obtain evaluation factors of said top packets of said preferentially-controlled queues thereby controlling the bandwidths of said preferentially-controlled queues regarding said preferentially-controlled queues as a single queue.

21. An apparatus for controlling packet output according to claim 1, wherein:

said packet scheduler further comprises fixed bandwidth control means for outputting a fixed rate of the distribution of bandwidths predetermined for said queues of each said output port to said parallel arithmetic operating means; and said parallel arithmetic operating means performs the first-named parallel arithmetic operations based on the fixed distribution rate of the bandwidths output from said fixed bandwidth control means in order to obtain the evaluation factor for each said top packet of each said output port.

22. An apparatus for controlling packet output according to claim 21, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

23. An apparatus for controlling packet output according to claim 22, wherein:

said packet scheduler further comprises a previous evaluation factor memory for retaining evaluation and factors obtained as the results of previous parallel arithmetic operations using the predefined arithmetic formula in said parallel arithmetic operating means with respect to said plural queues (hereinafter called "preferentially-controlled queues") of which priorities have been determined; and said parallel arithmetic operating means performs the first-named arithmetic operations based on the last-named evaluation factors retained in said previous evaluation factor memory in order to obtain evaluation factors of said top packets of said preferentially-controlled queues thereby controlling the bandwidths of said preferentially-controlled queues regarding said preferentially-controlled queues as a single queue.

24. An apparatus for controlling packet output according to claim 1, wherein:

said packet scheduler further comprises
a bandwidth distribution rate computing section for computing, if one or more queues of each said output port are void of packets, a rate of distribution of the bandwidths for active queues having at least one packet of each said output port so as to distribute bandwidths allocated to said void queues to said active queues, and fixed bandwidth control means for outputting a fixed rate of distribution of the bandwidths predetermined for said queues of each said output port to said parallel arithmetic operating means;

said parallel arithmetic operating means further comprises bandwidth selecting means for selecting one from the computed distribution rate of the bandwidths from said bandwidth distribution rate computing and the fixed distribution rate of the bandwidths from said fixed bandwidth control means for each of said queues of each said output ports; and said parallel arithmetic operating means performs the first-named parallel arithmetic operations based on the distribution rate of the bandwidths selected by said bandwidth selecting means in order to obtain the evaluation factor for each said top packet on each said queue of each said output port.

25. An apparatus for controlling packet output according to claim 24, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

26. An apparatus for controlling packet output according to claim 25, wherein:

said packet scheduler further comprises a previous evaluation factor memory for retaining evaluation factors obtained as the results of previous parallel arithmetic operations using the predefined arithmetic formula in said parallel arithmetic operating means with respect to said plural queues (hereinafter called "preferentially-controlled queues") of which priorities have been determined; and said parallel arithmetic operating means performs the first-named arithmetic operations based on the last-named evaluation factors retained in said previous evaluation factor memory in order to obtain evaluation factors of said top packets of said preferentially-controlled queues thereby controlling the bandwidths of said preferentially-controlled queues regarding said preferentially-controlled queues as a single queue.

27. An apparatus for controlling packet output according to claim 1, said packet scheduler further comprising priority control means for determining priorities of said queues of said each output port and for masking, if one of said queues has a packet, the evaluation factors of queues of lower priorities than said one queue, which factors has been obtained by said parallel arithmetic operating means.

28. An apparatus for controlling packet output according to claim 27, wherein:

said packet scheduler further comprises a previous evaluation factor memory for retaining evaluation and factors obtained as the results of previous parallel arithmetic operations using the predefined arithmetic formula in said parallel arithmetic operating means with respect to said plural queues (hereinafter called "preferentially-controlled queues") of which priorities have been determined; and said parallel arithmetic operating means performs the first-named arithmetic operations based on the last-named evaluation factors retained in said previous evaluation factor memory in order to obtain evaluation factors of said top packets of said preferentially-controlled queues thereby controlling the bandwidths of said preferentially-controlled queues regarding said preferentially-controlled queues as a single queue.

29. An apparatus for controlling packet output according to claim 1, said packet scheduler further comprising:

destination-information retaining means for retaining destination information for designating two or more of said plural output ports through which one of said enqueued packets is to be multicasted; and distribution controlling means for controlling, each time when one of said two or more output ports is selected by said arithmetic-operation controlling means, the evaluating factor of said last-named enqueued packet that is to be multicasted to said two or more output ports designated by said destination information, which factor has been obtained by said parallel arithmetic operating means, by discriminating that the evaluating factor of said last-named enqueued packet is valid.

30. An apparatus for controlling packet output according to claim 1, said inter-port selecting means including:

a first register for retaining the evaluation factor of said top packet that is to be preferentially output from each said output port, which factor has been selected by said intra-port selecting means; and an output-port-shaping controlling section for controlling the bandwidth of each said output port by controlling output of the evaluate factor retained in said first register regarding the bandwidth of each said output port based on information of the last-named evaluation factor of each said output port and the bandwidth predetermined for each said output port.

31. An apparatus for controlling packet output according to claim 30, said output-port-shaping controlling section including an output-port-burst controlling section for controlling a burst of output of said top packets, each selected by said intra-port selecting means, except said top packet that has been selected to be most-preferentially output by controlling outputting of the evaluation factors of said except top packets.

32. An apparatus for controlling packet output according to claim 30, said dequeue controlling means including:

a second register for retaining the evaluation factor of said top packet that is to be preferentially output from each said output port, which factor has been selected by said intra-port selecting means; and a dequeue-bus-shaping controlling section for controlling the bandwidth of each said output port by controlling output of the evaluate factor retained in said second register regarding bandwidths of dequeue bus, through which said enqueued packets are to be output from said apparatus, based on information of the evaluation factors for each said output port and the bandwidth predetermined for the dequeue bus.

33. An apparatus for controlling packet output according to claim 32, said dequeue-bus-shaping controlling section including a dequeue-bus-burst controlling section for controlling a burst of output of said top packets, each selected by said intra-port selecting means, except said top packet that has been selected to be most-preferentially output by controlling outputting of the evaluation factors of the except packets on the top positions.

34. An apparatus for controlling packet output according to claim 1, wherein:

said packet scheduler comprising a leading-packets memory for retaining the parameters of a number of packets which are successively enqueued on said queues of each said output ports and which packets includes said top packets of said last-named queues; and upon issuing the instruction to dequeue said top packet, which has been selected from said plural queue by said inter-port selecting means said arithmetic-operation controlling means reads the parameter of the subsequent packet of said last-named top packet that is to be dequeued from said leading-packet memory and inputs the read parameter to said parallel arithmetic operating means.

35. An apparatus for controlling packet output according to claim 1, said dequeue controlling means including:

a second register for retaining the evaluation factor of said top packet that is to be preferentially output from each said output port, which factor has been selected by said intra-port selecting means; and a dequeue-bus-shaping controlling section for controlling the bandwidth of each said output port by controlling output of the evaluation factor retained in said second register regarding bandwidths of dequeue bus, through which said enqueued packets are to be output from said apparatus, based on information of the evaluation factors for each said output port and the bandwidth predetermined for the dequeue bus.

36. An apparatus for controlling packet output according to claim 1, said dequeue controlling means further including a mask-signal outputting section for outputting, upon issuing the instruction to dequeue said top packet of said queue, which has been selected by said inter-port selecting means, a mask-control signal to said arithmetic-operation controlling means, said parallel arithmetic operating means and said inter-port selecting means in order to mask the evaluation factors of said last-named top packet that is selected to be dequeued by said dequeue controlling means.

* * * * *